United States Patent
Nishitani et al.

(10) Patent No.: US 9,191,680 B2
(45) Date of Patent: Nov. 17, 2015

(54) PICTURE CODING DEVICE, PICTURE CODING METHOD, PICTURE CODING PROGRAM, PICTURE DECODING DEVICE, PICTURE DECODING METHOD, AND PICTURE DECODING PROGRAM

(71) Applicant: JVC KENWOOD Corporation, Yokohama-shi (JP)

(72) Inventors: Masayoshi Nishitani, Yokosuka (JP); Hiroya Nakamura, Yokosuka (JP); Hideki Takehara, Yokosuka (JP); Shigeru Fukushima, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

(21) Appl. No.: 14/598,930

(22) Filed: Jan. 16, 2015

(65) Prior Publication Data

US 2015/0131734 A1 May 14, 2015

Related U.S. Application Data

(63) Continuation of application No. 14/106,048, filed on Dec. 13, 2013, now Pat. No. 8,982,956, which is a continuation of application No. PCT/JP2012/004135, filed on Jun. 26, 2012.

(30) Foreign Application Priority Data

Jun. 30, 2011 (JP) .................. 2011-146769
Jun. 30, 2011 (JP) .................. 2011-146770

(51) Int. Cl.
*H04N 11/02* (2006.01)
*H04N 7/12* (2006.01)
(Continued)

(52) U.S. Cl.
CPC ....... *H04N 19/513* (2014.11); *H04N 19/00024* (2013.01); *H04N 19/00072* (2013.01);
(Continued)

(58) Field of Classification Search
CPC .............. H04N 5/145; H04N 7/26765; H04N 7/26015; H04N 7/50; H04N 19/00024
See application file for complete search history.

(56) References Cited

U.S. PATENT DOCUMENTS 8,331,453 B2 * 12/2012 Jeon et al. ................. 375/240.16
8,792,561 B2 * 7/2014 Min et al. .................. 375/240.24
(Continued)

FOREIGN PATENT DOCUMENTS

| JP | 10-276439 A | 10/1998 |
|---|---|---|
| JP | 5644701 B2 | 1/2013 |
| WO | WO-2012/177387 A1 | 12/2012 |

OTHER PUBLICATIONS

McCann et al., "HEVC Test Model 3 (HM 3) Encoder Description," Joint Collaborative Team on Video Coding (JCT-VC) of ITU-T SG16 WP3 and ISO/IEC JTC1/SC29/WG11, 5th Meeting: Geneva, Mar. 2011.

(Continued)

*Primary Examiner* — Chikaodili E Anyikire
*Assistant Examiner* — Tsion B Owens
(74) *Attorney, Agent, or Firm* — Venable LLP; Michael A. Sartori

(57) ABSTRACT

In a first inter-image prediction mode in which information on a motion vector is used, a first mode detection unit constructs a first candidate list from a plurality of reference block candidates based on a first predetermined order, assigns indices for designating reference block candidates added in the first candidate list, and outputs the indices of the plurality of reference candidate blocks. In a second inter-image prediction mode in which is used a motion vector difference between a motion vector predictor based on information on a motion vector, and a motion vector of a coding target block, a second mode detection unit constructs a second candidate list from a plurality of reference block candidates based on a second predetermined order, assigns indices for designating reference block candidates added in the second candidate list, and outputs the indices of the plurality of reference block candidates and motion vector differences.

7 Claims, 65 Drawing Sheets

(51) Int. Cl.

| | |
|---|---|
| *G06K 9/36* | (2006.01) |
| *H04N 19/513* | (2014.01) |
| *H04N 19/583* | (2014.01) |
| *H04N 19/105* | (2014.01) |
| *H04N 19/139* | (2014.01) |
| *H04N 19/176* | (2014.01) |
| *H04N 19/70* | (2014.01) |
| *H04N 19/119* | (2014.01) |
| *H04N 19/46* | (2014.01) |
| *H04N 19/51* | (2014.01) |
| *H04N 19/52* | (2014.01) |

(52) U.S. Cl.
CPC ... *H04N19/00151* (2013.01); *H04N 19/00278* (2013.01); *H04N 19/00545* (2013.01); *H04N 19/00684* (2013.01); *H04N 19/00733* (2013.01); *H04N 19/00884* (2013.01); *H04N 19/105* (2014.11); *H04N 19/119* (2014.11); *H04N 19/139* (2014.11); *H04N 19/176* (2014.11); *H04N 19/46* (2014.11); *H04N 19/51* (2014.11); *H04N 19/52* (2014.11); *H04N 19/70* (2014.11)

(56) References Cited

U.S. PATENT DOCUMENTS

| | | | | |
|---|---|---|---|---|
| 2009/0046781 | A1* | 2/2009 | Moriya et al. | 375/240.12 |
| 2012/0320969 | A1* | 12/2012 | Zheng et al. | 375/240.02 |
| 2012/0328015 | A1* | 12/2012 | Kim et al. | 375/240.13 |
| 2013/0148734 | A1* | 6/2013 | Nakamura | 375/240.16 |
| 2014/0254675 | A1* | 9/2014 | Lee et al. | 375/240.12 |

OTHER PUBLICATIONS

Yeo et al., "Simplified AMVP candidate derivation for Inter and Merge modes," Joint Collaborative Team on Video Coding (JCT-VC) of ITU-T SG16 WP3 and ISO/IEC JTC1/SC29/WG11, 5th Meeting: Geneva, Mar. 2011.

Park et al., "CE9 Subtests N and O: Improvement on AMVP," Joint Collaborative Team on Video Coding (JCT-VC) of ITU-T SG16 WP3 and ISO/IEC JTC1/SC29/WG11, 5th Meeting: Geneva, Mar. 2011.

Extended European Search Report in International Application No. PCT/JP2012/004135, dated Feb. 25, 2015.

Yunfei Zheng et al., "Unified Motion Ventor Predictor Selection for Merge and AMVP," Joint Collaborative Team on Video Coding (JCT-VC) of ITU-T SG16 WP3 and ISO/IEC JTC1/SC29/WG11 JCTVC-E396, 5th Meeting: Geneva, Mar. 2011, pp. 1-5.

Yusuke Itani et al., "Improvement to AMVP/Merge process," Joint Collaborative Team on Video Coding (JCT-VC) of ITU-T SG16 WP3 and ISO/IEC JTC1/SC29/WG11, JCTVC-E064, 5th Meeting: Geneva, Mar. 2011, pp. 1-8.

Yih Han Tan et al., "Merge/Skip/Direct Simplification," Joint Collaborative Team on Video Coding (JCT-VC) of ITU-T SG16 WP3 and ISO/IEC JTC1/SC29/WG11 JCTVC-D051, 4th Meeting: Daegu, Korea, Jan. 2011, pp. 1-4.

Hiroya Nakamura et al., "Unification of derivation process for merge mode and MVP," Joint Collaborative Team on Video Coding (JCT-VC) of ITU-T SG16 WP3 and ISO/IEC JTC1/SC29/WG11 JCTVC-F419, 6th Meeting: Torino, Italy, Jul. 2011, pp. 1-10.

International Search Report and Written Opinion in PCT International Application No. PCT/JP2012/004135, dated Sep. 18, 2012.

Notification of Reasons for Refusal in Japanese Patent Application No. 2011-146769, dated Aug. 5, 2014.

Notification of Reason(s) for Refusal in Japanese Patent Application No. 2014-221336, dated Aug. 11, 2015.

* cited by examiner

FIG.6

```
                    ┌─────────────────────────────┐
                    │     PREDICTION BLOCK        │
                    └─────────────────────────────┘ if (skip_flag) {
        if (NumMergeCand > 1)
            merge_idx
    } else if (predMode == MODE_INTRA) {
                    ⋮
    } else {
        merge_flag
        if (merge_flag) {
            if (NumMergeCand > 1)
                merge_idx
        } else {
            if (slice_type == B)
                inter_pred_flag
            if (inter_pred_flag != Pred_BI) {
                if (num_ref_idx_l0_active_minus1 > 0)
                    ref_idx_l0
                mvd_l0[0]
                mvd_l0[1]
                if (NumMVPCand(L0) > 1)
                    mvp_idx_l0
            } else {
                if (num_ref_idx_l1_active_minus1 > 0)
                    ref_idx_l1
                mvd_l1[0]
                mvd_l1[1]
                if (NumMVPCand(L1) > 1)
                    mvp_idx_l1
            }
        }
    }
```

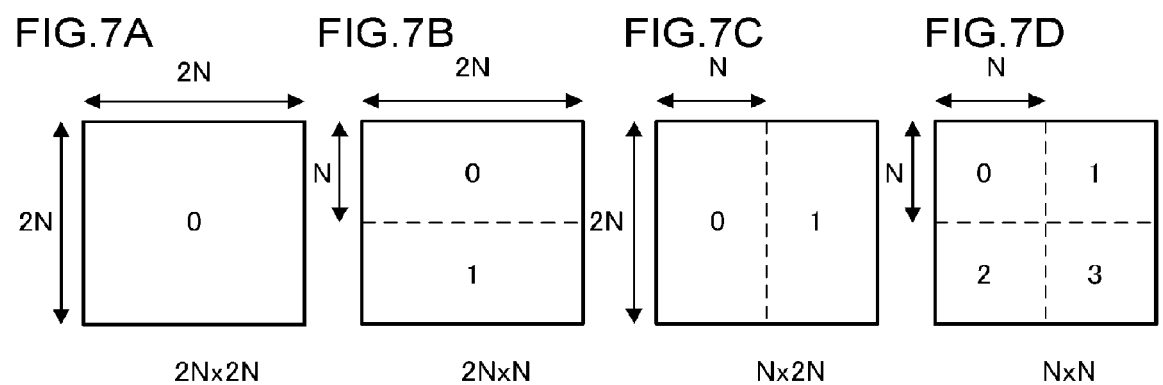

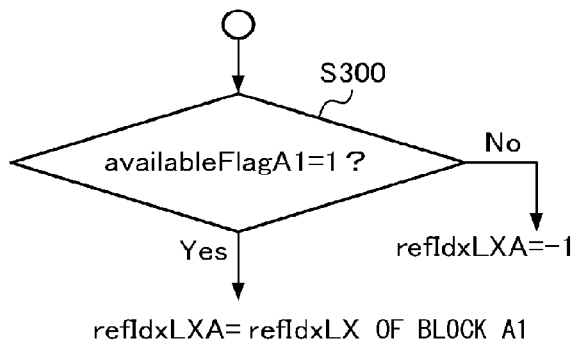
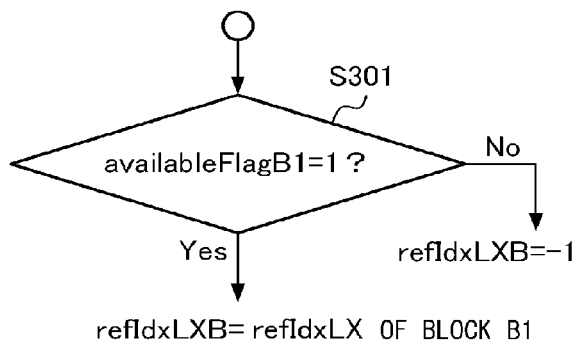
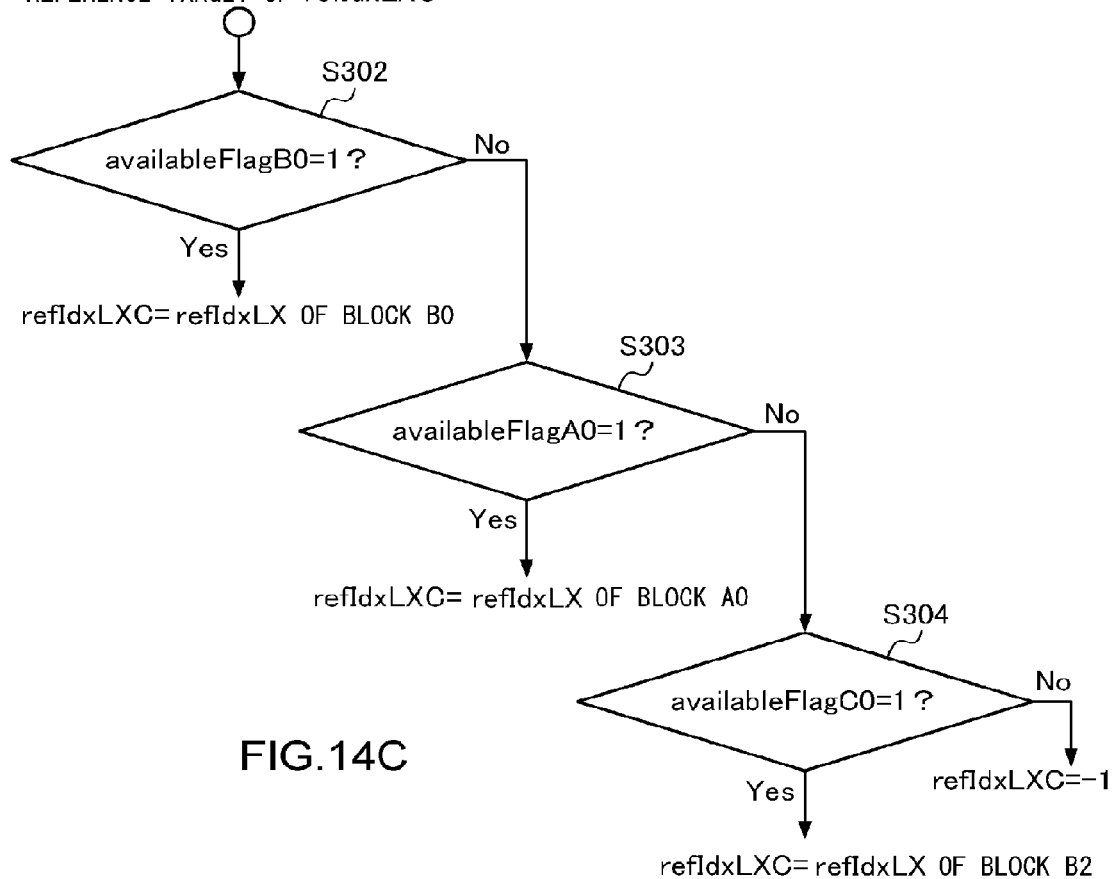

FIG.15

| refIdxLXA | refIdxLXB | refIdxLXC | refIdxLXCol | |
|---|---|---|---|---|
| ○ | SAME AS refIdxLXA | SAME AS refIdxLXA | IF refIdxLXA IS -1, 0, OTHERWISE refIdxLXA | MAJORITY VOTE |
| ○ | SAME AS refIdxLXA | × | IF refIdxLXA IS -1, refIdxLXC, OTHERWISE refIdxLXA | |
| ○ | × | SAME AS refIdxLXA | IF refIdxLXA IS -1, refIdxLXB, OTHERWISE refIdxLXA | |
| × | ○ | SAME AS refIdxLXB | IF refIdxLXB IS -1, refIdxLXA, OTHERWISE refIdxLXB | |
| -1 | × | × | min(refIdxLXB, refIdxLXC) | MINIMUM VALUE |
| × | -1 | × | min(refIdxLXA, refIdxLXC) | |
| × | × | -1 | min(refIdxLXA, refIdxLXB) | |
| × | × | × | min(refIdxLXA, refIdxLXB, refIdxLXC) | |

FIG.20

| INDEX | NEIGHBORING BLOCK REFERRED TO | CODEWORD |
|---|---|---|
| 0 | A1 | 0 |
| 1 | B1 | 10 |
| 2 | B0 | 110 |
| 3 | A0 | 1110 |
| 4 | C0 | 11110 |
| 5 | T | 11111 |

FIG.28

| INDEX | NEIGHBORING BLOCK REFERRED TO | CODEWORD |
|---|---|---|
| 0 | A1 | 0 |
| 1 | B1 | 10 |
| 2 | B0 | 110 |
| 3 | A0 | 1110 |
| 4 | C0 | 11110 |
| 5 | T | 11111 |

FIG.35

| refIdxLXA | refIdxLXB | refIdxLXCol |
|---|---|---|
| ○ | ○ | refIdxLXA |
| ○ | × | min(refIdxLXA, refIdxLXB) |
| −1 | × | refIdxLXB |
| ○ | −1 | refIdxLXA |
| −1 | −1 | 0 |

FIG.36

| INDEX | NEIGHBORING BLOCK REFERRED TO | CODEWORD |
|---|---|---|
| 0 | (A1, A0) | 0 |
| 1 | (B1, B0, C0) | 10 |
| 2 | T | 11 |

FIG.40

| INDEX | NEIGHBORING BLOCK REFERRED TO | CODEWORD |
|---|---|---|
| 0 | (A0, A1) | 0 |
| 1 | (B0, B1, C0) | 10 |
| 2 | T | 11 |

FIG.41

|  | MERGE MODE | | NON-MERGE (MOTION ESTIMATION) MODE | |
| --- | --- | --- | --- | --- |
| INDEX | BLOCK | CODEWORD | BLOCK | CODEWORD |
| 0 | A1 | 0 | (A0, A1) | 0 |
| 1 | B1 | 10 | (B0, B1, C0) | 10 |
| 2 | B0 | 110 | T | 11 |
| 3 | A0 | 1110 | — | — |
| 4 | C0 | 11110 | — | — |
| 5 | T | 11111 | — | — |

FIG.47

| INDEX | NEIGHBORING BLOCK REFERRED TO | CODEWORD |
|---|---|---|
| 0 | A1 | 0 |
| 1 | B1 | 10 |
| 2 | (B0, A0, C0) | 110 |
| 3 | T | 111 |

FIG.59

| INDEX | MERGE MODE | | NON-MERGE (MOTION ESTIMATION) MODE | |
|---|---|---|---|---|
| | BLOCK | CODEWORD | BLOCK | CODEWORD |
| 0 | (NOTE 1) | 0 | (NOTE 2) | 0 |
| 1 | (NOTE 1) | 10 | (NOTE 2) | 10 |
| 2 | T | 11 | T | 11 |

(NOTE 1) ADD TOP TWO BLOCKS IN ORDER A1, B1, B0, A0, C0
(NOTE 2) ADD TOP TWO BLOCKS IN ORDER B0, A0, A1, B1, C0

FIG.62

| INDEX OF CONVERSION TABLE | INDEX OF REFERENCE CANDIDATE LIST | CODEWORD |
| --- | --- | --- |
| 0 | 2 | 0 |
| 1 | 3 | 10 |
| 2 | 0 | 110 |
| 3 | 1 | 1110 |
| 4 | 4 | 11110 |
| 5 | 5 | 11111 |

FIG.63

| INDEX | NEIGHBORING BLOCK REFERRED TO | CODEWORD |
|---|---|---|
| 0 | B0 | 110 |
| 1 | A0 | 1110 |
| 2 | A1 | 0 |
| 3 | B1 | 10 |
| 4 | C0 | 11110 |
| 5 | T | 11111 |

PICTURE CODING DEVICE, PICTURE CODING METHOD, PICTURE CODING PROGRAM, PICTURE DECODING DEVICE, PICTURE DECODING METHOD, AND PICTURE DECODING PROGRAM

CROSS REFERENCE TO RELATED APPLICATIONS

This application is a Continuation of U.S. patent application Ser. No. 14/106,048, filed Dec. 13, 2013, which is a Continuation of PCT International Application No. PCT/JP2012/004135, filed Jun. 26, 2012, which claims the benefit of Japanese Patent Application Nos. 2011-146769 and 2011-146770, filed Jun. 30, 2011, all of which are incorporated by reference in their entirety.

BACKGROUND OF THE INVENTION

1. Field of the Invention

The present invention relates to a technology of coding moving pictures, and, more particularly, to an picture coding device, picture coding method, picture coding program, picture decoding device, picture decoding method, and picture decoding program configured to partition a picture into rectangular blocks and estimate and compensate for motion between pictures in units of blocks.

2. Description of the Related Art

In a moving picture coding system as exemplified by MovingPictureCodingExpertsGroup (MPEG), in which a picture is partitioned into rectangular blocks, and motion between pictures is estimated and compensated for in units of blocks, a motion vector is predicted in order to reduce the code size of motion vectors generated in the blocks.

In MPEG-2, the code size is reduced by derivating a difference between a motion vector detected in a given macroblock and a motion vector for an immediately previously coded macroblock, and by coding the difference. In MPEG-4AVC/H.264, strong correlation of a given motion vector to a motion vector for an immediately neighboring block is taken advantage of such that the code size is reduced by performing prediction from an immediately neighboring block and by coding the resultant differential vector. More specifically, a motion vector is predicted by derivating a median value from motion vectors for neighboring blocks to the left of, above, and to the upper right of a target block subject to a prediction process, and by derivating a difference from the median value.

In these prediction methods, only one motion vector is available for prediction. Therefore, if the prediction fails, the difference between motion vectors will grow accordingly, resulting in an increase in the code size. Further, aside from the fact that the code size of a motion vector is reduced, other motion information is coded in units of target blocks. Therefore, even if a given block has the same motion information as an immediately neighboring block, the information is coded in a duplicate manner, resulting in less efficient coding.

In order to solve these problems, two new technologies are being studied in working out the standard for moving picture coding in ISO/IEC and ITU-T. One approach relates to prediction of a motion vector. The use of a motion vector for a coded immediately neighboring block as a motion vector predictor candidate, and the use of a motion vector for a block neighboring a block located in another picture at a different point of time at a position equivalent to that of the target prediction block, are evaluated for the generated code size.

FIGS. 1A and 1B show examples of neighboring blocks that could be candidates for motion vector predictors. FIG. 1A shows examples of neighboring blocks in the same picture. FIG. 1B show an example of a block neighboring a block located in another picture at a different point of time at a position equivalent to that of the target prediction block. The motion vectors for these blocks are defined as motion vector predictor candidates. The difference between the motion vector for the target block and the motion vector predictor candidate that produces the minimum code size is identified, and the associated candidate is selected as the motion vector predictor. The difference from the motion vector predictor and, if necessary, additional information related to the neighboring block in which the motion vector predictor is selected are coded and transmitted.

In another approach, if the motion information on a target block and the motion information on a neighboring block already coded are identical, the motion information of the target block is not coded and the motion information of the neighboring block is used for coding. More specifically, this approach is directed to reducing the code size of motion information by coding additional information designating a neighboring block having reference motion information (motion information that should be referred to) (see, for example, patent document 1). Such a method is called merge and gains attention as a method of reducing the code size of motion information.

[patent document 1] JP10-276439

In the above methods for motion vector prediction and merge is used coding information including a motion vector, a reference picture number (indicating the picture that should be referred to), a reference list, etc. for an immediately neighboring block already coded or for a block neighboring a block located in another picture at a different point of time at a position equivalent to that of the target prediction block. However, since the positions of neighboring blocks referred to differ according to the techniques, the number of accesses to the memory storing coding information already coded will be disadvantageously increased.

Further, in order to select the most suitable reference target in an ordinary coding process, motion compensation is performed by using the coding information of a reference neighboring block, and decision is made by using the generated code size and coding distortion as indices. However, use of different neighboring blocks for reference leads to an increase in the number of blocks with the result that the processing load is increased. Another problem is that constraints may be imposed on the timing to read decoded coding information at the time of decoding, or the capacity of a temporary memory required to store decoded coding information is increased.

SUMMARY OF THE INVENTION

The embodiment addresses the aforementioned issue, and a purpose thereof is to provide a technology capable of reducing the load required to process motion information and improve the efficiency of coding motion information.

Means to Solve the Problem

The picture coding device according to an embodiment of the present invention is adapted to code each of blocks obtained by partitioning each picture of moving pictures, by using motion vectors, and comprises: an acquisition unit (104) configured to acquire coding information on a plurality of reference block candidates for the block subject to coding; a first mode detection unit (106) configured to construct, in a first inter prediction mode that uses information on a motion vector provided in the coding information of a reference block identified by an index, a first candidate list from the plurality of reference block candidates in accordance with a first predetermined order, to assign indices for identifying reference block candidates added in the first candidate list, and to output the indices of the plurality of reference block candidates; a second mode detection unit (103) configured to construct, in a second inter prediction mode that uses a motion vector predictor difference between a motion vector predictor based on information on a motion vector provided in the coding information of a reference block identified by an index and a motion vector of the block subject to coding, a second candidate list from the plurality of reference block candidates in accordance with a second predetermined order, to assign indices for identifying reference block candidates added in the second candidate list, and to output the indices of the plurality of reference block candidates and the motion vector difference; a prediction method decision unit (107) configured to decision a reference block and an inter prediction mode for each block subject to coding, based on outputs from the first and second mode detection units (106, 103); and a bitstream generation unit (109) configured to code the index of the reference block decisioned by the prediction method decision unit (107), prediction mode information indicating the inter prediction mode decisioned by the prediction method decision unit, and the motion vector difference corresponding to the reference block, the motion vector difference being coded when the prediction method decision unit decisions on the second inter prediction mode. The first and second mode detection units (103, 106) use a plurality of common blocks as the plurality of reference block candidates.

The higher in the first predetermined order, the smaller may be the size of a codeword of the index assigned by the first mode detection unit (106) to the reference block candidate.

The first predetermined order of arranging the plurality of reference block candidates in the first candidate list constructed by the first mode detection unit (106) may differ from the second predetermined order of arranging the plurality of reference block candidates in the second candidate list constructed by the second mode detection unit (103).

The first mode detection unit (106) may construct the first candidate list of the plurality of reference block candidates such that the number of reference block candidates is limited. The second mode detection unit (103) may construct the second candidate list of the plurality of reference block candidates such that the number of reference block candidates is limited.

The plurality of reference block candidates may include coded blocks spatially neighboring the block subject to coding and blocks included in a picture at a different point of time from a picture including the block subject to coding. The first and second mode detection units (103, 106) may arrange the plurality of reference block candidates such that a position of a block included in a picture at a different point of time in the first and second predetermined orders is lower than a position of a spatially neighboring block in the first and second predetermined orders.

The first mode detection unit (106) may construct the first candidate list according to the first predetermined order by providing a predetermined upper limit to the number of spatially neighboring coded blocks arranged in the first candidate list, and by using as many reference blocks as defined by the upper limit in the first predetermined order.

The second mode detection unit (103) may construct the second candidate list, by defining those of the plurality of spatially neighboring coded blocks arranged to the left of the block subject to coding as belonging to a block group to the left, define those blocks arranged above the block subject to coding as belonging to a block group above, derive a candidate representing each of the block groups, and construct the second candidate list by defining the second predetermined order such that the candidate from the block group to the left and the candidate from the block group above are arranged in the stated order.

The first mode detection unit (106) may define a maximum number of reference block candidates arranged in the first candidate list, and construct the first candidate list based on the maximum number of reference block candidates. The bitstream generation unit (109) may code information indicating the maximum number of reference block candidates and include the information in the bitstream.

Another embodiment of the present invention relates to a picture coding method. The method is adapted to code each of blocks obtained by partitioning each picture of moving pictures, by using motion vectors, and comprises: acquiring coding information on a plurality of reference block candidates for the block subject to coding; constructing, in a first inter prediction mode that uses information on a motion vector provided in the coding information of a reference block identified by an index, a first candidate list from the plurality of reference block candidates in accordance with a first predetermined order, to assign indices for identifying reference block candidates added in the first candidate list, and to output the indices of the plurality of reference block candidates; constructing, in a second inter prediction mode that uses a motion vector predictor difference between a motion vector predictor based on information on a motion vector provided in the coding information of a reference block identified by an index and a motion vector of the block subject to coding, a second candidate list from the plurality of reference block candidates in accordance with a second predetermined order, to assign indices for identifying reference block candidates added in the second candidate list, and to output the indices of the plurality of reference block candidates and the motion vector difference; decisioning a reference block and an inter prediction mode for each block subject to coding, based on outputs from the constructing of the first and second candidate lists; and coding the index of the reference block decisioned by decisioning of a reference block, prediction mode information indicating the inter prediction mode decisioned by decisioning of a reference block, and the motion vector difference corresponding to the reference block, the motion vector difference being coded when the second inter prediction mode is decisioned. The constructing of the first and second candidate lists use a plurality of common blocks as the plurality of reference block candidates.

The picture decoding device according to an embodiment of the present invention is adapted to decode a bitstream coded in units of blocks obtained by partitioning each picture of moving pictures, by using motion vectors, and comprises: a bitstream decoding unit (202) configured to decode the bitstream to derive, for each block subject to decoding, prediction mode information indicating an inter prediction mode and an index indicating a reference block that the block subject to decoding refers to, or derive prediction mode information indicating an inter prediction mode, an index indicating a reference block that the block subject to decoding refers to, and a motion vector difference associated with the reference block; a coding information storage (210) for storing coding information of each block; an acquisition unit (205) configured to acquire from the coding information storage (210) coding information on a plurality of reference block candidates for the block subject to decoding; a first mode output unit (206) configured to construct, when the inter prediction mode indicated by the prediction mode information decoded by the bitstream decoding unit (202) indicates a first inter prediction mode that uses information on a motion vector provided in the coding information of the reference block identified by the index, a first candidate list from the plurality of reference block candidates in accordance with a first predetermined order, to identify a reference block referred to by the block subject to decoding in the first candidate list by referring to the index of the reference block decoded by the bitstream decoding unit (202), and to output the coding information; a second mode output unit (204) configured to construct, when the inter prediction mode indicated by the prediction mode information decoded by the bitstream decoding unit (202) indicates a second inter prediction mode that uses a motion vector difference associated with the reference block identified by the index, a second candidate list from the plurality of reference block candidates in accordance with a second predetermined order, to identify a reference block referred to by the block subject to decoding in the second candidate list by referring to the index of the reference block decoded by the bitstream decoding unit (202), and to derivate and output a motion vector for the block subject to decoding from the motion vector predictor based on the information on the motion vector provided in the coding information of the reference block and from the motion vector difference decoded by the bitstream decoding unit; and a motion compensation prediction unit (207) configured to perform motion compensation using the inter prediction mode indicated by the prediction mode information decoded by the bitstream decoding unit (202), by referring to information output from the first mode output unit (206) or the second mode output unit (204), so as to generate a prediction picture for the block subject to decoding. The first and second mode output units (206, 204) use a plurality of common blocks as the plurality of reference block candidates.

The higher in the first predetermined order, the smaller may be the size of a codeword of the index assigned by the first mode output unit (206) to the reference block candidate.

The first predetermined order of arranging the reference block candidates in the first candidate list constructed by the first mode output unit (206) may differ from the second predetermined order of arranging the reference block candidates in the second candidate list constructed by the second mode output unit (204).

The first mode output unit (206) may construct the first candidate list of the plurality of reference block candidates such that the number of reference block candidates is limited. The second mode output unit (204) may construct the second candidate list of the plurality of reference block candidates such that the number of reference block candidates is limited.

The plurality of reference block candidates may include decoded blocks spatially neighboring the block subject to decoding and blocks included in a picture at a different point of time from a picture including the block subject to decoding. The first and second mode output units (206, 204) may arrange the plurality of reference block candidates such that a position of a block included in a picture at a different point of time in the first and second predetermined orders is lower than a position of a spatially neighboring block in the first and second predetermined orders.

The first mode output unit (206) may construct the first candidate list according to the first predetermined order by providing a predetermined upper limit to the number of spatially neighboring decoded blocks arranged in the first candidate list, and by using as many reference blocks as defined by the upper limit in the first predetermined order.

The second mode output unit (204) may construct the second candidate list, by defining those of the plurality of spatially neighboring decoded blocks arranged to the left of the block subject to decoding as belonging to a block group to the left, define those blocks arranged above the block subject to decoding as belonging to a block group above, derive a candidate representing each of the block groups, and construct the second candidate list by defining the second predetermined order such that the candidate from the block group to the left and the candidate from the block group above are arranged in the stated order.

The first mode output unit (206) may construct the first candidate list based on a maximum number of reference block candidates arranged in the first candidate list, the maximum number being derived from the bitstream by the bitstream decoding unit.

Another embodiment of the present invention relates to a picture decoding method. The method is adapted to decode a bitstream coded in units of blocks obtained by partitioning each picture of moving pictures, by using motion vectors, and comprises: decoding the bitstream to derive, for each block subject to decoding, prediction mode information indicating an inter prediction mode and an index indicating a reference block that the block subject to decoding refers to, or derive prediction mode information indicating an inter prediction mode, an index indicating a reference block that the block subject to decoding refers to, and a motion vector difference associated with the reference block; acquiring coding information on a plurality of reference block candidates for the block subject to decoding; constructing, when the inter prediction mode indicated by the prediction mode information decoded by the decoding indicates a first inter prediction mode that uses information on a motion vector provided in the coding information of the reference block identified by the index, a first candidate list from the plurality of reference block candidates in accordance with a first predetermined order, identifying a reference block referred to by the block subject to decoding in the first candidate list by referring to the index of the reference block decoded by the decoding, and outputting the coding information; constructing, when the inter prediction mode indicated by the prediction mode information decoded by the decoding indicates a second inter prediction mode that uses a motion vector difference associated with the reference block identified by the index, a second candidate list from the plurality of reference block candidates in accordance with a second predetermined order, identifying a reference block referred to by the block subject to decoding in the second candidate list by referring to the index of the reference block decoded by the decoding, and derivating and outputting a motion vector for the block subject to decoding from the motion vector predictor based on the information on the motion vector provided in the coding information of the reference block and from the motion vector difference decoded by the decoding; and performing motion compensation using the inter prediction mode indicated by the prediction mode information decoded by the decoding, by referring to information output from the constructing of the first and second candidate lists, so as to generate a predicted picture for the block subject to decoding. The constructing of the first and second candidate lists use a plurality of common blocks as the plurality of reference block candidates.

Optional combinations of the aforementioned constituting elements, and implementations of the invention in the form of methods, apparatuses, systems, recording mediums, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 shows a syntax pattern of a bitstream written for each prediction block and related to a method of selecting a reference neighboring block according to the embodiments;

FIGS. 7A-7D illustrate types of the shape of prediction blocks according to the embodiments;

FIGS. 14A-14C show the operation performed in the coding information derivation unit according to the first embodiment to select candidate reference picture numbers of pictures referred to by the target prediction block;

FIG. 15 lists patterns of selecting, in the coding information derivation unit according to the first embodiment, a reference picture number from candidate reference picture numbers of pictures referred to by the target prediction block;

FIG. 20 shows an exemplary reference candidate list constructed by the reference candidate list construction unit according to the first embodiment;

FIG. 28 shows an exemplary reference candidate list constructed by the reference candidate list construction unit according to the first embodiment;

FIG. 35 show patterns of selecting, in the coding information derivation unit according to the second embodiment, a reference picture number from candidate reference picture numbers of pictures referred to by the target prediction block;

FIG. 36 shows an exemplary reference candidate list constructed by the reference candidate list construction unit of the merge detection unit according to the second embodiment;

FIG. 40 shows an exemplary reference candidate list constructed by the reference candidate list construction unit of the motion vector prediction unit according to the second embodiment;

FIG. 41 shows an exemplary reference candidate list constructed by using different selection methods depending on the merge mode or the motion detection mode according to the third embodiment;

FIG. 47 shows an exemplary reference candidate list constructed by the reference candidate list construction unit according to the sixth embodiment;

FIG. 59 shows an exemplary reference candidate list constructed according to the eighth embodiment for the merge mode and the motion detection mode;

FIG. 62 shows exemplary correspondence in the reference candidate list construction unit between indices in the reference candidate list and indices in the conversion table;

FIG. 63 shows an exemplary reference candidate list constructed by the reference candidate list construction unit according to the ninth embodiment;

DETAILED DESCRIPTION OF THE INVENTION

Figure 2:
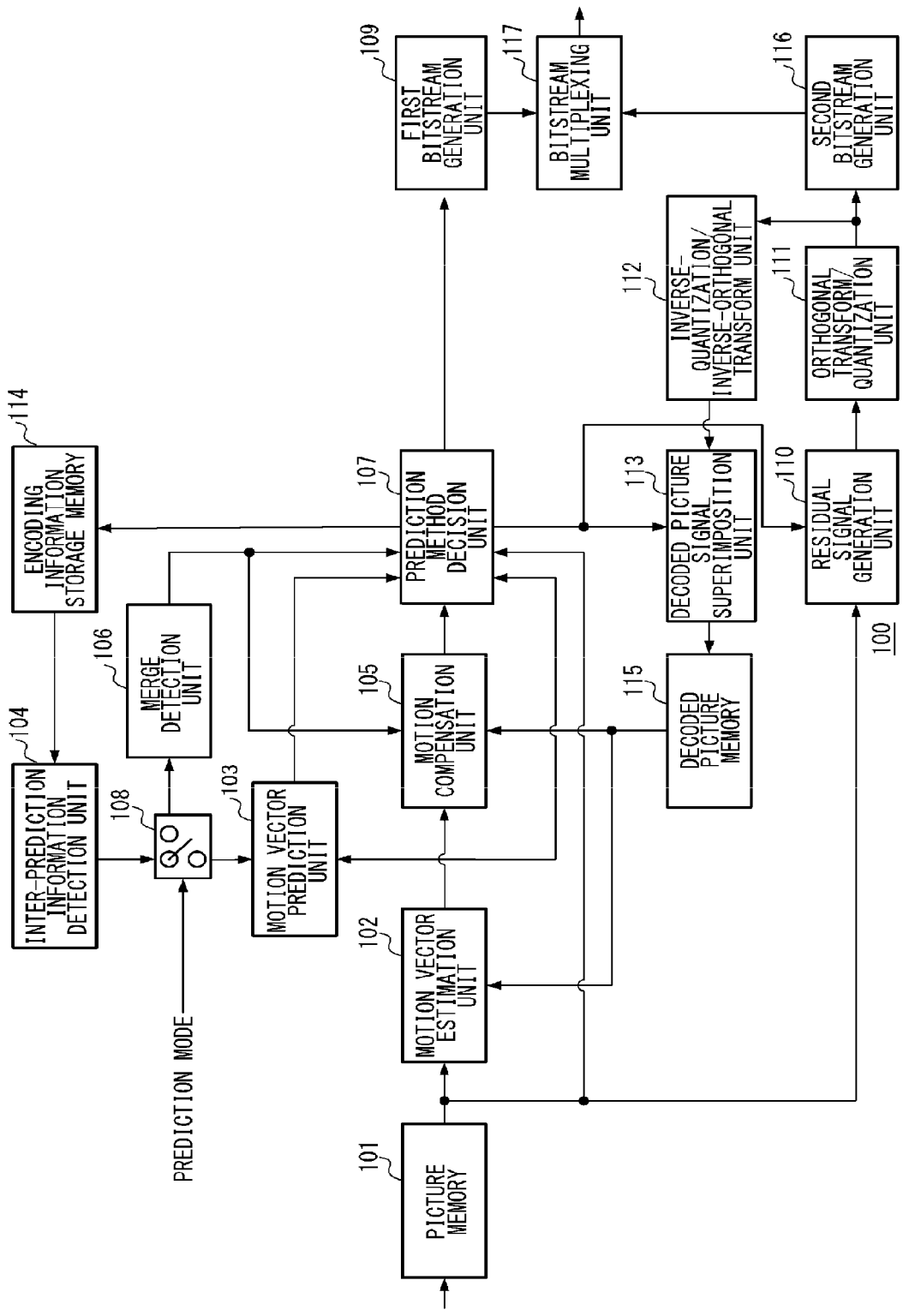
FIG. 2 is a block diagram showing the configuration of a moving picture coding device according to the embodiments of the present invention.

A description will be given of a moving picture coding device and a moving picture decoding device suitable to implement an embodiment of the invention. FIG. 2 is a block diagram showing the configuration of a moving picture coding device according to an embodiment. The moving picture coding device 100 includes an picture memory 101, a motion vector estimation unit 102, a motion vector prediction unit 103, an inter-prediction information detection unit 104, a motion compensation prediction unit 105, a merge detection unit 106, a prediction method decision unit 107, a switch 108, a first bitstream generation unit 109, a residual signal generation unit 110, an orthogonal transform/quantization unit 111, an inverse-quantization/inverse-orthogonal transform unit 112, a decoded picture signal superimposition unit 113, a coding information storage memory 114, a decoded picture memory 115, a second bitstream generation unit 116, and a bitstream multiplexing unit 117. Arrows in heavy lines connecting blocks indicate picture signals for pictures, and arrows in thin lines indicate the flow of parameter signals that control coding.

The picture memory 101 temporarily stores an picture signal subject to coding supplied in the order of shot/displayed time. The picture memory 101 supplies, in predetermined units of pixel blocks, the stored picture signal subject to coding to a motion vector estimation unit 102, the prediction method decision unit 107, and the residual signal generation unit 110. In this process, pictures stored in the order of shot/displayed time are rearranged in the order of coding and output from the picture memory 101 in units of pixel blocks.

Figure 3:
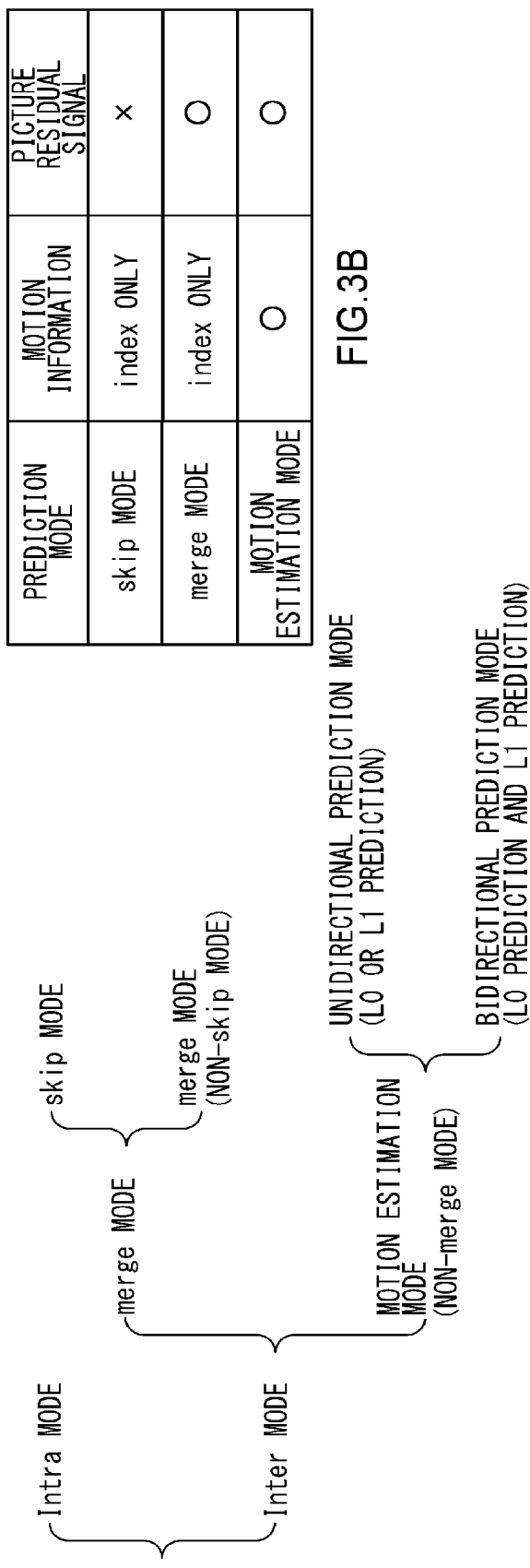
FIGS. 3A and 3B show classification of prediction modes according to the embodiments.

The motion vector estimation unit 102 estimates motion vectors for respective prediction blocks, organizing the vectors according to the prediction block size and prediction mode, by subjecting the picture signal supplied from the picture memory 101 and a decoded picture (reference picture) supplied from the decoded picture memory 115 to block matching. The motion vector estimation unit 102 supplies the estimated motion vectors to the motion compensation prediction unit 105, the motion vector prediction unit 103, and the prediction method decision unit 107. The prediction modes are generally organized as shown in FIG. 3A. Motion vectors in the unidirectional prediction mode or the bidirectional prediction mode shown in FIGS. 3A and 3B are detected. A description of prediction modes will be given later by defining a syntax.

When the prediction mode is the motion detection mode, the motion vector prediction unit 103 uses the motion vector included in the coding information output from the inter-prediction information detection unit 104 as a motion vector predictor. The motion vector prediction unit 103 derivates a motion vector difference from the motion vector estimated by the motion vector estimation unit 102 and the motion vector predictor. The motion vector prediction unit 103 supplies the derived motion vector difference to the prediction method decision unit 107. Further, the motion vector prediction unit 103 supplies an index identifying the selected motion vector predictor to the prediction method decision unit 107. The detailed configuration and operation of the motion vector prediction unit 103 will be described later.

The inter-prediction information detection unit 104 acquires, from the coding information storage memory 114, coding information of a coded prediction block located in the same picture as referred to by a target prediction block and immediately neighboring the target prediction block, and coding information of a prediction block neighboring a block located in another picture at a different point of time at a position equivalent to that of the target prediction block. The inter-prediction information detection unit 104 refers to the coding information of a coded immediately neighboring block and on an immediately neighboring block in another picture at a different point of time, which are stored in the coding information storage memory 114. The inter-prediction information detection unit 104 detects coding information of a plurality of neighboring blocks that are candidates of destinations of reference, based on positional information on the target prediction block. The inter-prediction information detection unit 104 supplies the coding information of the neighboring block selected as the reference target and an index identifying the neighboring block, switching the destination of supply according to the prediction mode input to the switch 108 and controlled by the moving picture coding device 100. The detailed configuration and operation of the inter-prediction information detection unit 104 will be described later.

The motion compensation prediction unit 105 uses the motion vector estimated by the motion vector estimation unit 102 or the coding information of the neighboring block detected by the inter-prediction information detection unit 104 and selected as the reference target, to generate a predicted picture signal from the reference picture by motion compensation prediction. The motion compensation prediction unit 105 supplies the predicted picture signal to the prediction method decision unit 107. In the case of bidirectional prediction, the motion compensation prediction unit 105 adaptively multiplexes two motion compensated predicted picture signals from L0 prediction and L1 prediction by weight factors, L0 prediction primarily being used for forward prediction, and L1 prediction primarily being used for backward prediction. The motion compensation prediction unit 105 superimposes the resultant signals so as to generate an ultimate predicted picture signal. The weight factors are defined for each slice or for each prediction block.

In the case that the prediction mode is the merge mode, the merge detection unit 106 rearranges the coding information in the prioritized order of selection, in order to use, as the coding information of the target prediction block, the coding information of the neighboring block (hereinafter, reference neighboring block) acquired by the inter-prediction information detection unit 104 and referred to by the target prediction block. The merge detection unit 106 adds the rearranged coding information in a list of candidates of reference. The merge detection unit 106 detects the coding information added in the list of candidates of reference as the coding information of the target prediction block. The merge detection unit 106 supplies the motion vector, reference picture number, reference list, etc. included in the detected coding information to the motion compensation prediction unit 105. Further, the merge detection unit 106 supplies an index identifying the reference neighboring block provided with the detected coding information to the prediction method decision unit 107. The detailed configuration and operation of the merge detection unit 106 will be described later.

The prediction method decision unit 107 decisions a prediction method from a plurality of prediction methods by evaluating the code size of the coding information of the reference neighboring block and of the index identifying the neighboring block, the amount of distortion between the motion compensated prediction signal and the picture signal, etc. The prediction method includes parameters such as an optimum prediction block size, partitioning mode (PartMode), prediction mode (PredMode). The prediction method decision unit 107 supplies coding information including information indicating the decisioned prediction method and including a motion vector difference dependent on the decisioned prediction method to the first bitstream generation unit 109. Details of the prediction block size, partitioning mode, and prediction model will be described later.

The switch 108 switchably supplies the coding information of the neighboring block detected by the inter-prediction information detection unit 104 and selected as the reference target either to motion vector prediction unit 103 or the merge detection unit 106 in accordance with the prediction mode controlled by the moving picture coding device 100. Further, the switch 108 stores coding information including information indicating the decisioned prediction method, a motion vector dependent on the decisioned prediction method, etc. to the coding information storage memory 114. The switch 108 supplies a motion compensated predicted picture signal dependent on the decisioned prediction mode to the residual signal generation unit 110 and the decoded picture signal superimposition unit 113.

The residual signal generation unit 110 subtracts the prediction signal from the picture signal subject to coding so as to generate a residual signal, and supplies the residual signal to the orthogonal transform/quantization unit 111. The orthogonal transform/quantization unit 111 subjects the residual signal to orthogonal transform and quantization so as to generate an orthogonally transformed, quantized residual signal. The orthogonal transform/quantization unit 111 supplies the residual signal to the second bitstream generation unit 116 and the inverse-quantization/inverse-orthogonal transform unit 112.

The first bitstream generation unit 109 encodes prediction method information decisioned by prediction method decision unit 107 and information on the motion vector difference decisioned by the prediction method information, according to a predefined syntax rule so as to generate the first stream and supplies the first bitstream to the bitstream multiplexing unit 117.

The difference between the predicted value of the coding information and the value actually used is supplied to the first bitstream generation unit 109 as necessary and coded therein. The difference includes a weighting parameter for weighting prediction supplied from the prediction method decision unit 107, a flag discriminating between frame/field prediction performed for interlace coding, a quantization parameter for quantization, a flag indicating whether the residual signal is coded, a flag discriminating a method of orthogonal transform, a flag discriminating the order of coding the residual signal, information on a post filter such as a deblocking filter, etc. Further, predicted coding information such as a flag discriminating the order of coding the residual signal is stored in the coding information storage memory 114.

The second bitstream generation unit 116 subjects the orthogonally transformed and quantized residual signal to entropy coding according to a predefined syntax rule so as to generate the second bitstream and supplies the second bitstream to the bitstream multiplexing unit 117. The bitstream multiplexing unit 117 multiplexes the first bitstream and the second bitstream according to a predefined syntax rule and outputs the resultant bitstream.

The inverse-quantization/inverse-orthogonal transform unit 112 subjects the orthogonally transformed and quantized residual signal supplied from the orthogonal transform/quantization unit 111 to inverse-quantization and inverse-orthogonal transform so as to derive the residual signal and supplies the residual signal to the decoded picture signal superimposition unit 113. The decoded picture signal superimposition unit 113 superimposes the prediction signal dependent on the decision by the prediction method decision unit 107 and the residual signal subjected to inverse-quantization and inverse-orthogonal transform by the inverse-quantization/inverse-orthogonal transform unit 112 one upon the other so as to generate a decoded picture. The decoded picture signal superimposition unit 113 stores the decoded picture in the decoded picture memory 115. The decoded picture may be subject to filtering for reducing distortion such as block distortion resulting from coding before being stored in the decoded picture memory 115. In this case, predicted coding information such as a flag for discriminating information on a post filter such as a deblocking filter is stored in the coding information storage memory 114 as necessary.

Figure 4:
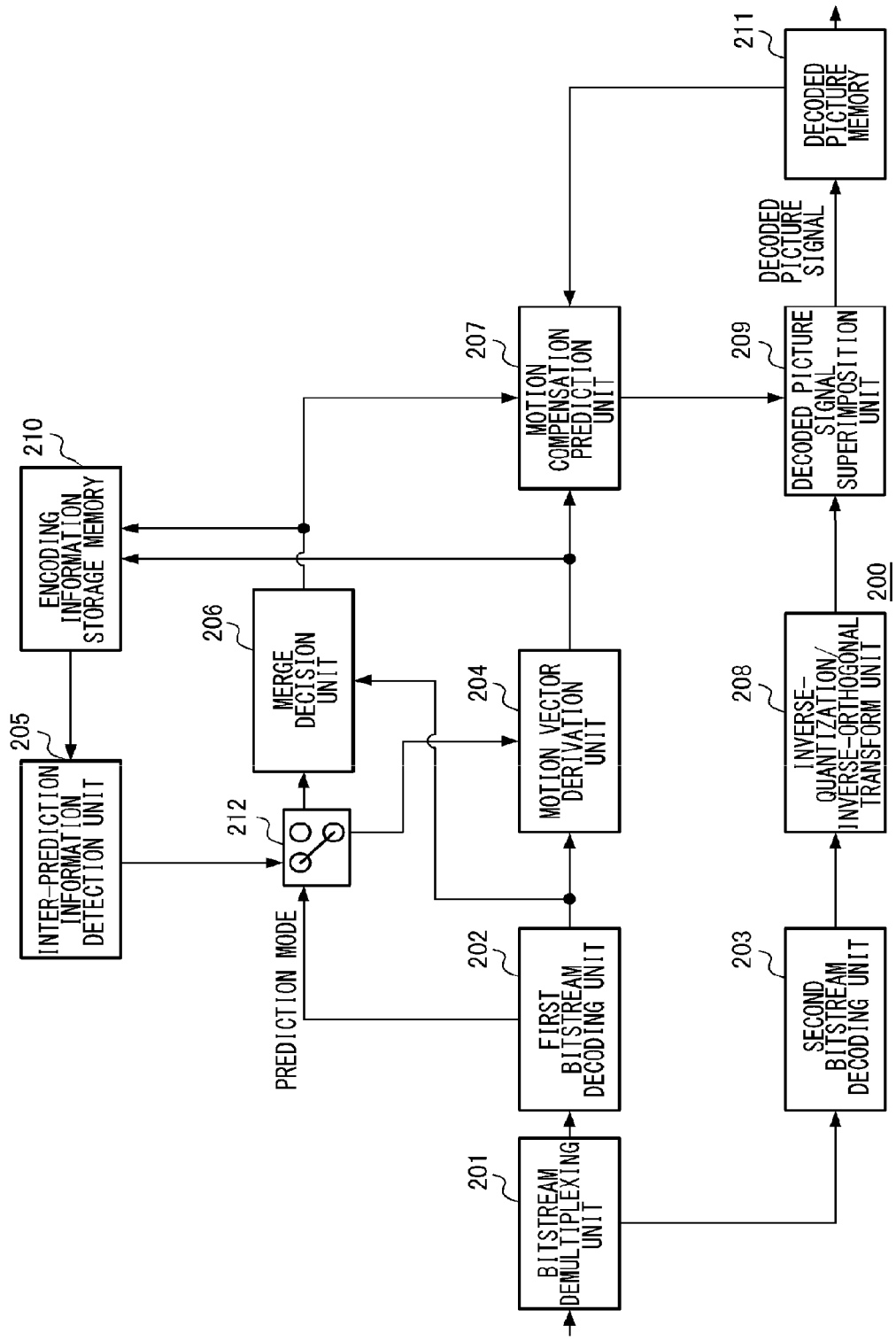
FIG. 4 is a block diagram showing the configuration of a moving picture decoding device according to the embodiments.

FIG. 4 is a block diagram showing the configuration of a moving picture decoding device 200 according to the embodiments corresponding to the moving picture coding device 100 of FIG. 2. The moving picture decoding device 200 includes a bitstream demultiplexing unit 201, a first bitstream decoding unit 202, a second bitstream decoding unit 203, a motion vector derivation unit 204, an inter-prediction information detection unit 205, a merge decision unit 206, a motion compensation prediction unit 207, an inverse-quantization/inverse-orthogonal transform unit 208, a decoded picture signal superimposition unit 209, a coding information storage memory 210, a decoded picture memory 211, and a switch 212. As in the moving picture coding device 100 of FIG. 2, arrows in heavy lines connecting blocks indicate picture signals for pictures, and arrows in thin lines indicate the flow of parameter signals that control coding.

The decoding process of the moving picture decoding device 200 of FIG. 4 corresponds to the decoding process provided in the moving picture coding device 100 of FIG. 2. Therefore, the motion compensation prediction unit 207, the inverse-quantization/inverse-orthogonal transform unit 208, the decoded picture signal superimposition unit 209, the coding information storage memory 210, and the decoded picture memory 211 of FIG. 4 have the same functions as the motion compensation prediction unit 105, the inverse-quantization/inverse-orthogonal transform unit 112, the decoded picture signal superimposition unit 113, the coding information storage memory 114, and the decoded picture memory 115 of the moving picture coding device 100 of FIG. 2, respectively.

The bitstream supplied to the bitstream demultiplexing unit 201 is demultiplexed according to a predefined syntax rule. The bitstreams resulting from demultiplexing are supplied to the first bitstream decoding unit 202 and the second bitstream decoding unit 203.

The first bitstream decoding unit 202 decodes the supplied bitstream so as to output coding information related to prediction mode, motion vector, etc. The first bitstream decoding unit 202 supplies the coding information to the motion vector derivation unit 204 or the inter-prediction information detection unit 205, and to the motion compensation prediction unit 207. The first bitstream decoding unit 202 also stores the coding information in the coding information storage memory 210.

The second bitstream decoding unit 203 decodes the supplied bitstream and derives the orthogonally transformed and quantized residual signal. The second bitstream decoding unit 203 supplies the orthogonally transformed and quantized residual signal to the inverse-quantization/inverse-orthogonal transform unit 208.

In the case that the prediction mode is the motion estimation mode, the motion vector derivation unit 204 uses the motion vector included in the coding information decisioned and output by the inter-prediction information detection unit 205 as a motion vector predictor. The motion vector derivation unit 204 derivates a motion vector from the motion vector difference derived by decoding in the first bitstream decoding unit 202 and from the motion vector predictor. The motion vector derivation unit 204 supplies the derivated motion vector to the motion compensation prediction unit 207 and the coding information storage memory 210.

The inter-prediction information detection unit 205 acquires, from the coding information storage memory 210, coding information of a coded prediction block located in the same picture as referred to by a target prediction block and immediately neighboring the target prediction block, and coding information of a prediction block neighboring a block located in another picture at a different point of time at a position equivalent to that of the target prediction block. The inter-prediction information detection unit 205 refers to the coding information of a coded immediately neighboring block and of an immediately neighboring block in another picture at a different point of time, which are stored in the coding information storage memory 210. The inter-prediction information detection unit 205 detects coding information of a plurality of neighboring blocks that are candidates of destinations of reference, based on positional information on the target prediction block. The inter-prediction information detection unit 205 supplies the coding information of the neighboring block selected as the reference target and an index identifying the neighboring block, switching the destination of supply according to the prediction mode input to the switch 212 and decoded by the moving picture decoding device 200. The detailed configuration and operation of the inter-prediction information detection unit 205 will be described later.

In the case that the prediction mode is the merge mode, the merge decision unit 206 rearranges the coding information such that the neighboring block is given priority, in order to use the coding information of the neighboring block acquired by the inter-prediction information detection unit 205 and referred to by the target prediction block as the coding information of the target prediction block. The merge decision unit 206 adds the rearranged coding information in a list of candidates of reference. The merge decision unit 206 detects, from the list of candidates of reference, the neighboring block designated by the index decoded by the first bitstream decoding unit 202 as identifying the reference neighboring block. The merge decision unit 206 supplies the coding information to the motion compensation prediction unit 207 and to the coding information storage memory 210. The detailed configuration and operation of the merge decision unit 206 will be described later.

The motion compensation prediction unit 207 uses the motion vector derivated by the motion vector derivation unit 204 or the coding information of the neighboring block detected by the merge decision unit 206 and selected as the reference target, to generate a predicted picture signal from the reference picture by motion compensation prediction. The motion compensation prediction unit 207 supplies the predicted picture signal to the decoded picture signal superimposition unit 209. In the case of bidirectional prediction, the motion compensation prediction unit 207 adaptively multiplexes two motion compensated predicted picture signals from L0 prediction and L1 prediction by weight factors. The motion compensation prediction unit 207 superimposes the resultant signals so as to generate an ultimate predicted picture signal.

The inverse-quantization/inverse-orthogonal transform unit 208 subjects the orthogonally transformed and quantized residual signal decoded by the first bitstream decoding unit 202 to inverse-quantization and inverse-orthogonal transform so as to obtain the inverse-orthogonally transformed and inverse-quantized residual signal.

The decoded picture signal superimposition unit 209 superimposes predicted picture signal subjected to motion compensation prediction by the motion compensation prediction unit 207 and the residual signal subjected to inverse-quantization and inverse-orthogonal transform by the inverse-quantization/inverse-orthogonal transform unit 208 one upon the other so as to derive a decoded picture signal. The decoded picture signal superimposition unit 209 stores the decoded picture signal in the decoded picture memory 211. The decoded picture may be subject to filtering for reducing, for example, block distortion resulting from coding before being stored in the decoded picture memory 211.

The switch 212 switchably supplies the coding information of the neighboring block detected by the inter-prediction information detection unit 205 and selected as the reference target either to motion vector derivation unit 204 or the merge decision unit 206 in accordance with the prediction mode decoded by the first bitstream decoding unit 202.

In the following description of the embodiments, details will be described of a method of using a common arrangement of immediately neighboring blocks, referred to in the motion vector prediction method and the merge method, in the inter-prediction information detection unit 104 of the moving picture coding device 100 and in the inter-prediction information detection unit 205 of the moving picture decoding device 200, and of selecting a reference neighboring block from the arrangement accordingly.

Before describing the method of selecting a reference neighboring block according to the embodiment of the present invention, terms used in the embodiment will be defined.

(Definition of Terms Used in the Present Invention)

Definition of a Coding Block

Figure 5:
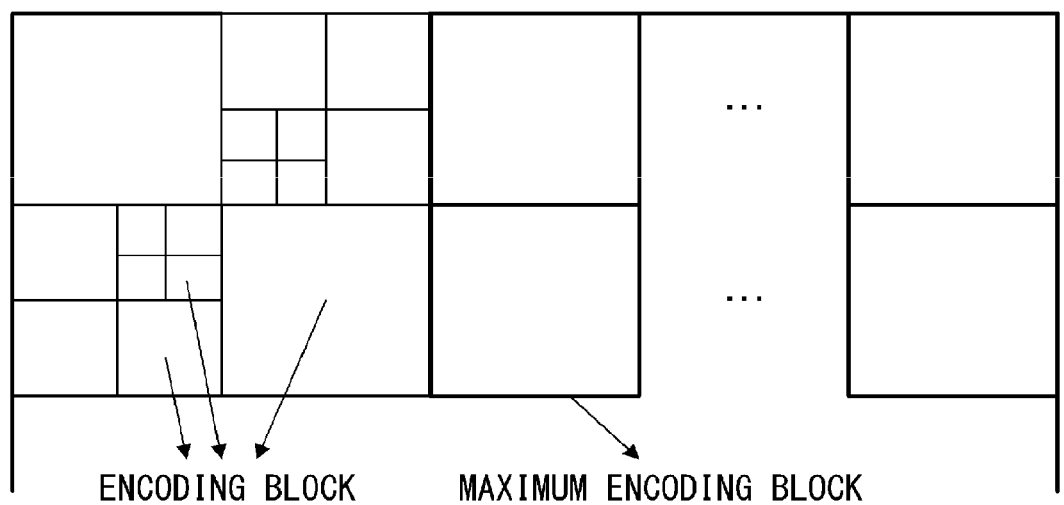
FIG. 5 illustrates how coding blocks are defined according to the embodiments.

In the embodiment, a screen is evenly partitioned into square blocks of equal sizes as shown in FIG. 5. The block will be referred to as a coding block, which is defined as a basic block in coding and decoding. Depending on the texture in the screen, a coding block may be quartered to produce coding blocks of smaller block sizes so as to optimize a coding process. Coding blocks resulting from partitioning the screen shown in FIG. 5 into equal sizes will be defined as maximum coding blocks. Blocks produced by quartering the maximum block depending on the coding condition will be generically referred to as coding blocks. coding blocks of the minimum size beyond which further quartering is prevented will be referred to as minimum coding blocks.

Definition of Prediction Block

Where a screen is partitioned for the purpose of motion compensation, smaller block sizes for motion compensation will result in more sophisticated prediction. In this respect, a scheme for motion compensation is adopted in which the optimum block size for motion compensation is selected from multiple block sizes. A block in which motion compensation is performed will be referred to as prediction block. A prediction block is used as a unit of partitioning the interior of a coding block. The maximum prediction block results when the interior of a coding block is not partitioned and is defined as one block instead. A coding block may be halved horizontally or vertically to produce two prediction blocks or quartered evenly in the horizontal and vertically directions to produce four prediction blocks. Different partition modes (PartMode) are defined depending on the method of partition (horizontal or vertical) and the partition type (number of partitions) and are shown in FIGS. 7A-7D. Numerals inside the rectangles of FIGS. 7A-7D denote ID Nos. for the prediction blocks resulting from the partition. Numerals starting with 0 are assigned to the prediction blocks in the minimum coding block in a predefined order, namely, from top to bottom and from left to right, for the purpose of managing the prediction blocks.

When motion estimation and compensation is performed in a coding block, a unit field of motion estimation and compensation may be the coding block itself, or a block recursively obtained by partitioning the coding block, namely, an individual block obtained by halving or quartering the coding block, or a prediction block of the minimum size obtained by defining the individual quarter block as the coding block and similarly partitioning that coding block. In the following description, a unit field of motion estimation and compensation will be referred to as a "prediction block" unless otherwise specified, regardless of the shape and size.

REFERENCE LIST

A description will be given of a reference list. In the process of coding or decoding, a reference picture number is designated from reference indices in each reference list LX and the reference picture thus identified is referred to. L0 and L1 are provided so that 0 or 1 may be substituted into X. Inter-prediction in which a reference picture added in the reference list L0 is referred to will be referred to as L0 prediction (Pred_L1). Motion compensation prediction in which a reference picture added in the reference list L1 is referred to will be referred to as L1 prediction (Pred_L1). L0 prediction is primarily used for forward prediction, and L1 prediction is primarily used for backward prediction. Only L0 prediction is available for P slices. For B slices, L0 prediction, L1 prediction, and bidirectional prediction in which L0 prediction and L1 prediction are averaged or added with weighting are available. It will be assumed in the processes described below that values with a suffix LX are output for each of L0 prediction and L1 prediction.

(Recording of Coding Information)

A description will now be given of recording of coding information such as a motion vector estimated by motion estimation and compensation. The coding information is comprised of information used for coding such as a motion vector, a reference list, a reference picture number indicating a reference picture added in the reference list, a prediction mode, etc. Motion estimation and compensation is performed in units of prediction blocks. The coding information such as a estimated motion vector is not recorded in units of prediction blocks but recorded in units of minimum prediction blocks. In other words, the same coding information is recorded in a plurality of minimum prediction blocks building a prediction block.

The size of a prediction block varies depending on the coding condition. Therefore, recording of the coding information in the coding information storage memory 114, 210 in units of prediction units requires additional information such as the position of a prediction block in the picture, the shape of the prediction block, etc. in addition to the estimated motion vector and makes access to acquire the coding information complicated. Therefore, disregarding redundancy caused by duplicate recording of information, access is made easily by partitioning a picture into minimum prediction blocks of equal sizes and recording the information in units of the minimum prediction blocks.

Figure 8:
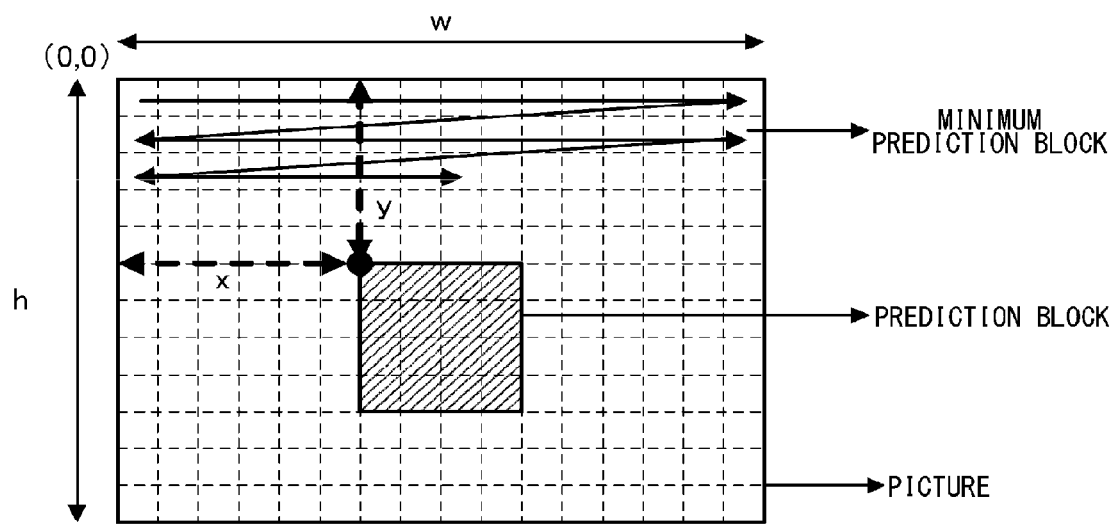
FIG. 8 shows a format of storing coding information in the coding information storage memory according to the embodiments.

FIG. 8 shows an example in which a picture is partitioned into minimum prediction blocks. The format of storage of coding information recorded in the coding information storage memory 114, 210 will be described with reference to FIG. 8. Referring to FIG. 8, w indicates a width of a picture, and h indicates a height of a picture. Given that the width and height of a minimum prediction block is p, the picture is comprised of a total of w/p minimum prediction blocks horizontally and a total of h/p minimum prediction blocks vertically. The coding information corresponding to each one of these minimum prediction blocks is stored in the coding information storage memory 114, 210 in the order of raster scan indicated by heavy lines in FIG. 8.

The rectangular area bounded by heavy lines in FIG. 8 will be defined as a prediction block (hatched area in FIG. 8). In a prediction block, coding information such as a motion vector is estimated by motion estimation. The detected coding information is recorded in those areas in the coding information storage memory 114, 210 that correspond to the minimum prediction blocks building the prediction block. Given that the leading address of the storage area in the coding information storage memory 114, 210 for recording coding information is represented by the origin located top left of FIG. 8, the leading position of the prediction block is represented by the solid circle in FIG. 8. Given that the leading position of the prediction block is located at a position displaced from the origin by x minimum prediction blocks toward right and y minimum prediction blocks toward bottom, the leading address of the prediction block is denoted by w/p×y+x. Starting at the minimum prediction block located at the leading position, the coding information of the prediction block is stored in the storage areas in the coding information storage memory 114, 121 that correspond to the minimum prediction blocks within the hatched prediction block. In this way, the same coding information is recorded in the storage areas in the coding information storage memory 114, 121 that correspond to the minimum prediction blocks in the prediction block.

A description will now be given of a syntax of a bitstream of moving pictures coded by the moving picture coding device provided with the method of selecting a reference neighboring block according to the embodiments.

(Definition of Syntax)

FIG. 3A shows classification of coding according to the prediction mode. Coding according to the Inter mode is further classified into the merge mode and the non-merge mode depending on whether a merge is used. The non-merge mode is a mode in which a motion vector is actually estimated by block matching, etc. and so can also be referred to as the motion estimation mode. The merge mode is further classified into the skip mode and non-skip mode. In the skip mode, the predicted picture signal predicted according to the coding information of the reference neighboring block is defined as the decoded picture so that the picture residual signal is at 0. As such, the skip mode requires coding and transmission of only an index indicating the reference target of the coding information and does not require coding and transmission of other information. The coding information referred to in the skip mode is the same as that of the merge mode. In this specification, the merge mode is defined as a mode in which the picture residual signal is coded and transmitted. Signals subject to coding in the Inter mode are classified as shown in FIG. 3B. Unlike the other modes, the skip mode does not require coding and transmission of an picture residual signal. Therefore, the code size of a flag used in mode decision can be reduced by making decision as to the skip mode than by making decision in the order that branches of prediction modes occur in FIG. 3A.

FIG. 6, mentioned above, shows a syntax pattern written for each prediction block in a slice. First, a flag skip_flag indicating whether the skip mode is used is set. If skip_flag is true (1), and if the total number of candidates of reference neighboring blocks NumMergeCand exceeds 1, the skip mode is applied, and a syntax element merge_idx, which is an index in a merge list, i.e., a list of candidates of reference neighboring blocks from which the coding information is acquired, is set. If NumMergeCand is 1, that one block will be the reference neighboring block so that the candidate of reference neighboring block is identified without transmitting merge_idx.

Subsequently, if the prediction mode in the prediction block is the Inter mode, a flag merge_flag indicating whether the merge mode is used is set. If merge_flag is true (1), and if the total number of candidates of reference neighboring blocks NumMergeCand exceeds 1, the merge mode is applied, and a syntax element merge_idx, which is an index in a merge list, i.e., a list of candidates of reference neighboring blocks from which the coding information is acquired, is set. If NumMergeCand is 1, that one block will be the reference neighboring block so that the candidate of reference neighboring block is identified without transmitting merge_idx.

If merge_flag is false (0), the merge mode is not applied. Normal motion vector estimation is performed and coding information such as a motion vector, reference picture number, etc. is transmitted (corresponding to the motion estimation mode). For each prediction block a reference list used in coding and decoding is selected in accordance with the slice type of a slice to which the prediction block belongs is selected. If the slice type slice slice_type is "B", inter_pred_flag, which indicates unidirectional prediction or bidirectional prediction, is set.

inter_pred_flag is set to Pred_L0 (L0 prediction), Pred_L1 (L1 prediction), or Pred_BI (bidirectional prediction). The reference list LX (X=0 or 1) is set in accordance with inter_pred_flag. For each reference list set, a syntax element ref_idx_lX, which indicates a reference picture number, and a syntax element mvc_lX[i], which indicates a motion vector difference representing a difference between a motion vector and a motion vector predictor in a neighboring block immediately neighboring the prediction block, are set. X is either 0 or 1 and denotes a reference list, i denotes a component of the motion vector difference; i=0 means the x component and i=1 means the y component.

If the total number of candidates of motion vector predictors NumMvpCand (LX) exceeds 1, a syntax element mvp_idx_lX, which is an index in a MVP list listing candidates of motion vector predictors referenced, is set. NumMvpCand (LX) is a function for deriving the total number of candidates of motion vector predictors for the prediction block identified in the reference list LX (X is 0 or 1). If the method of predicting a motion vector identifies the total number of candidates of motion vector predictors NumMvpCand (LX) as 1, the index mvp_idx_lX is not set or coded. This is because, if the total number of motion vector predictors is 1, that one candidate will be a motion vector predictor so that the candidate of a motion vector predictor that should be referred to is identified without transmitting mvp_idx_lX. coding and decoding of a bitstream of moving pictures are enabled according to the syntax described above.

Figure 9A:
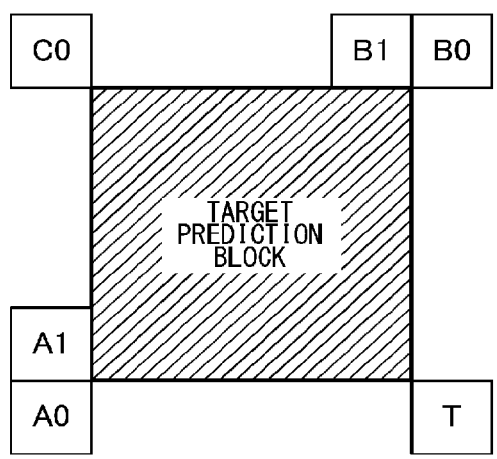
FIGS. 9A and 9B illustrate the arrangement of neighboring blocks referred to by the target prediction block according to the embodiments.
Figure 9B:
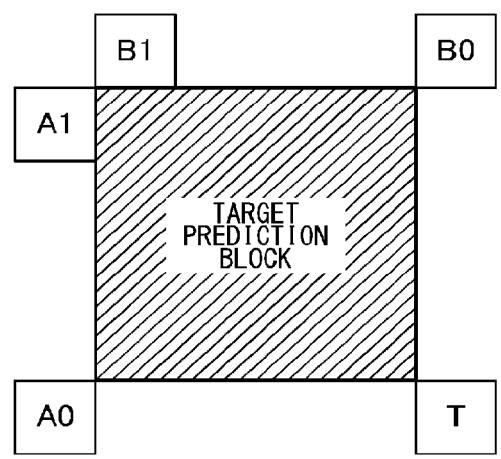

FIGS. 9A and 9B show exemplary immediately neighboring blocks provided with a motion vector predictor referred to in the motion estimation mode or immediately neighboring blocks referred to for coding information in the merge mode. FIGS. 9A and 9B shows blocks neighboring a target prediction block as minimum prediction blocks.

This scheme is advantageous in accessing the coding information already coded and recorded in the coding information storage memory 114, 210, using the position and size of the target prediction block (width and height of the block) as a key. Those blocks neighboring the target prediction block shown in FIGS. 9A and 9B to the left are denoted by "A", and those blocks neighboring above are denoted by "B". Suffix numerals indicate the position.

"Blok T" represents an exemplary block neighboring a block located in another picture at a different point of time at a position equivalent to that of the target prediction block. In this embodiment, it will be assumed that block T is defined to neighbor the target prediction block in the bottom right direction in another picture. If the position of the target prediction block results in block T being located outside the picture, block T is defined at the position of a minimum prediction block in another picture near the center of the target prediction block. FIG. 9A shows that five neighboring blocks in the space of the same picture are defined as candidates. A total of six candidates, including the candidate located in another picture at a different point of time, form the set. FIG. 9B shows that four neighboring blocks in the space of the same picture are defined as candidates. A total of five candidates, including the candidate located in another picture at a different point of time, form the set.

Figure 1A:
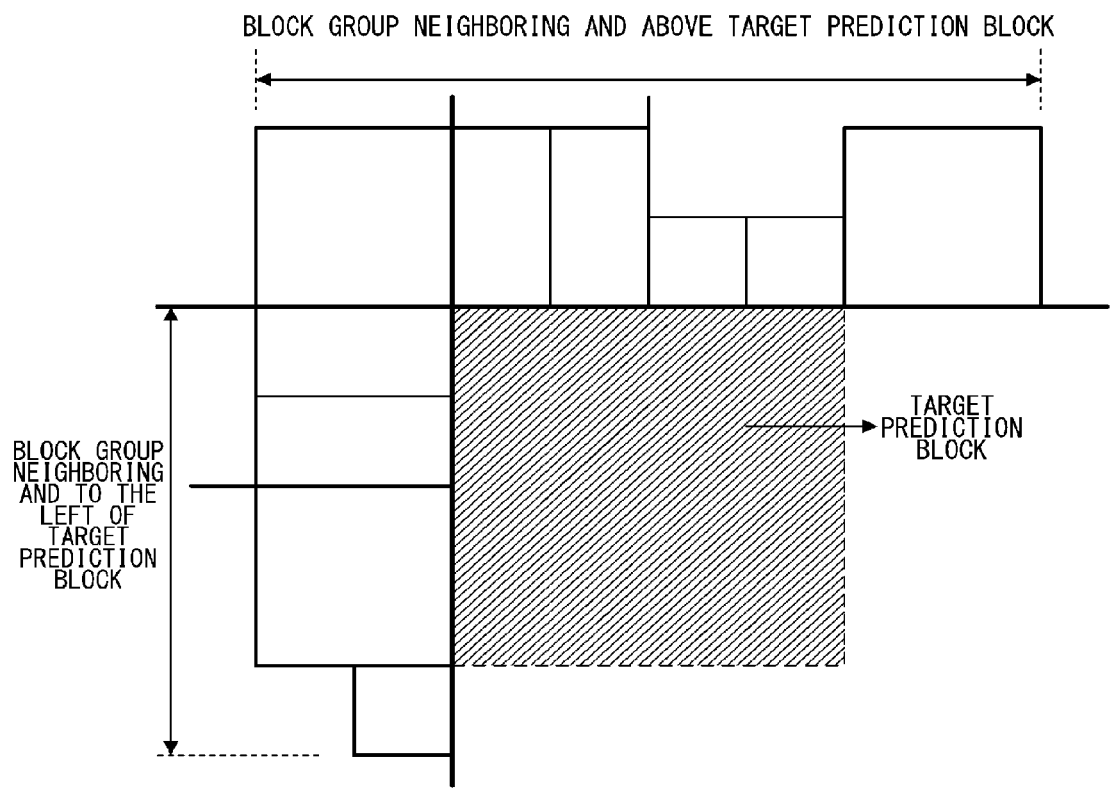
FIGS. 1A and 1B show exemplary prediction blocks neighboring the target prediction block in the same picture, and in a picture at a different point of time, respectively.
Figure 1B:
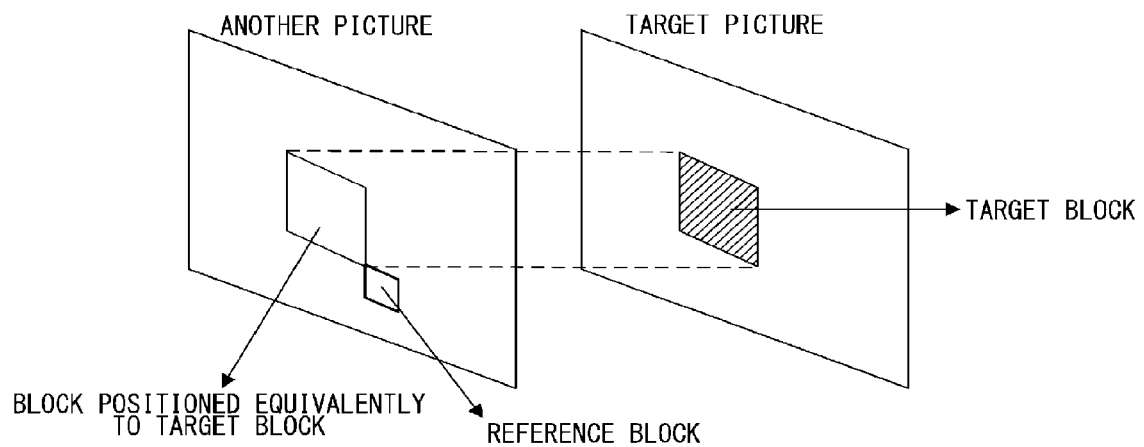

All of the neighboring blocks may be defined as candidates as in FIG. 1. Given that a target prediction block is of a size 64×64 pixels and the size of a block for which the coding information is stored in the coding information storage memory 114, 210 is 4×4 pixels, a total of sixteen blocks neighboring the target prediction block to the left, a total of sixteen blocks above, and three blocks at respective corners will represent neighboring blocks that are referred to. For hardware implementation, factors such as the maximum frequency of memory accesses expected, memory size, and processing volume (processing time) should be considered.

In this embodiment, the number of candidates for reference is reduced by defining only one block neighboring the target block to the left and one block neighboring above, as shown in FIG. 9A. Blocks neighboring the target block in the bottom left direction, top right direction, and top let direction are additionally defined as candidates. In FIG. 9B, the number of candidates for reference is reduced by defining only one block neighboring the target block to the left and one block neighboring above, the defined blocks being different from those in FIG. 9A. Blocks neighboring the target block in the bottom left direction and top right direction are additionally defined as candidates.

By limiting the candidates in advance as described above, the frequency of memory accesses, memory size, and processing volume (processing time) can be advantageously reduced without substantially reducing the coding efficiency. The third and subsequent embodiments described later are capable of reducing the frequency of memory accesses, memory size, and processing volume (processing time) and, moreover, reducing the code size of the merge indices and MVP indices and so can advantageously reduce the size of codes generated. Another aspect of the embodiments is that commonly positioned candidates are used in the merge mode and in the motion estimation mode so that the frequency of memory accesses, memory size, and processing volume (processing time) are further reduced.

It will be assumed that the following description will refer to the exemplary arrangement of FIG. 9A. To use the exemplary arrangement of FIG. 9B, the same steps as performed for the exemplary arrangement of FIG. 9A can be performed by disregarding C0 in the following description. Any arrangement of reference neighboring blocks may be used so long as inconsistency does not occur in the moving picture coding device 100 and in the moving picture decoding device 200. It will also be assumed that the coding information of the reference neighboring blocks are already coded in the moving picture coding device 100 and already decoded in the moving picture decoding device 200. Any information may suffice so long as it can be recorded in the coding information storage memory 114, 210.

Figure 10:
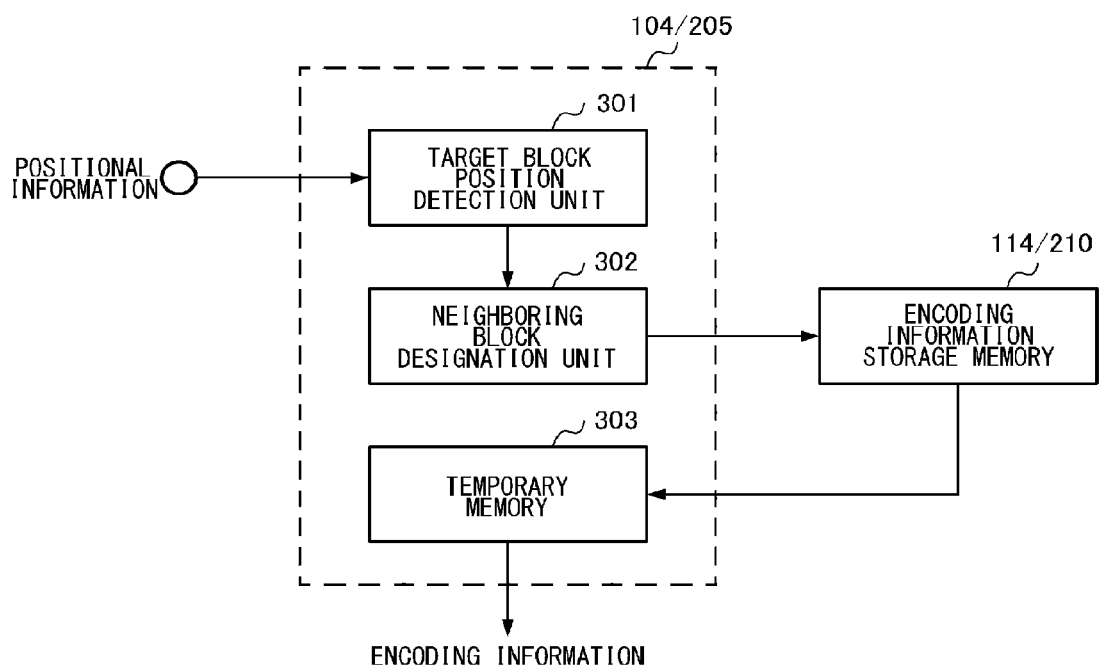
FIG. 10 shows the detailed configuration of the inter-prediction information detection unit according to the embodiments.

FIG. 10 shows the details of the inter-prediction information detection unit 104, 205, according to the first embodiment, respectively shown in FIG. 2, which illustrates the configuration of the moving picture coding device 100, and in FIG. 4, which illustrates the configuration of the moving picture decoding device 200. The part bounded by the heavy dotted line in FIG. 10 represents the inter-prediction information detection unit 104, 205, which will be described with reference to this drawing. The inter-prediction information detection unit 104, 205 includes a target block position detection unit 301, a neighboring block designation unit 302, and a temporary memory 303. A description will now be given of the steps whereby candidates positioned as shown in FIG. 9A are commonly used in the merge mode and in the motion estimation, and the coding information of the neighboring blocks in the arrangement of FIG. 9A is acquired from the coding information storage memory 114, 210.

Initially, information on the intra-picture position and size of a target prediction block is input to the target block position detection unit 301. Defining the top left pixel in the picture as the origin, the position of a target prediction block is represented by the pixel-based horizontal and vertical distances of the target prediction block relative to the top left pixel. The width and height of the target prediction block is derivated based on PartMode, which indicates the mode of partition of a target coding block, and on the number of times that the coding block is recursively partitioned. The positions of the reference neighboring blocks referred to by the target prediction block are then derivated.

The neighboring block designation unit 302 accesses the coding information storage memory 114, 210, using the derivated positions of the neighboring block. The neighboring block designation unit 302 reads the coding information associated with the positions of neighboring blocks shown in FIG. 9A into the temporary memory 303. The temporary memory 303 is a memory provided inside the inter-prediction information detection unit 104, 205 to record the coding information of reference neighboring blocks referred to by the target prediction block. If the derivated position of the neighboring block is outside the screen, the block is nonexistent so that "0" is recorded in the temporary memory 303.

By using commonly positioned candidates in the merge mode and in the motion estimation mode, the volume of coding information of neighboring blocks processed for storage in the temporary memory 303 on the coding side is reduced. It will also be unnecessary to change the prediction method for each prediction mode and access the coding information storage memory 114 each time to acquire necessary coding information of the neighboring block. The benefit on the decoding side is that it is possible to start the process of storing the coding information of the neighboring block in the temporary memory 303 before making a decision as to whether the merge mode or the motion estimation mode is used so that the speed of the decoding process is improved.

In the moving picture coding device 100 and the moving picture decoding device 200 provided with the method of selecting coding information according to the embodiments, the coding information such as a motion vector and a reference picture number of the target prediction block are not directly coded but the coding information of the immediately neighboring block already coded/decoded and stored in the coding information storage memory 114, 210 are referred to and used. By coding the index indicating the position of the reference neighboring block or the index indicating the motion vector predictor for predicting the motion vector, the code size of the coding information is reduced. A description will be given below, by way of specific examples, of a method of referring to, in the coding process, the coding information of the neighboring block acquired by the inter-prediction information detection unit 104, 205 to derive an index indicating the position of the reference neighboring block and an index indicating the motion vector predictor for predicting the motion vector, and a method of acquiring, in the decoding process corresponding to the coding process, the coding information based on the index indicating the position of the reference neighboring block and the index indicating the motion vector predictor for predicting the motion vector.

(First Embodiment)

Figure 11:
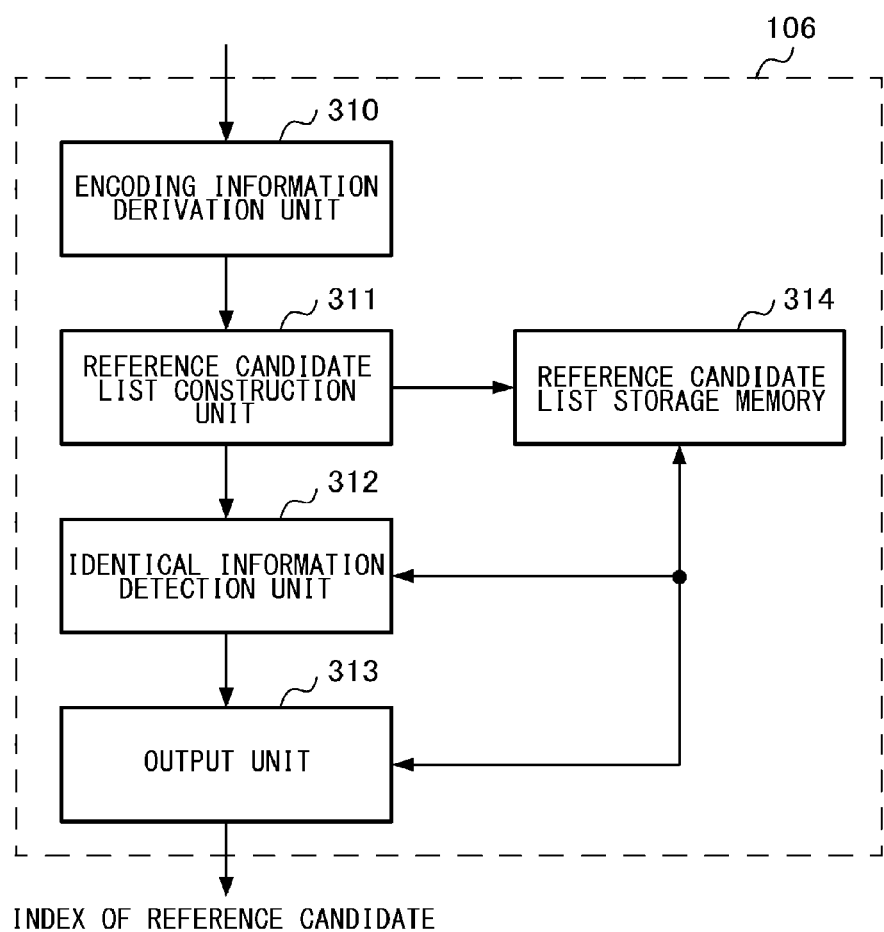
FIG. 11 is a block diagram showing the detailed configuration of the merge detection unit according to the first embodiment.

A description will first be given of the merge detection unit 106 according to the first embodiment shown in FIG. 2 illustrating the configuration of the moving picture coding device 100. FIG. 11 shows the detailed configuration of the merge detection unit 106. The part bounded by the heavy dotted line in FIG. 11 represents the merge detection unit 106 and a description will be given with reference to this drawing. The merge detection unit 106 includes a coding information derivation unit 310, a reference candidate list construction unit 311, an identical information detection unit 312, an output unit 313, and a reference candidate list storage memory 314.

Initially, the destination of the output of the inter-prediction information detection unit 104 is switched to the merge detection unit 106 according to the prediction mode input to the switch 108 and controlled by the moving picture coding device 100. The coding information of the reference neighboring blocks referred to by the target prediction block and stored in the temporary memory 303 in the inter-prediction information detection unit 104 is input to the coding information derivation unit 310.

Figure 12:
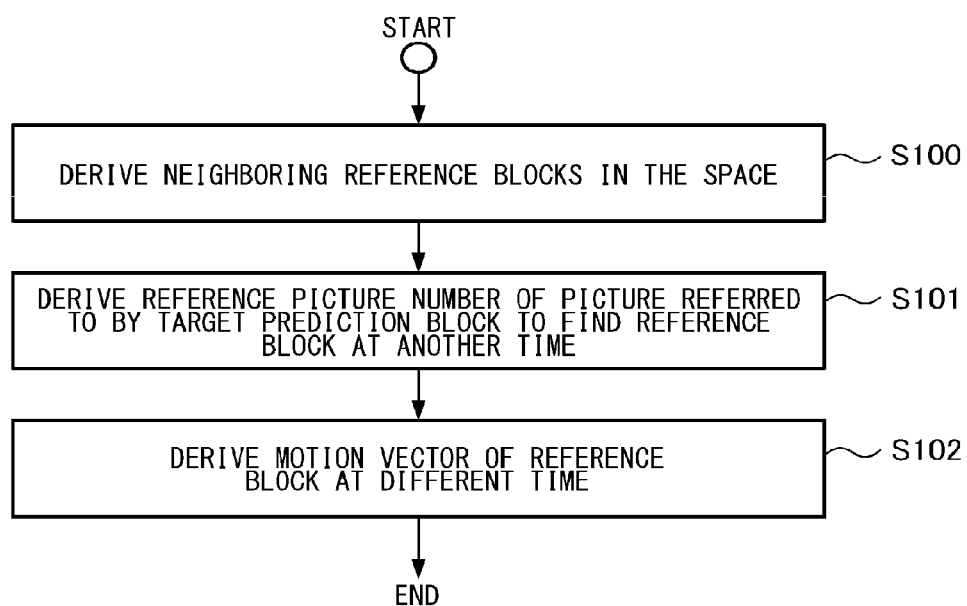
FIG. 12 is a flowchart showing the operation of the coding information derivation unit of the merge detection unit according to the first embodiment.

The operation of the coding information derivation unit 310 will be described using the flowchart of FIG. 12. The initially input coding information of the neighboring blocks is examined to decision whether the coding information of the neighboring block located in the same picture as the target prediction block is available and the coding information is derived accordingly (S100).

Figure 13:
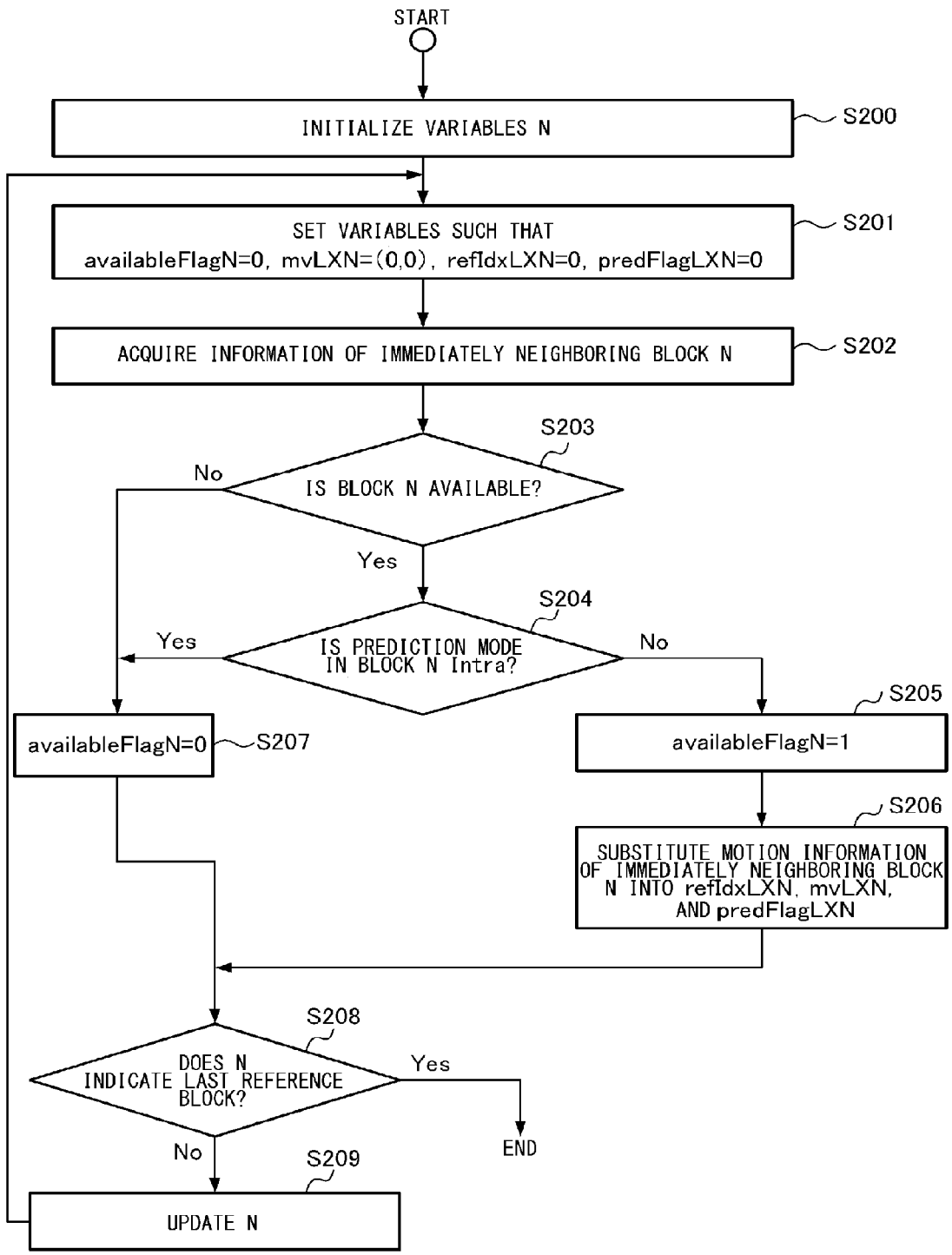
FIG. 13 is a flowchart showing the operation performed in the coding information derivation unit according to the first embodiment to select an immediately neighboring block in the same picture.

FIG. 13 shows the detailed flow of decision for each neighboring block located in the same picture as the target prediction block. First, a variable N is initialized (S200). Neighboring blocks A1, B1, B0, A0, and C0 shown in FIG. 9A as being located in the same picture are substituted into the variable N. It will be assumed that the variable is initially set such that N=A1 and updated in the order B1, B0, A0, and C0.

Subsequently, variables for storing the coding information of the neighboring block used in subsequent decision are initialized. The variables include: a flag availableFlagN indicating whether the neighboring block is available; a motion vector mvLXN; a reference picture number refIdxLXN; and a flag predFlagLXN indicating the availability of a reference list. The variables are initialized as follows (S201).

availableFlagN=0
mvLXN=(0,0)
refIdxLXN=0
predFlagLXN=0 where 0 or 1, indicating a reference list, is substituted into the suffix X. The position and coding information of the neighboring block with the variable N (hereinafter, referred to as the neighboring block N) are acquired (S202).

A decision is made as to whether the neighboring block N is available based on the acquired position of the neighboring block N (S203). For example, if the target prediction block is located at the left edge of the picture, there will be no neighboring blocks to the left of the target prediction block so that there should not be corresponding coding information in the coding information storage memory 114. In this case, a decision of unavailability is made. If the neighboring block N is unavailable (N in S203), availableFlagN is set to "0" (S207). If the neighboring block N is available (Y in S203), a decision is made as to whether the prediction mode in the neighboring mode N is the intra-picture coding (Intra) mode (S204).

If the prediction mode of the neighboring block N is Intra (Y in S204), availableFlagN is set to "0" (S207). If the prediction mode of the neighboring block N is not Intra (N in S204), availableFlagN is set to "1" (S205). Subsequently, the coding information of the neighboring block N is substituted into refIdxLXN, mvLXN, and predFlagLXN (S206).

When the decision step is completed for the neighboring block N, a decision is made as to whether the variable N indicates the last neighboring block (S208). Since the variable N is updated in the order A1, B, B0, A1, and C0, a decision is made as to whether N is C0. If N is C0 (Y in S208), it means that all neighboring blocks have been subjected to decision so that the process is terminated. If N is not C0(N in S208), N is updated (S209). N is updated in the aforementioned order of neighboring blocks so that step S201 and the subsequent steps are repeated for the neighboring block N. As described above, immediately neighboring blocks located in the same picture as the target prediction block are defined as reference blocks and the coding information thereof is derived.

Referring back to FIG. 12, the reference picture number of another picture occurring at a different point of time and referred to by the target prediction block as a merge candidate is decisioned (S101). This step is performed to decision a reference picture referred to for inter-prediction in the target prediction block, which is performed by referring to the motion vector for the block neighboring a block located in another picture at a different point of time at a position equivalent to that of the target prediction block. In this process, the reference picture number of the picture referred to by the target prediction block is decisioned by referring to the coding information of the neighboring blocks already coded. A description will be given here of a method based on the coding information the neighboring blocks in the same picture derived in the preceding step (S100) with reference to FIG. 14.

First, the four neighboring blocks derived in step S100 are categorized into three groups. Blocks neighboring the target prediction block to the left are defined as Group A blocks, blocks neighboring above are defined as Group B blocks, and blocks neighboring at the corner are defined as Group C blocks, so that decision is made in each of the groups.

The steps in Group A will be explained with reference to FIG. 14A. Since the neighboring block belonging to Group A is A1, the flag availableFlagA1, indicating whether A1 derived in step S100 is available, is examined (S300). If availableFlagA1 is 1 (Y in S300), refIdxLXA, i.e., the reference picture number refIdxLXA of Group A is defined as the reference picture number of A1. Otherwise (N in S300), refIdxLXA is set to −1 indicating lack of reference picture number.

Similarly, the steps in Group B will be explained with reference to FIG. 14B. Since the neighboring block belonging to Group B is B1, the flag availableFlagB1, indicating whether B1 derived in step S100 is available, is examined (S301). If availableFlagB1 is 1 (Y in S301), refIdxLXB, i.e., the reference picture number refIdxLXB of Group B is defined as the reference picture number of B1. Otherwise (N in S301), refIdxLXB is set to −1.

Neighboring blocks belonging to Group C include B0 and C0. As shown in FIG. 14C, a decision is made in the order B0, A0, and C0. As in the case of A1, B1, the flag availableFlagB0 of B0 is examined (S302). If availableFlagB0 is 1 (Y in S302), refIdxLXC, i.e., the reference picture number refIdxLXC of Group C is defined as the reference picture number of B0. Otherwise (N in S302), the flag availableFlagA0 of A0 is examined (S303). If availableFlagA0 is 1 (Y in S303), the reference picture number refIdxLXC of Group C is defined as the reference picture number of B0. Otherwise (N in S303), the flag availableFlagC0 of C0 is examined (S304). If availableFlagC0 is 1 (Y in S304), refIdxLXC, i.e., the reference picture number refIdxLXC of Group C is defined as the reference picture number of C0. Otherwise (N in S304), refIdxLXC is set to −1.

In the absence of the block at the position of C0 as in the case of the neighboring blocks on the same picture shown in FIG. 9B, a decision is made on two neighboring blocks including B0 and A0. By majority vote or by selecting the minimum value from the reference picture numbers refIdxLXN (N is A, B, or C) of the respective groups, the reference picture number of the block neighboring the block located in another picture at a different point of time at a position equivalent to that of the target prediction block is decisioned.

FIG. 15 shows decision based on the reference picture number refIdxLXN. The description will be given from top to bottom in FIG. 15. Lines 1-4 indicate cases where refIdxLXN of different blocks contains the same value. In this case, selection is made by majority vote. Line 1 indicates a case where refIdxLXN of all blocks contains the same value. If refIdxLXN is set to −1, 0 is selected. Otherwise, the value of refIdxLXA is selected. Lines 2-4 indicate cases where refIdxLXN of two of the three blocks contains the same value. If the same value is −1, the value in the remaining refIdxLXN is used. Otherwise, the same value contained in refIdxLXN of the two blocks is used.

Lines 5-8 indicate cases where refIdxLXN of the blocks does not contain the same value. The minimum of the values contained is selected. Of the three blocks, the block in which refIdxLXN is set to −1 is excluded so that the smallest reference picture number is selected. The reference picture number of the picture that should be referred to by the target prediction block is decisioned as described above. Other methods may be used.

Figure 16:
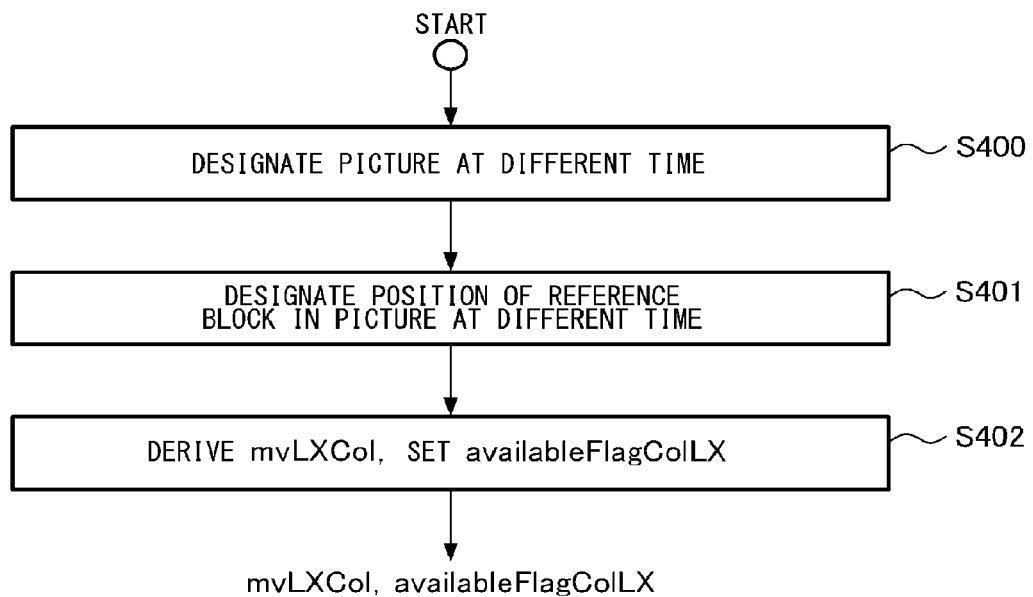
FIG. 16 is a flowchart showing the operation performed in the coding information derivation unit according to the first embodiment to select coding information of a block neighboring a block located in another picture at a different point of time at a position equivalent to that of the target prediction block.

Referring back to FIG. 12, a decision is made as to the availability of the coding information of the block neighboring a block located in another picture at a different point of time at a position equivalent to that of the target prediction block, and the coding information is derived accordingly (S102). FIG. 16 shows the detailed flow of decision for a neighboring block located in a picture different from that of the target prediction block. First, another picture at a different point of time from the picture including the target prediction block is designated (S400). If the slice including the target prediction block is a P slice, only L0 prediction is available so that the picture indicated by the reference picture number 0 in the reference list for L0 is designated. In the case of a B slice, one of L0 prediction and L1 prediction or L0 and L1 bidirectional prediction is available. The picture indicated by the reference picture number 0 in the reference list for one of L0 and L1 is designated. Designation of another picture at a different point of time in the case of a B slice is not discussed here. For example, a parameter designating which reference list should be referred to may be inserted in the B slice.

Subsequently, the position of a block neighboring a block located in another picture at a different point of time at a position equivalent to that of the target prediction block is designated (S401). In the first embodiment, the reference neighboring block "T" shown in FIG. 9A is defined as a block neighboring a block located in another picture at a different point of time at a position equivalent to that of the target prediction block. Therefore, the width and height of the target prediction block are derived based on the position of the target prediction mode, PartMode, which indicates the mode of partition, and the number of times of partition, and the position of the neighboring block "T" is derived accordingly. If the derived position of the neighboring block is outside the picture, the position is defined at a position in another picture at a different point of time near the center of the block identically located as the target prediction block. In the following description, another picture at a different point of time is defined as a col picture, and the block neighboring the block located in that picture to correspond to the target prediction block is defined as a col block. The associated motion vector and reference picture number are suffixed with "Col".

The coding information storage memory 114 is accessed to read the coding information of a col block, using, as keys, a col picture and the position of a col block located therein to neighbor the block corresponding to the target prediction block. A decision is made as to whether the coding information is available and the motion vector is derived accordingly (S402).

Figure 17:
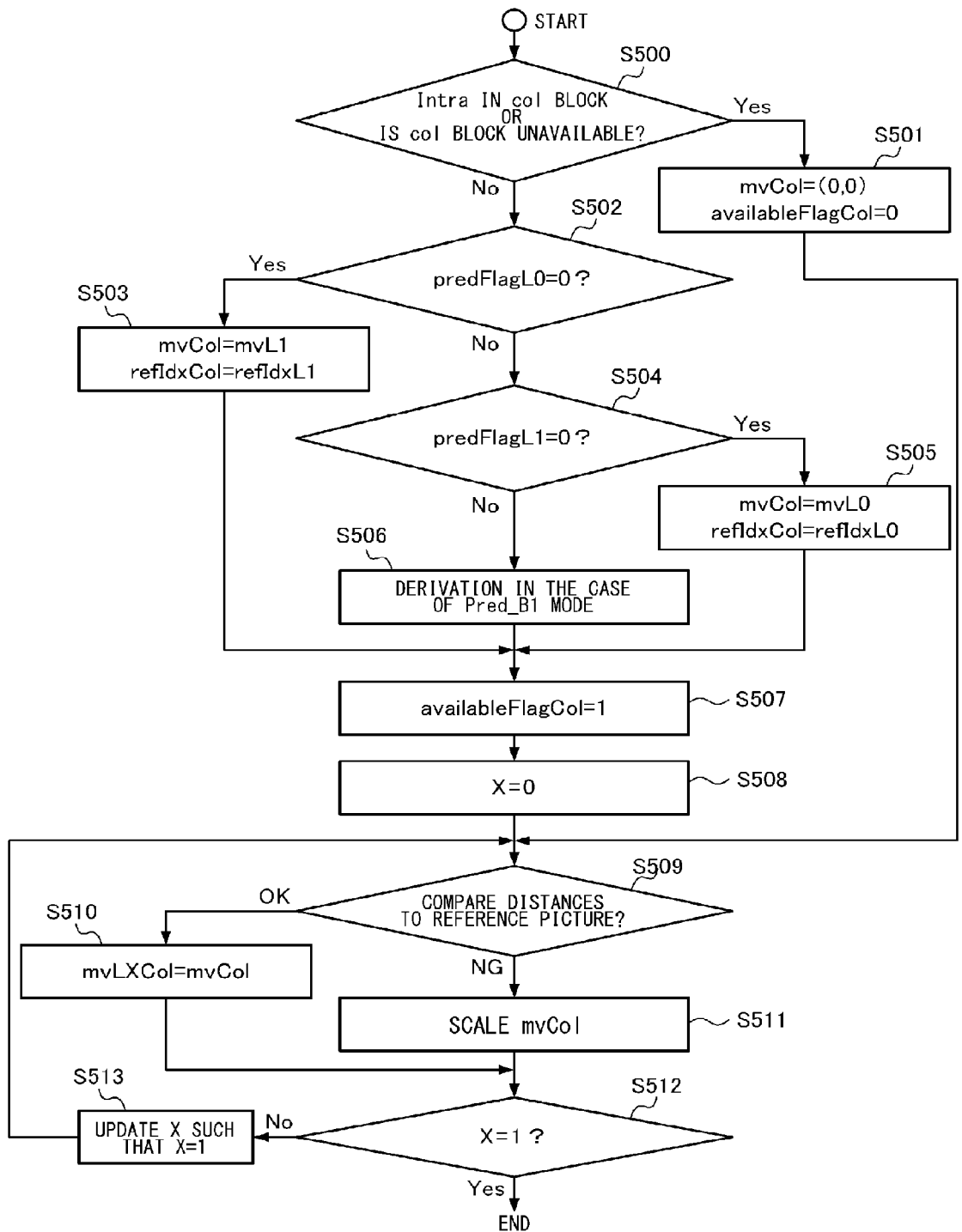
FIG. 17 is a flowchart showing the detailed operation performed in the coding information derivation unit according to the first embodiment to derivate coding information of a block neighboring a block located in another picture at a different point of time at a position equivalent to that of the target prediction block.

FIG. 17 shows detailed steps for derivation, which will be described with reference to this drawing. A decision is made as to whether a col block is available by referring to the coding information and position of a col block read from the coding information storage memory 114 (S500). If a col block is nonexistent, or if the prediction mode of a col block is Intra (Y in S500), the base motion vector mvCol of a col block is set to (0,0), the base availability flag availableFlagCol is set to 0 (S501), and control proceeds to step S509. Otherwise (N in S500), predFlagL0, which indicates the availability of the L0 reference list of a col block is examined (S502).

If predFlagL0 is 0 (Y in S502), L0 prediction is unavailable so that the coding information from L1 prediction is selected, mvCol is set to mvL1. , the base reference picture number refIdxCol is set to refIdxL1 (S503), and control proceeds to step S507. Otherwise (N in S502), i.e., if L0 prediction is available, the flag predFlagL1, indicating the availability of the L1 reference list of a col block is examined (S504).

If predFlagL1 is 0 (Y in S504), L1 prediction is unavailable so that the coding information from L0 prediction is selected, mvCol is set to mvL0, refIdxCol is set to refIdxL0 (S505), and control proceeds to step S507. Otherwise (N in S504), i.e., if both L0 prediction and L1 prediction are available, control proceeds to derivation in the case of Pred_BI mode (S506). For derivation in the case of Pred_BI mode, one of L0 prediction and L1 prediction is selected.

L0 or L1 may be selected by selecting the reference list containing a col picture selected in step S500; or selecting the reference picture referred to in L0 prediction in a col block or the reference picture referred to in L1 prediction in a col block, whichever is at a smaller inter-picture distance from a col picture; or finding intersection of a motion vector for L0 prediction or L1 prediction in a col block with the picture containing the target block (hereinafter, target picture) and selecting a prediction type that results in the intersection.

Figure 18:
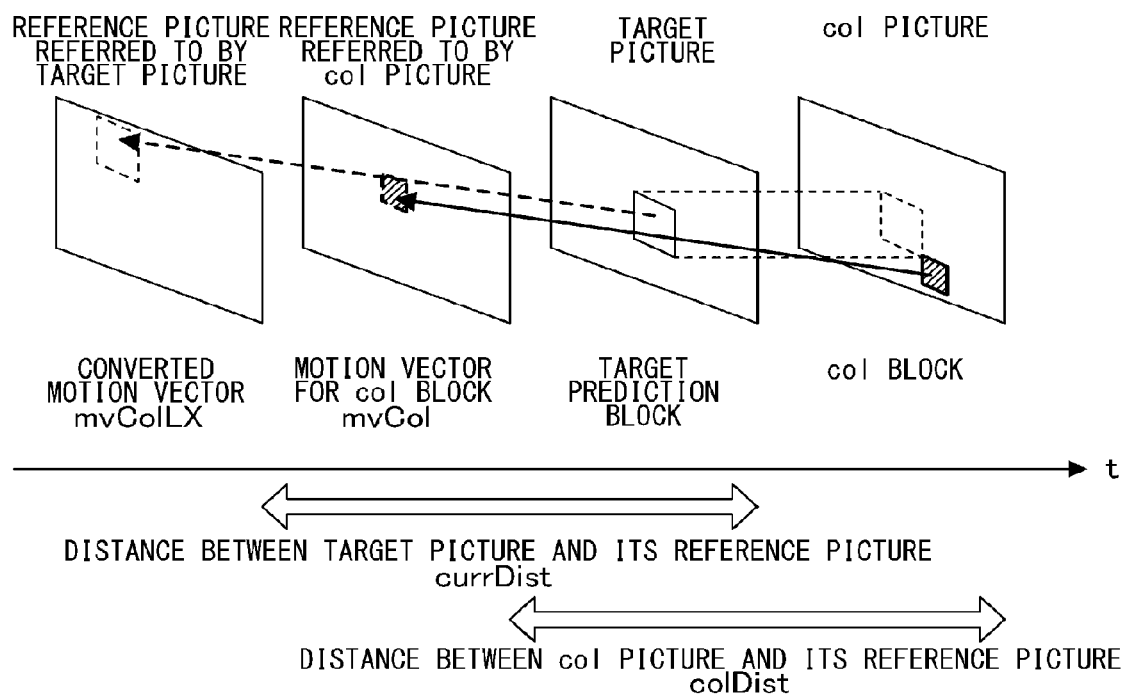
FIG. 18 illustrates a scaling process whereby a motion vector is scaled by adapting the distance between a col picture and a picture referred to from the col picture to the distance between a picture containing the target prediction block and a picture referred to from the picture containing the target block.

FIG. 18 shows an example of the third criterion. In this example, if the target picture intersects the motion vector for a col block, the reference picture referred to from a col picture, the target picture, and a col picture are displayed in the stated temporal order. The block corresponding to a col block will be located inside the target picture without exception. Therefore, for the purpose of evaluating the motion in the neighborhood occurring in a very short period of time, selection of a prediction type that results in the intersection as illustrated would produce higher reliability in motion vector prediction. Thus, the reference list referred to by the motion vector that intersects with the target picture is selected and mvCol and refIdxCol are set accordingly.

Referring to FIG. 17, the base availability flag availableFlagCol is set to 1 since the motion vector is available (S507). The variable X indicating a reference list is set to 0 (S508), and L0 and L1 motion vectors for a col block are derived. The base motion vector mvCol and the base reference picture number refIdxCol decisioned in the above steps are referred to so as to designate the position of the reference picture and derivate the inter-picture distance colDist to a col picture.

In addition, the position of the reference picture referred to by the target prediction block is designated by referring to the reference picture number refIdxLX decisioned in step S401 as being referred to in the target prediction block, and the inter-picture distance currDist to the target picture is derivated. currDist and colDist are compared (S509). If currDist and colDist are equal (OK in S509), the base motion vector mvCol is directly substituted into mvLXCol (S510).

If currDist and colDist are not equal (NG in S509), scaling of the distance is performed. Scaling is a process whereby the motion vector for the neighboring block is subject to distance-based conversion by adapting the inter-picture distance to the picture referred to by the neighboring block to the inter-picture distance to the picture referred to by the target prediction block, before using the motion vector for the neighboring block as the motion vector for the target prediction block. FIG. 18 shows an example of scaling. Since the inter-picture distance to the picture referred to by a col block in a col picture and the picture referred to by the target prediction block are denoted by colDist and currDist, respectively, the motion vector mvCol of a col block is subject to conversion indicated by the following expression in accordance with the inter-picture distance to the target prediction block, thereby derivating the desired motion vector (S511).

$$mvColLX = mvCol \times \frac{currDist}{colDist} \qquad (1)$$

A decision is made as to whether X is 1 (S512). If X is not 1, i.e., 0 (N in S512), the same steps as above are performed in the direction of L1 prediction. For this purpose, X is updated to 1 (S513) so that step S509 and the subsequent steps are repeated. If X is 1 (Y in S512), the process is terminated.

The coding information of the neighboring block thus obtained is entered in the reference candidate list construction unit 311. In the first embodiment, the reference candidate list storage memory 314 is provided with a reference candidate list as a storage area in which candidates of coding information of the reference neighboring blocks are added. The candidates of coding information of the reference neighboring blocks are arranged in the order priority. The candidates of coding information of the reference neighboring blocks are added in the reference candidate list in the order of priority. This reduces the code size of the indices merge_idx in the reference candidate list.

The code size is reduced by locating elements with higher frequency of occurrence toward the top of the reference candidate list. The index merge_idx indicating the order of priority is assigned in the ascending order, starting with 0. For example, if the number of elements in the reference candidate list is 3, the code size required to define an index 0 will be 1 bit by defining the index 0 in the reference candidate list as "0" (binary notation), an index 1 as "10" (binary notation), and an index 2 as "11" (binary notation). By adding an element with the highest frequency of occurrence in the index 0, the code size is reduced.

The reference candidate list provided in the reference candidate list storage memory 314 is built as a list. The reference candidate list is provided with an array area for storing, as elements, an index indicating the location inside the reference candidate list and a candidate, corresponding to the index, of coding information of the reference neighboring block. The array area is denoted by candList. Indices start with 0. The storage area for the reference candidate list candList stores the candidate of coding information of the reference neighboring block. In the following description of the steps, the coding information assigned an index i added in the reference candidate list candList will be denoted by candList [i] so as to distinguish it from the reference candidate list candList by using array notation. Unless otherwise specified, the coding information stored in the storage area for the reference candidate list will be denoted by the names of the positions (A0, A1, B0, B1, C0, T) of the reference neighboring blocks.

The operation of the reference candidate list construction unit 311 will be described by using the flowchart of FIG. 19. First, the variable N and an index k in the reference candidate list are initialized (S600). The variable N is initialized to contain the neighboring block A1 shown in FIG. 9A, and k is set to 0. The index k indicates the order of priority of an area for storing the candidate of coding information defined in the storage area for the reference candidate list.

The flag availableFlagN indicating the availability of the reference neighboring block N is examined (S601). If availableFlagN is 1 (Y in S601), the coding information of the neighboring block N is added in the reference candidate list candList[k] (S602), and k is updated (S603). If availableFlagN is 0 (N in S601), the coding information is not added in the reference candidate list, and control proceeds to the next step.

A decision is made as to whether the neighboring block N is the last reference block (S604). If the block N is the last block (Y in S604), the value of the index is substituted into the total number of listed candidates NumListCand (S605), and the process is terminated. If the block N is not the last block (N in S604), the variable N is updated (S606), and step S601 and the subsequent steps are repeated.

The order of neighboring blocks according to which the variable N is updated is configured to be identical to the order of priority of storage in the reference candidate list. It will be assumed that the order (A1, B1, B0, A0, C0, T) is set in the case of the merge mode. The higher in the order of priority, the more toward the top the block is added in the reference candidate list so that the merge index identifying a candidate of merge in the reference candidate list is assigned a code of a smaller code size.

In the case of the merge mode, the neighboring blocks A1 and B1 are added toward the top of the reference candidate list in preference to the other blocks. This is because the coding information of the blocks A1 and B1 is most likely to be equal to that of the target prediction block and because the blocks A1 ad B1 are contiguous with the target prediction block at the sides. This reduces the code size of merge indices and improves the coding efficiency.

Provided that all of the reference neighboring blocks added in the reference candidate list are available, the above steps will produce a list of reference candidates in the order shown in FIG. 20. The order of priority is indicated by the indices. The codewords are listed in the rightmost column of the reference candidate list. The maximum codeword size is NumListCand−1. In the case of FIG. 20, NumListCand is 6 so that the codeword is represented by 5 bits at the maximum. Provided that only one reference neighboring block is available, the maximum codeword size will be 0 so that there will no need for indices. The candidate of coding information of the neighboring block solely decisioned as being available is uniquely identified as the reference target.

The reference candidate list thus constructed is entered in the identical information detection unit 312. The identical information detection unit 312 compares the candidates of coding information stored in the reference candidate list and, if there are a plurality of identical sets of coding information, all information except for the candidate of coding information having the smallest index in the reference candidate list is deleted. The operation will be described by using the flowchart shown in FIG. 211.

Variables n and m indicating the index in the reference candidate list are set to 0 and 1, respectively (S700). The coding information stored in the reference candidate list with the index n is compared with the coding information with the index m (S701). The coding information subject to comparison includes the prediction mode, the reference list used, the reference picture numbers for each reference list used, and the motion vector for each reference list used. If the coding information is not found to match (N in S701), control proceeds to step S704. If the coding information is found to match (Y in S701), a decision is made as to which of the indices n and m is larger, namely, whether m is already added in a deletion list (S702).

If m is already added in the deletion list (Y in S702), control proceeds to step S704. If m is not added yet (N in S702), m is added in the deletion list (S703). The deletion list is a memory provided in the identical information detection unit 312 for temporary storage.

Subsequently, m is updated by being incremented by 1 (S704). m is compared with the total number of listed candidates NumListCand (S705). If m is not equal to NumListCand (N in S705), comparison between the coding information with the index m and the coding information with the index n in step S701 and in the subsequent steps is repeated. When m reaches NumListCand (Y in S705), n is updated by being incremented by 1 (S706).

Subsequently, n is compared with (NumListCand−1) (S707). If n is not equal to (NumListCand−1) (N in S707), m is set to (n+1) (S709), and comparison of the coding information in step S701 and the subsequent steps is repeated. When n reaches (NumListCand−1) (Y in S707), the coding information in a storage area of the list corresponding to the index added in the deletion list is deleted. The entry with the index 0 is allowed to remain intact and the vacancy is filled by the succeeding candidates in the ascending order of the index. The codewords and the total number of listed candidates NumListCand are updated (S708), whereupon the process is terminated.

Finally, the output unit 313 outputs the indices and the coding information in the reference candidate list thus constructed. The output unit 313 outputs the reference candidate list as a merge list and outputs the indices in the list as merge indices. The output is provided to the motion compensation prediction unit 105 and the prediction method decision unit 107 in the moving picture coding device 100.

Figure 22:
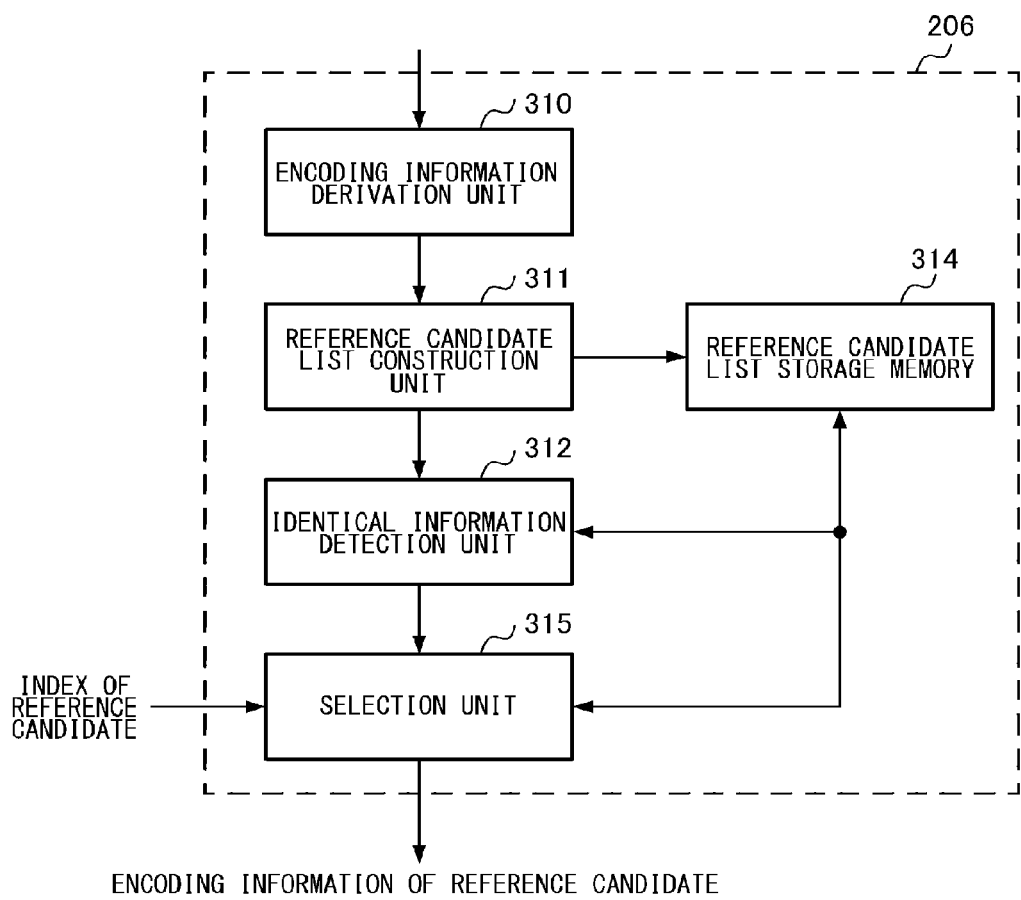
FIG. 22 is a block diagram showing the detailed configuration of the merge decision unit according to the first embodiment.

A description will now be given of the merge decision unit 206 according to the first embodiment provided in the moving picture decoding device 200 and corresponding to the merge detection unit 106 according to the first embodiment provided in the moving picture coding device 100. FIG. 22 shows the detailed configuration of the merge decision unit 206. The part bounded by the heavy dotted line in FIG. 22 represents the merge decision unit 206. The merge decision unit 206 includes a coding information derivation unit 310, a reference candidate list construction unit 311, an identical information detection unit 312, a reference candidate list storage memory 314, and a selection unit 315.

The merge decision unit 206 corresponds to the merge detection unit 106 of the moving picture coding device 100. Internally, the merge decision unit 206 differs from the merge detection unit 106 only in the selection unit 315 and the output unit 313. The other components, including the coding information derivation unit 310, the reference candidate list construction unit 311, the identical information detection unit 312, and the reference candidate list storage memory 314 have the same functions as those of the moving picture coding device 100. Thus, the same reference candidate list as constructed in the coding steps is constructed in the steps through the identical information detection unit 312.

A description will be given of the selection unit 315, which acquires the coding information of the reference neighboring block in the merge mode from the constructed reference candidate list. The selection unit 315 selects the neighboring block in the reference candidate list designated by the index for identifying the reference neighboring block decoded in the first bitstream decoding unit 202. The selection unit 315 supplies the selected coding information to the motion compensation prediction unit 207 and to the coding information storage memory 210.

Figure 23:
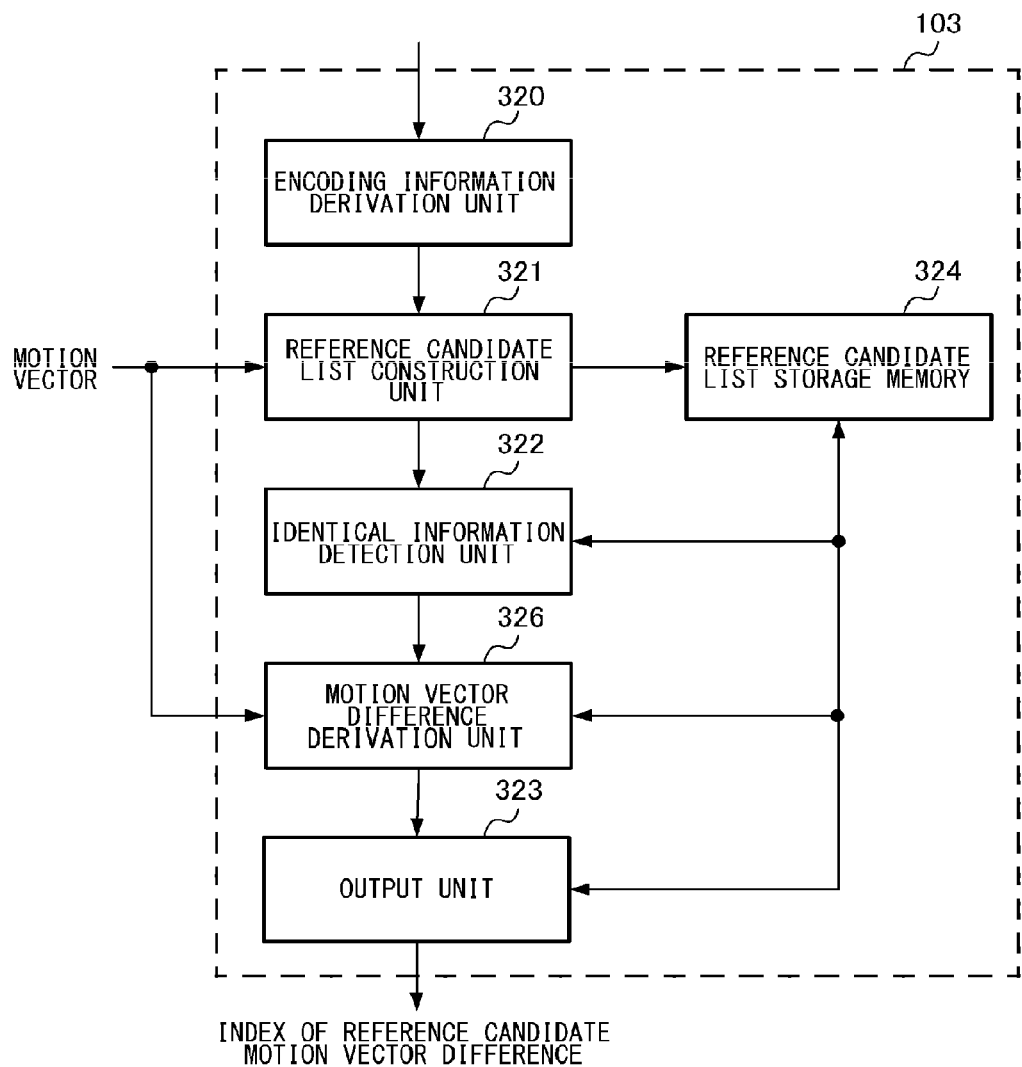
FIG. 23 is a block diagram showing the detailed configuration of the motion vector prediction unit according to the first embodiment.

A description will first be given of the motion vector prediction unit 103 according to the first embodiment shown in FIG. 2 illustrating the configuration of the moving picture coding device 100. FIG. 23 shows the detailed configuration of the motion vector prediction unit 103. The part bounded by the heavy dotted line in FIG. 23 represents the motion vector prediction unit 103 and a description will be given with reference to this drawing. The motion vector prediction unit 103 includes a coding information derivation unit 320, a reference candidate list construction unit 321, an identical information detection unit 322, an output unit 323, a reference candidate list storage memory 324, and a motion vector difference derivation unit 326.

Figure 24:
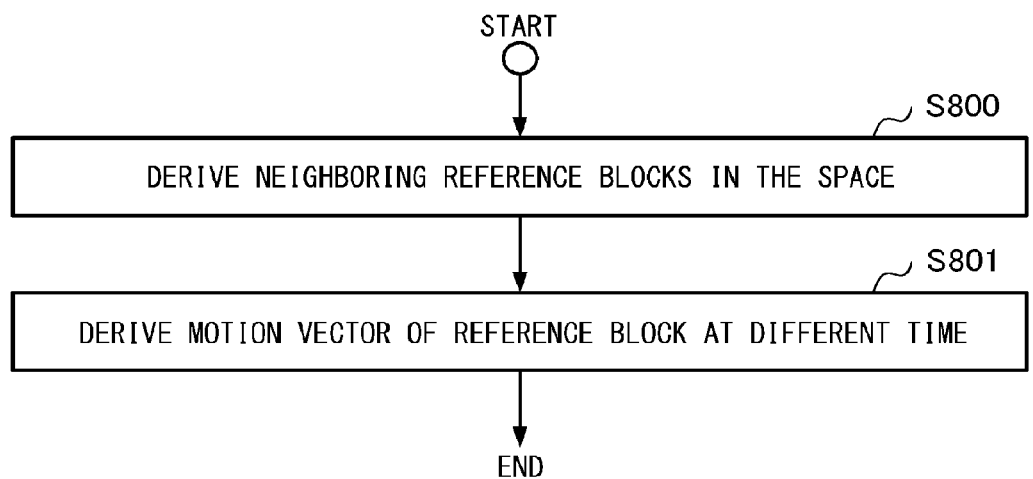
FIG. 24 is a flowchart showing the operation of the coding information derivation unit of the motion vector prediction unit according to the first embodiment.

The coding information of the reference neighboring blocks referred to by the target prediction block and stored in the temporary memory 303 in the inter-prediction information detection unit 104 is input to the coding information derivation unit 320. The operation of the coding information derivation unit 320 will be described using the flowchart of FIG. 24.

Figure 25:
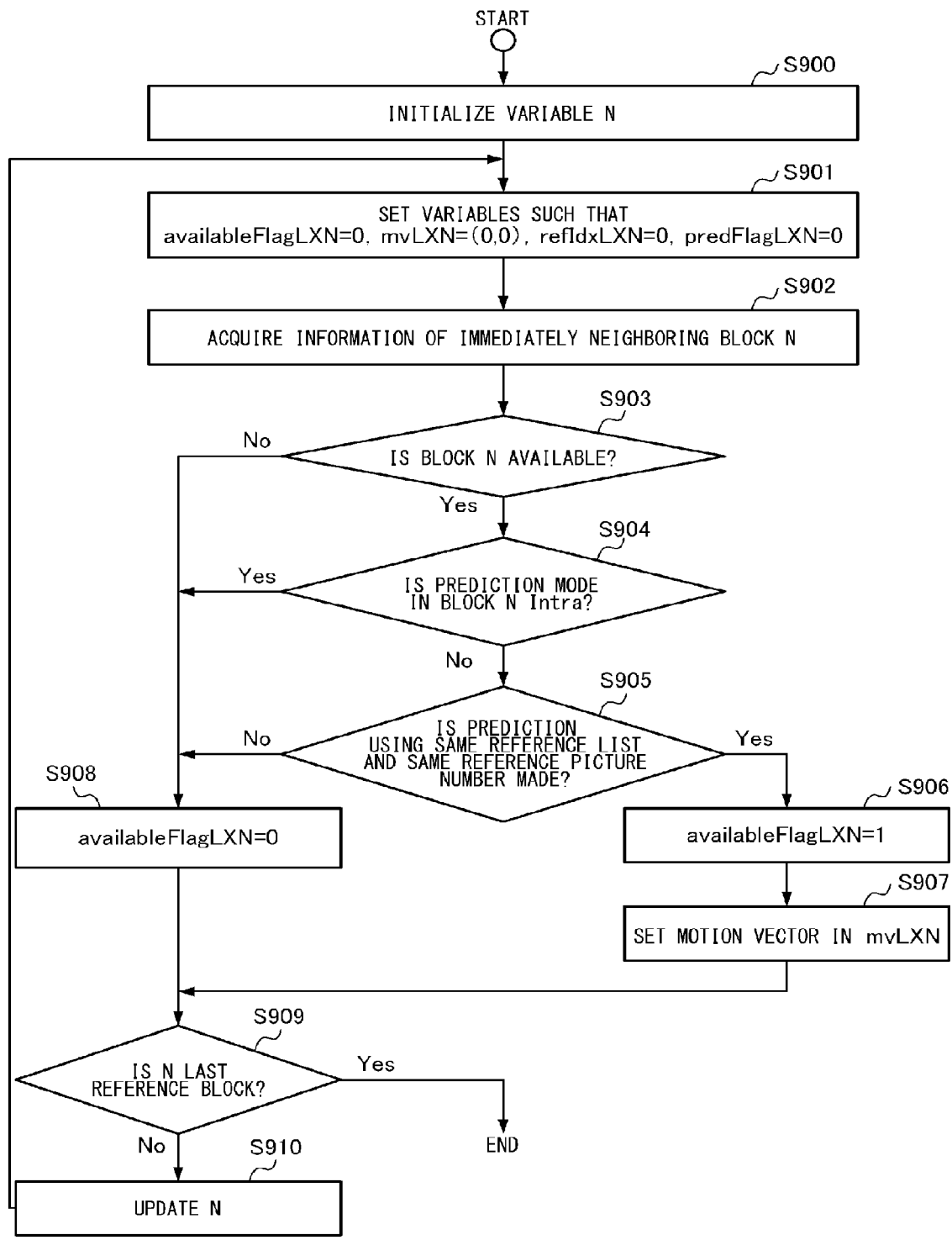
FIG. 25 is a flowchart showing the operation performed in the coding information derivation unit according to the first embodiment to select an immediately neighboring block located in the same picture as the target prediction block.

The initially input coding information of the neighboring blocks is examined to decision whether the coding information of the neighboring block located in the same picture as the target prediction block is available and the coding information is derived accordingly (S800). FIG. 25 shows the detailed flow of decision for each neighboring block located in the same picture as the target prediction block. Decision in FIG. 25 is performed in each of the L0 and L1 lists, independently of each other.

Decision is performed in accordance with the prediction mode in the target prediction block. More specifically, in the case of unidirectional L0 prediction, only the coding information added in the reference list L0 is subject to decision. In the case of unidirectional L1 prediction, only the coding information added in the reference list L1 is subject to decision. In the case of bidirectional prediction, the coding information in each of the L0 and L1 reference lists is subject to decision. In this specification, one of the reference candidate lists is referred to as LX in describing the steps of decision in the motion estimation mode, unless otherwise specified. Only one reference candidate list will be illustrated in the associated drawings.

First, a variable N is initialized (S900). Neighboring blocks A1, B1, B0, A0, and C0 shown in FIG. 9A as being located in the same picture are substituted into the variable N. It will be assumed that the variable is initially set such that N=A1 and updated in the order B1, B0, A0, and C0.

Subsequently, variables for storing the coding information of the neighboring block used in subsequent decision are initialized. The variables include: a flag availableFlagLXN indicating whether the neighboring block is available; a motion vector mvLXN; a reference picture number refIdx-LXN; and a flag predFlagLXN indicating the availability of a reference list. The variables are initialized as follows (S901).
availableFlagLXN=0
mvLXN=(0,0)
refIdxLXN=0
predFlagLXN=0 where 0 or 1, indicating a reference list, is substituted into the suffix X. The position and coding information of the neighboring block with the variable N (hereinafter, referred to as the neighboring block N) are acquired (S902).

A decision is made as to whether the neighboring block N is available based on the acquired position of the neighboring block N (S903). For example, if the target prediction block is located at the left edge of the picture, there will be no neighboring blocks to the left of the target prediction block so that there should not be corresponding coding information in the coding information storage memory 114. In this case, a decision of unavailability is made.

If the neighboring block N is unavailable (N in S903), availableFlagLXN is set to "0" (S908). If the neighboring block N is available (Y in S903), a decision is made as to whether the prediction mode in the neighboring mode N is Intra (S904).

If the prediction mode of the neighboring block N is Intra (Y in S904), availableFlagLXN is set to "0" (S908). If the prediction mode of the neighboring block N is not Intra (N in S904), a decision is made as to whether prediction using the same reference list and the same reference picture number as used in the prediction in the target prediction block is performed in the neighboring block N (S905).

If the prediction is not performed (N in S905), availableFlagLXN is set to "0" (S908). If the prediction is performed (Y in S905), availableFlagLXN is set to "1" (S906). Subsequently, the value of the motion vector for the neighboring N is substituted into mvLXN (S907).

When the decision step is completed for the neighboring block N as described above, a decision is made as to whether the variable N indicates the last neighboring block (S909). Since the variable N is updated in the order A1, B1, B0, A1, and C0, a decision is made as to whether N is C0. If N is C0 (Y in S909), it means that all neighboring blocks have been subjected to decision so that the process is terminated. If N is not C0 (N in S909), N is updated (S910). N is updated in the aforementioned order of neighboring blocks so that step S901 and the subsequent steps are repeated for the neighboring block N.

In step S905 of the first embodiment, a decision is made as to whether prediction using the same reference list and the same reference picture number as used in the prediction in the target prediction block is performed in the neighboring block N. This is because, if the same reference picture number and the same reference list are used, the likelihood is high that the motion vector for the target prediction block and that of the neighboring block N are identical or approximate to each other so that the difference in the motion vectors is small and the coding efficiency is improved accordingly.

However, the neighboring block in which prediction is performed using the same reference picture number and the same reference list is not necessarily found in the same picture. If such a block is not available, the difference in the motion vectors cannot be derived so that the coding efficiency will be reduced. This is addressed by not requiring the condition of the same reference list and the same reference picture number for decision in S905. The flag indicating the availability of the neighboring block availableFlagLXN is set to 1 (available) if the prediction performed in the neighboring block meets any of the following conditions, and the associated block is identified as a candidate of reference neighboring block and the associated coding information is derived accordingly.

Figure 26:
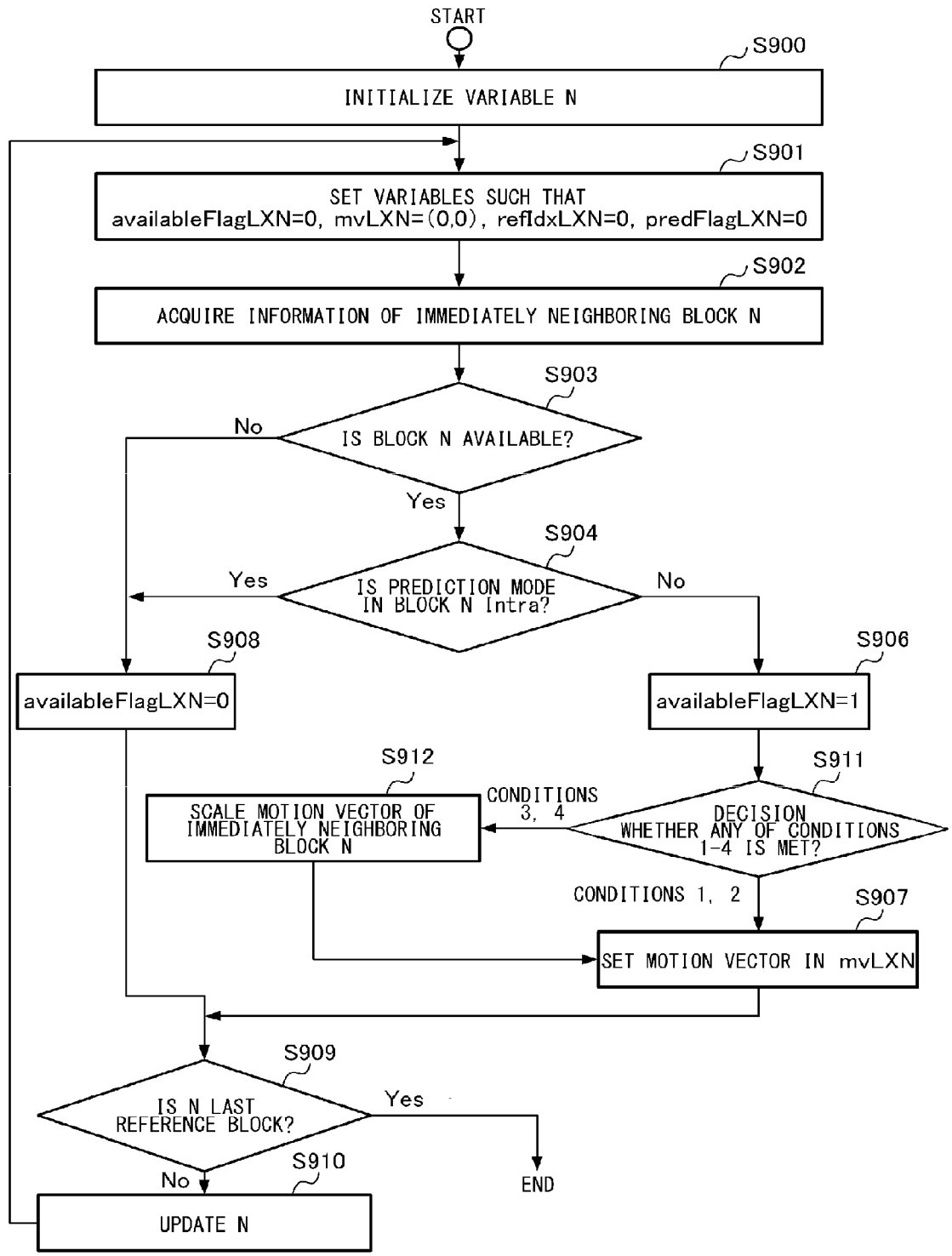
FIG. 26 is a flowchart showing an alternative method performed in the coding information derivation unit according to the first embodiment to select an immediately neighboring block located in the same picture as the target prediction block.

Condition 1: same reference list and same reference picture number
Condition 2: different reference list and same reference picture number
Condition 3: same reference list and different reference picture number
Condition 4: different reference list and different picture number The flow of the process in this case will be shown in FIG. 26. FIG. 26 differs from FIG. 25 in that step S905 of FIG. 25, which only examines Condition 1, is deleted. A decision as to whether any of Conditions 1-4 is met is made in step S911. Step S902 is added to scale the motion vector if neither of Conditions 1 and 2 is met. The other steps S900 through step S910 are the same as those of FIG. 25 so that the following description only relates to changes and additions.

If the prediction mode of the neighboring block N is not Intra (N in S904), availableFlagLXN is set to "1" (S906). Subsequently, a decision is made as to whether any of Conditions 1-4 is met by comparing the coding information from the prediction in the target prediction block and the coding information of the neighboring block N (S911). If Condition 1 or Condition 2 is met, the value of the motion vector for the neighboring block N using the same reference list (in case Condition 1 is met) or the value of the motion vector using the different reference list (in case Condition 2 is met) is substituted into mvLXN (S907).

If Condition 3 or Condition 4 is met, the motion vector for the neighboring block N using the same reference list (in case Condition 3 is met) or the motion vector using the different reference list (in case Condition 4 is met) is scaled (S912). In the motion estimation mode, motion vector prediction is performed in order to transmit the motion vector for the target prediction block using a smaller code size. Motion vector prediction is a process of finding a difference between the motion vector for the target prediction block and the motion vector for the neighboring block and of coding the difference. If the pictures referred to differ, it will affect the magnitude of the motion vector to the extent that the difference might be larger than the motion vector for the actual target prediction block.

Figure 27:
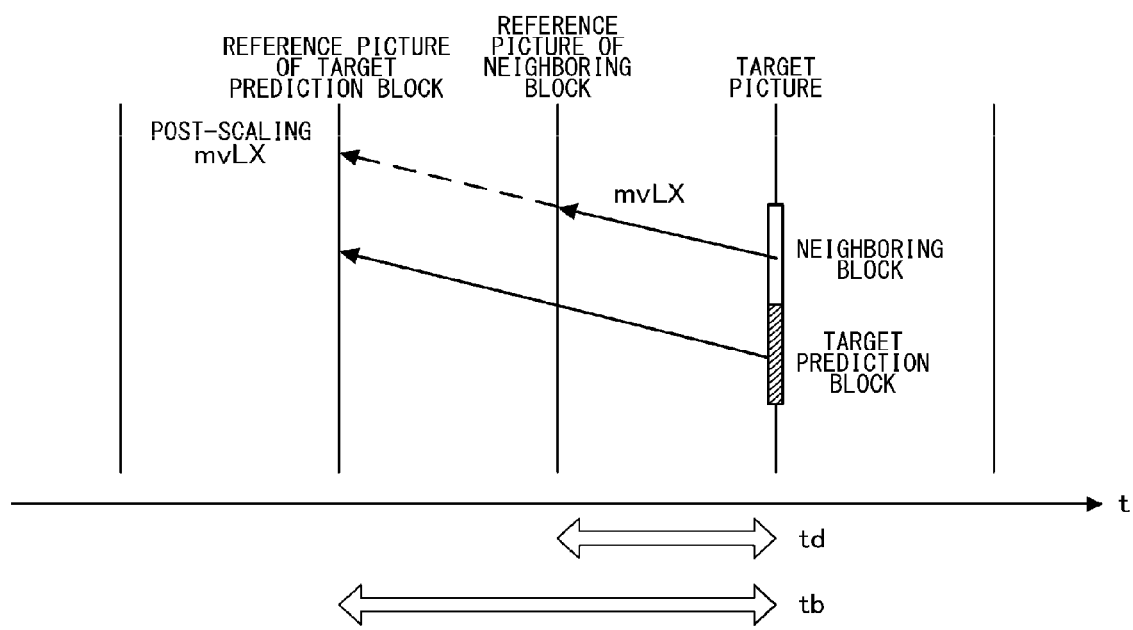
FIG. 27 illustrates scaling of a motion vector.

This is addressed by scaling in which the motion vector for the neighboring block is subject to distance-based conversion by adapting the inter-picture distance to the picture referred to by the neighboring block to the inter-picture distance to the picture referred to by the target prediction block. FIG. 27 shows an example of scaling. The motion vector estimation unit 102 performs motion vector estimation in the target prediction block. The motion vector, the reference picture number, and the reference list of the target prediction block are detected.

Meanwhile, the coding information of the block neighboring the target prediction block in the target picture is already known so that the reference picture is selected from the reference picture number of the neighboring block. The inter-picture distance td between the neighboring block in the target picture and the reference picture, and the inter-picture distance tb between the target prediction block and the reference picture are derivated. The motion vector mvLX for the neighboring block N using the same reference list LX (in case Condition 3 is met) or the motion vector mvLY using the different reference list LY (Y=1 when X=0, Y=0 when X=1) is subject to distance-based conversion represented by the following expression in accordance with the inter-picture distance to the target prediction block.

$$mvLX = mvLX \times \frac{tb}{td}, mvLY = mvLY \times \frac{tb}{td}, \quad (2)$$

Referring back to FIG. 26, the motion vector mvLX or mvLY thus converted is substituted into mvLXN (S907). By scaling the motion vector, a motion vector predictor closer to that of the target prediction block can be derived so that precision is improved accordingly. As described above, the immediately neighboring block located in the same picture as the target prediction block is used as a reference block and the coding information is derived accordingly.

Referring back to FIG. 24, a decision is made as to the availability of the coding information of the block neighboring a block located in another picture at a different point of time at a position equivalent to that of the target prediction block, and the coding information is derived accordingly (S801). The process is substantially identical to the process in step S103 in the coding information derivation unit 310 of the merge detection unit 106. In the case of the merge mode, the coding information derivation unit 310 in the merge detection unit 106 derives the reference picture number referred to by the target prediction block (S102) before performing step S103.

In contrast, in the case of the motion estimation mode, the motion vector estimation unit 102 estimates the motion vector for the target prediction block so as to estimate the motion vector, the reference picture number, and the reference list of the target prediction block. The detected coding information of the target prediction block and the known coding information of the block neighboring the block located in another picture at a different point of time at a position equivalent to that of the target prediction block are examined. The reference pictures are derived from the respective reference picture numbers. The motion vector for the block neighboring the block located in another picture at a different point of time at a position equivalent to that of the target prediction block is converted in accordance with the inter-picture distance between the target prediction block and the reference picture.

The coding information of the neighboring block thus obtained is entered in the reference candidate list construction unit 321. If the Inter mode is designated in the target prediction block, the reference candidate list construction unit 321 constructs reference candidate lists for the 2 reference lists, namely, the L0 reference list and the L1 reference list. In the Inter mode, L0 prediction and L1 prediction are defined as unidirectional prediction, and Bi-pred prediction is defined as bidirectional prediction. In Bi-pred prediction, two reference lists for L0 prediction and L1 prediction are used. Therefore, one or two reference candidate lists may be provided in the reference candidate storage memory 314 depending on the prediction mode at the time of coding. Alternatively, two reference candidate lists may be provided in advance for L0 prediction and L1 prediction. In this specification, only one reference candidate list will be referred to in describing the motion estimation mode, unless otherwise specified, and only one reference candidate list will be illustrated in the associated drawings.

In the first embodiment, the reference candidate list storage memory 324 is provided with a reference candidate list as a storage area for adding candidates of coding information of the reference neighboring blocks. The candidates of coding information of the neighboring blocks are arranged in the order priority. The candidates of coding information of the neighboring blocks are added in the reference candidate list storage memory 324 in the order of priority. This reduces the code size of the indices mvp_idx_l0 and mvp_idx_l1 in the reference candidate list.

The code size is reduced by locating elements with higher priority order toward the top of the reference candidate list. The index indicating the position of each element in the reference candidate list is assigned in the ascending order, starting with 0. The reference candidate list provided in the reference candidate list storage memory 324 is built as a list. The reference candidate list is provided with an array area for storing, as elements, an index indicating the location inside the reference candidate list and a candidate, corresponding to the index, of coding information of the reference neighboring block.

The array area is denoted by candListLX. Indices start with 0. The storage area for the reference candidate list candListLX stores the candidate of coding information of the reference neighboring block. In the following description of the steps, the coding information assigned an index i added in the reference candidate list candListLX will be denoted by candListLX [i] so as to distinguish it from the reference candidate list candListLX by using array notation. Unless otherwise specified, the coding information stored in the storage area for the reference candidate list will be denoted by the names of the positions (A0, A1, B0, B1, C0, T) of the reference neighboring blocks.

The operation of the reference candidate list construction unit 321 is the same as that of the reference candidate list construction unit 311 of the merge detection unit 106. The flag availableFlagLXN obtained in the coding information derivation unit 320 and indicating whether the neighboring block is available is examined in the order A1, B1, A0, B0, C0, T defined in the motion estimation mode. If the flag is 1 (available), the neighboring block is added in the reference candidate list provided in the reference candidate list storage memory 324.

Provided that all of the reference neighboring blocks added in the reference candidate list are available, the above steps will produce a list of reference candidates in the order shown in FIG. 20. The order of priority is indicated by the indices. The codewords are listed in the rightmost column of the reference candidate list. The maximum codeword size is NumListCand−1. In the case of FIG. 20, NumListCand is 6 so that the codeword is represented by 5 bits at the maximum. Provided that only one reference neighboring block is available, the maximum codeword size will be 0 so that there will no need for codewords. The candidate of coding information of the neighboring block solely decisioned as being available is uniquely identified as the reference target.

Figure 29:
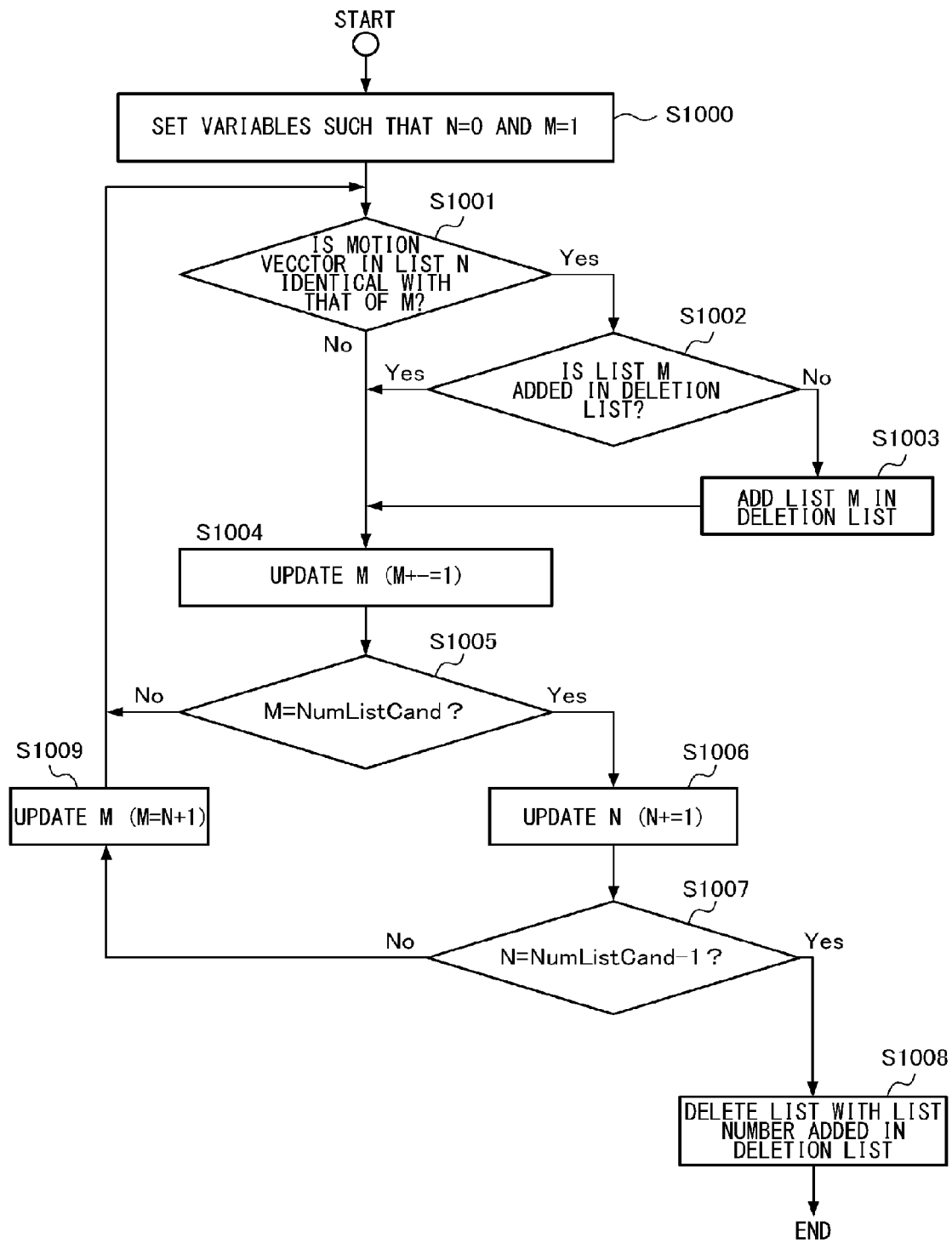
FIG. 29 is a flowchart showing the operation performed in the identical information detection unit according to the first embodiment to update the reference candidate list by detecting and deleting the coding information added in the reference candidate list and having the same motion vector.

The reference candidate list thus constructed is entered in the identical information detection unit 322. The identical information detection unit 322 compares motion vectors stored in the reference candidate list and, if there are candidates provided with the same motion vector, all information except for the candidate having the smallest index in the reference candidate list is deleted. The operation will be described by using the flowchart shown in FIG. 29.

Variables n and m indicating the index in the reference candidate list are set to 0 and 1, respectively (S1000). The motion vector stored in the reference candidate list with the index n is compared with the motion vector with the index m (S1001). If the motion vector is not found to match (N in S1001), control proceeds to step S1004. If the motion vector is found to match (Y in S1001), a decision is made as to which of the indices n and m is larger, namely, whether m is already added in a deletion list (S1002).

If m is already added in the deletion list (Y in S1002), control proceeds to step S1004. If m is not added yet (N in S1002), m is added in the deletion list (S1003). The deletion list is a memory provided in the identical information detection unit 322 for temporary storage.

Subsequently, m is updated by being incremented by 1 (S1004). m is compared with the total number of listed candidates NumListCand (S1005). If m is not equal to NumListCand (N in S1005), comparison between the motion vector with the index m and the motion vector with the index n in step S1001 and in the subsequent steps is repeated. When m reaches NumListCand (Y in S1005), n is updated by being incremented by 1 (S1006).

Subsequently, n is compared with (NumListCand−1) (S1007). If n is not equal to (NumListCand−1) (N in S1007), m is set to (n+1) (S1009), and comparison of the motion vector in step S1001 and the subsequent steps is repeated. When n reaches (NumListCand−1) (Y in S1007), the coding information in a storage area of the list corresponding to the index added in the deletion list is deleted. The entry with the index 0 is allowed to remain intact and the vacancy is filled by the succeeding candidates in the ascending order of the index. The codewords and the total number of listed candidates NumListCand are updated (S1008), whereupon the process is terminated.

The motion vector difference derivation unit 326 uses the motion vector included in the coding information in the reference candidate list thus constructed as a motion vector predictor. The motion vector difference derivation unit 326 derivates a motion vector difference from the motion vector estimated by the motion vector estimation unit 102 and the motion vector predictor. The motion vector difference derivation unit 326 supplies the derived motion vector difference to the output unit 323.

Finally, the output unit 323 outputs the indices and the motion vector differences in the constructed reference candidate list. The reference candidate list is output as an MVP list and the index in the list is output as an MVP index. The output is provided to the prediction method decision unit 107 in the moving picture coding device 100.

Figure 30:
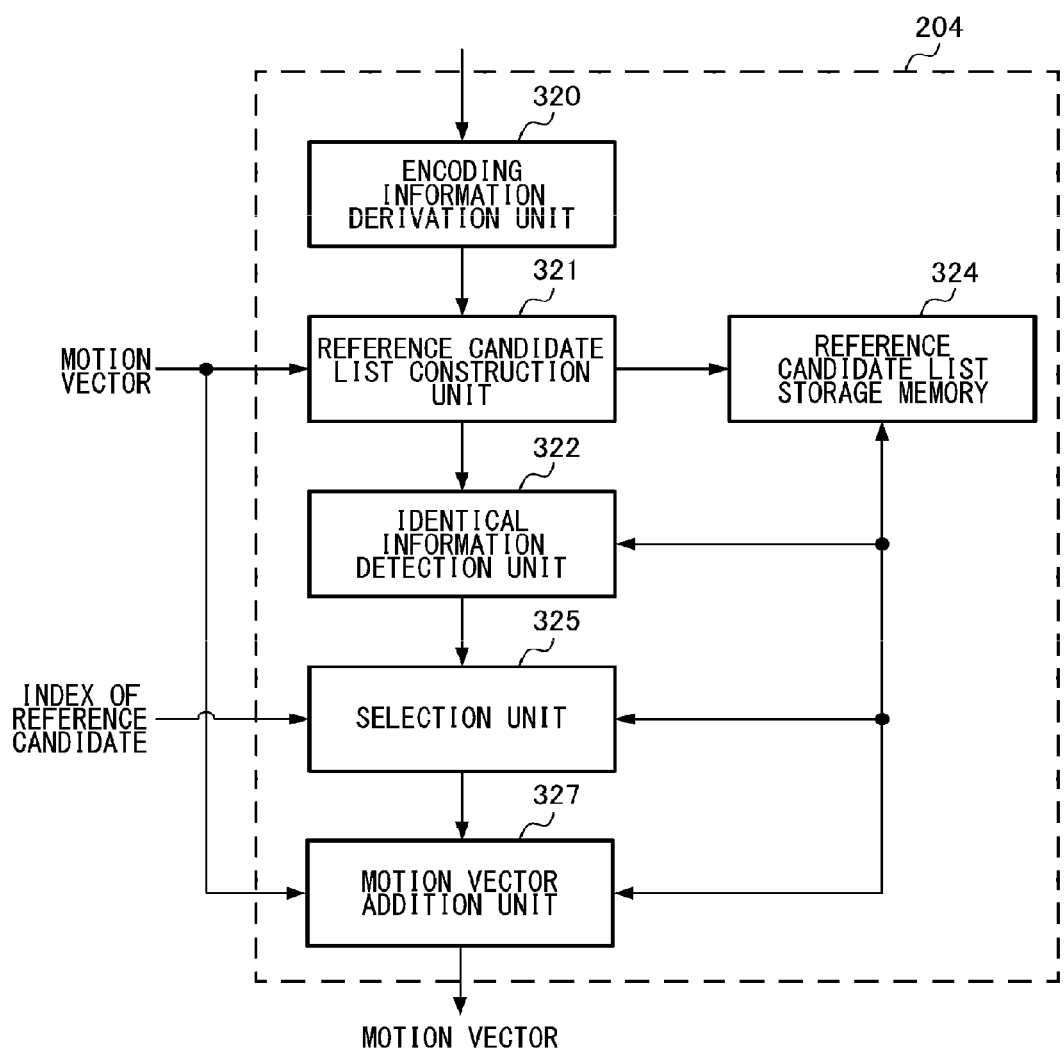
FIG. 30 is a block diagram showing the detailed configuration of the motion vector derivation unit according to the first embodiment.

A description will be given of the motion vector derivation unit 204 according to the first embodiment shown in FIG. 2 provided in the moving picture decoding device 200 and corresponding to the motion vector prediction unit 103 according to the first embodiment provided in the moving picture coding device 100. FIG. 30 shows the detailed configuration of the motion vector derivation unit 204. The part bounded by the heavy dotted line in FIG. 30 represents the motion vector derivation unit 204. The motion vector derivation unit 204 includes a coding information derivation unit 320, a reference candidate list construction unit 321, an identical information detection unit 322, a reference candidate list storage memory 324, a selection unit 325, and a motion vector addition unit 327.

The motion vector derivation unit 204 corresponds to the motion vector prediction unit 103 of the moving picture coding device 100. Internally, the motion vector derivation unit 204 differs from the motion vector prediction unit 103 only in the selection unit 315, the output unit 323, and the motion vector addition unit 327. The other components, including the coding information derivation unit 320, the reference candidate list construction unit 321, the identical information detection unit 322, and the reference candidate list storage memory 324 have the same functions as those of the moving picture coding device 100. Thus, the same reference candidate list as constructed in the coding steps is constructed in the steps through the identical information detection unit 322.

A description will be given of the selection unit 325, which acquires the coding information of the reference neighboring block in the motion estimation mode from the constructed reference candidate list. The selection unit 325 selects the neighboring block in the reference candidate list designated by the index for identifying the reference neighboring block decoded in the first bitstream decoding unit 202. The selection unit 325 outputs the motion vector from the coding information of the neighboring block in the selected list as the motion vector predictor. The motion vector addition unit 327 adds the motion vector predictor to the motion vector difference decoded in the first bitstream decoding unit 202 so as to derivate the motion vector. The motion vector addition unit 327 supplies the motion vector to the motion compensation prediction unit 207 and supplies the coding information of the neighboring block in the selected reference candidate list to the coding information storage memory 210.

(Second Embodiment)

Figure 31A:
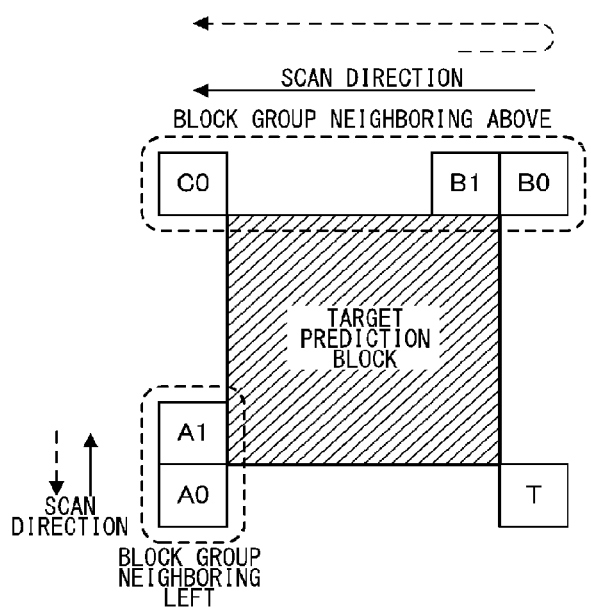
FIGS. 31A and 31B show arrangements of reference neighboring blocks referred to by the target prediction block according to the second embodiment.
Figure 31B:
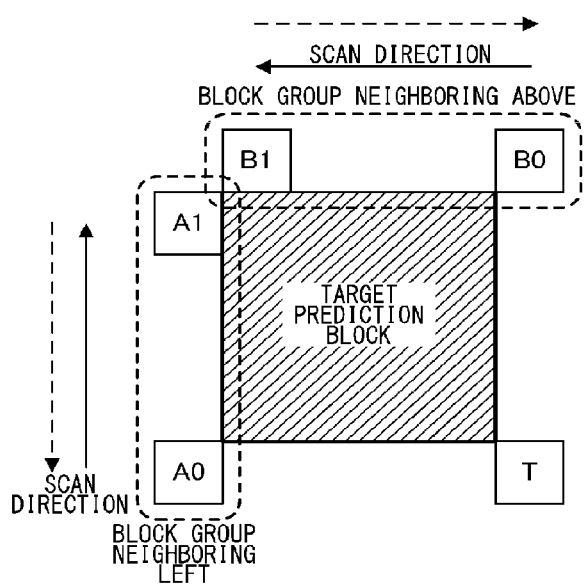

FIGS. 31A and 31B show arrangements of reference neighboring blocks referred to by the target prediction block according to the second embodiment. Neighboring blocks are denoted by similar symbols as in FIGS. 9A and 9B. The exemplary arrangement of FIG. 31A is used in the following description. According to the second embodiment, the neighboring blocks located in the same picture as the target prediction block are organized into a block group neighboring the target prediction block to the left (A0 and A1 in FIG. 31A) and a block group neighboring above (B0, B1, and C0 in FIG. 31A). One reference neighboring block is selected to represent each block group.

As in the first embodiment, a decision is made as to whether the neighboring block is available by referring to the prediction mode of the coding information of the neighboring block and the position of the neighboring block. The second embodiment differs in that one representative neighboring block is selected from each block group. Selection of a representative neighboring block from a block group consisting of a plurality of neighboring blocks will be referred to as scan. As a result of a scan, three neighboring blocks including: a neighboring block representing a block group neighboring the target prediction block to the left: a neighboring block representing a block group neighboring above: and a block neighboring a block located in another picture at a different point of time at a position equivalent to that of the target prediction block, are added in the reference candidate list.

Accordingly, the total number of neighboring blocks added in the reference candidate list can be reduced as compared with the first embodiment. Additionally, the number of times of comparison between coding information in the identical information detection unit 312 and the number of times of comparison between motion vectors in the identical information detection unit 322 can be reduced accordingly. Further, the size of codewords assigned to indices in the reference candidate list is reduced so that the code size of indices in the reference candidate list can be reduced. Further, by changing the order of processing the neighboring blocks in the respective block groups neighboring to the left and above, depending on the prediction mode, the neighboring block suitable for the prediction mode is selected and the coding efficiency is expected to be improved.

If the prediction mode is the merge mode, the merge detection unit 106 and the merge decision unit 206 process blocks as indicated by thin dotted arrows in FIGS. 31A and 31B, namely from top to bottom in the case of the block group neighboring to the left, and in the order B1, B0, C0 in the case of the block group neighboring above so as to end with the top left neighboring block C0. In the case of the motion estimation mode, the motion vector prediction unit 103 and the motion vector derivation unit 204 process blocks as indicated by thin solid arrows in FIGS. 31A and 31B, namely, bottom to top in the case of the block group neighboring to the left, and from right to left in the case of the block group neighboring above.

In the merge mode, the coding efficiency is improved by selecting the neighboring blocks A1 and B1 that are likely to have the same coding information as the target prediction block in preference to the other blocks. Meanwhile, in the motion estimation mode, the neighboring block A0 to the left and the neighboring block B0 above that are distanced from each other are selected so as to produce a difference in coding information between the candidate neighboring block to the left and the block above, and, consequently, to broaden the scope of selection of the motion vector predictor. These measures will reduce the code size of the motion vector predictor and improves the coding efficiency.

Figure 32:
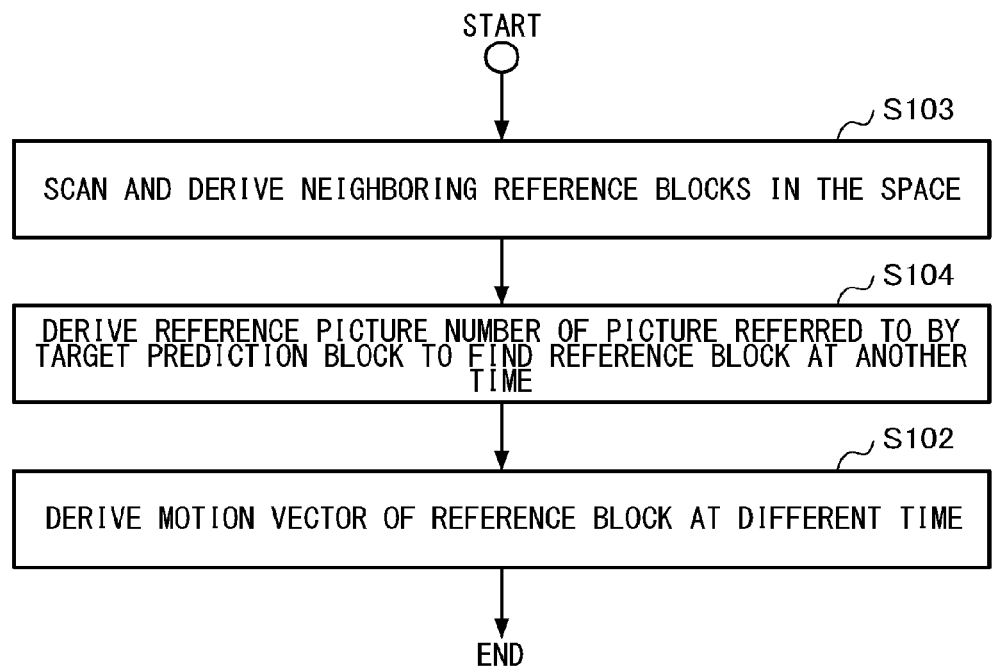
FIG. 32 is a flowchart showing the operation of the coding information derivation unit of the merge detection unit according to the second embodiment.

Only the operation according to the second embodiment different from that of the first embodiment will be described below in detail. A description will first be given of the merge detection unit 106 in the moving picture coding device 100. The merge detection unit 106 is configured as illustrated in FIG. 11 described in the first embodiment. The process in the coding information derivation unit 310 is different from that of the first embodiment so that the operation of the coding information derivation unit 310 according to the second embodiment will be described. FIG. 32 is a flowchart showing the operation of the coding information derivation unit 310 according to the second embodiment.

Initially, the destination of the output of the inter-prediction information detection unit 104 is switched to the merge detection unit 106 according to the prediction mode input to the switch 108 and controlled by the moving picture coding device 100. The coding information of the reference neighboring blocks referred to by the target prediction block and stored in the temporary memory 303 in the inter-prediction information detection unit 104 is input to the coding information derivation unit 310.

Figure 33:
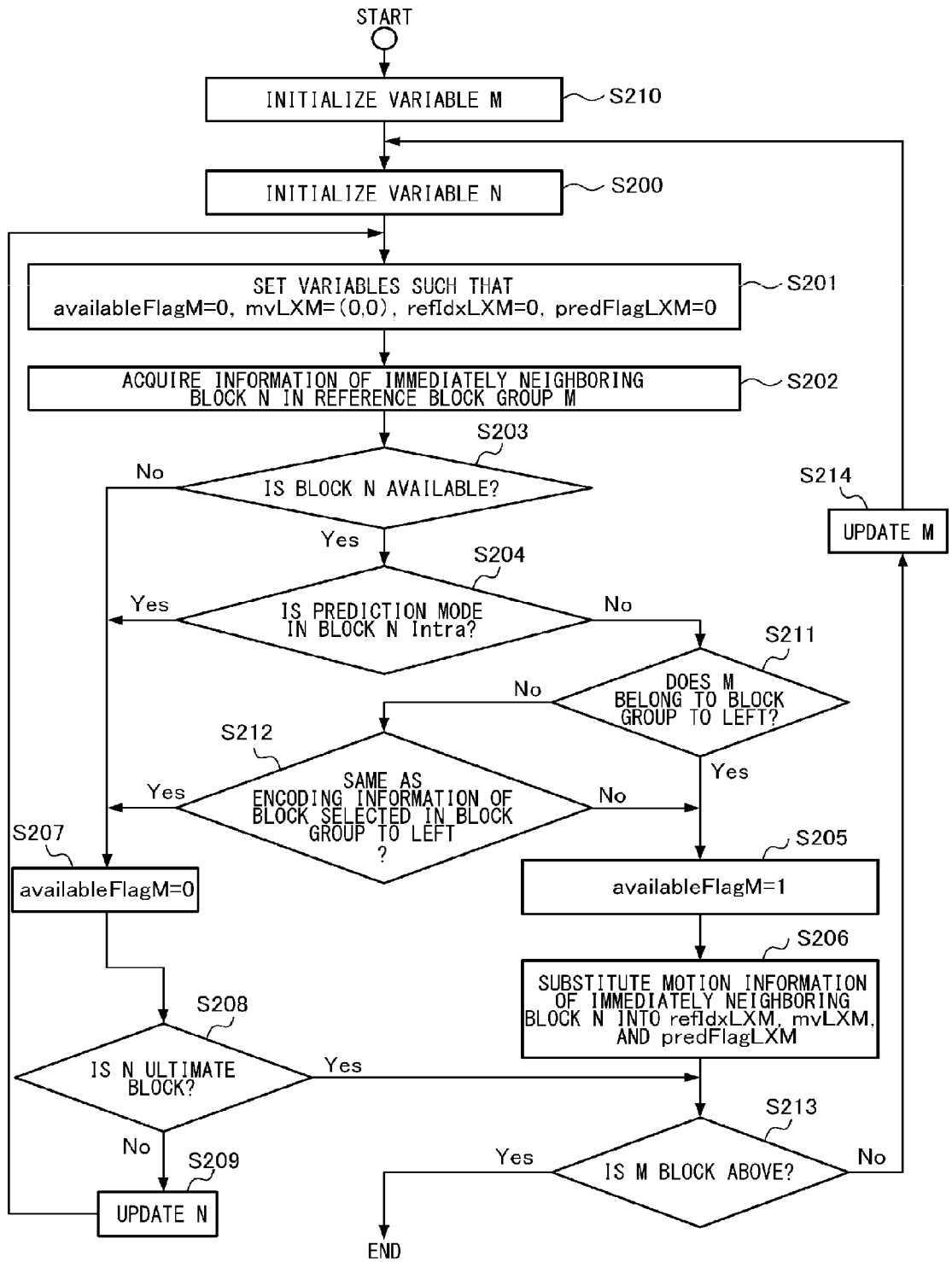
FIG. 33 is a flowchart showing the operation performed in the coding information derivation unit according to the second embodiment to select an immediately neighboring block located in the same picture as the target prediction block.

The initially input coding information of the neighboring blocks is examined to decision whether the coding information of the neighboring block located in the same picture as the target prediction block is available and the coding information is derived accordingly (S103). FIG. 33 shows the detailed flow of decision for each neighboring block located in the same picture as the target prediction block. Compared with the flowchart shown in FIG. 13 of the first embodiment, steps S210, S211, S212, S213, and S214 are added. The other steps are identical to those in the first embodiment so that only the added steps will be described in detail.

First, the block group M is initialized (S210). It will be assumed that the block group neighboring to the left is defined as an initial group. The variable M is set to A, which is a value indicating the block group to the left. Subsequently, the variable N indicating the block in the block group is initialized (S200). The variable N is defined in the order of processing in the aforementioned block group. N is updated in the order A1, A0 in the block group to the left and in the order B1, B0, C0 in the group above.

Steps S201 through S209 in FIG. 33 are basically identical to those in FIG. 13 of the first embodiment. A decision is made as to whether the prediction mode in the neighboring mode N is Intra (S204). The steps performed if the prediction mode in the neighboring block N is not Intra (N in S204) are different from those of the first embodiment.

A decision is made as to whether the prediction mode in the neighboring block N is Intra (S204). If the prediction mode in the neighboring block is not Intra (N in S204), a decision is then made as to whether M is the block group to the left (S211). If M is the block group to the left (Y in S211), availableFlagM is set to "1" (S205), and the coding information of the neighboring block N is substituted into refIdxLXM, mvLXM, and predFlagLXM (S206). Only when M is the block group above (N in S211), a decision is made as to whether the coding information of the neighboring block selected in the block group to the left is identical to the coding information of the neighboring block N (S212).

Since the neighboring block representing the block group to the left is selected initially, the coding information thereof is stored and used for decision on the block group above. These steps prevent the subsequent coding information from being a duplicate of the coding information of the neighboring block representing the block group to the left so that the scope of selection of the reference target is expanded. For reduction of the processing volume, control can directly proceed to step S205, bypassing steps S211 and S212.

If the coding information of the neighboring block selected in the block group to the left and the coding information of the neighboring block N differs, or if the coding information of the neighboring block selected in the block group to the left is not available (N in S212), availableFlagM is set to "1" (S205), and the coding information of the neighboring block N is substituted into refIdxLXM, mvLXM, and predFlagLXM (S206).

Once the coding information of the block group M is defined, a decision is then made as to whether the variable M is B, which is a value indicating the block group above, in order to process the next block group, namely, the block group neighboring the target block above (S213). If M is not B (above) (N in S213), M is updated to B (above) (S214), and step S200 and the subsequent steps are repeated. If M indicates the group above (Y in S213), the process is terminated.

If the neighboring block N is not available (N in S203), or if the prediction mode in the neighboring block N is Intra (Y in S204), or if the coding information of the neighboring block selected in the block group to the left is identical to the coding information of the neighboring block N (Y in S212), availableFlagM is set to "0" (S207), and a decision is made as to whether the neighboring block N is the last of the neighboring blocks in the block group M (S208).

The variable N is updated in the order of processing in the aforementioned block group. A decision is made as to whether N is A0 (in the case of the block group to the left) or C0 (in the case of the block group above). If the neighboring block N is the last block (Y in S208), control proceeds to a decision on the block group M (S213). Otherwise (N in S208), the variable N is updated according to the order of processing in the block group (S209), whereupon step S201 and the subsequent steps are repeated. As described above, neighboring blocks in the block groups located in the same picture as the target prediction block are defined as representative reference blocks and the coding information thereof is derived.

Referring back to FIG. 32, the reference picture number of another picture occurring at a different point of time and referred to by the target prediction block as a merge candidate is decisioned (S104). The process of step S101 according to the first embodiment may be performed without modification, but a method based on the coding information of the block groups neighboring to the left and above in the same picture and derived in the previous step (S103) will be described hereinafter with reference to FIGS. 34A and 34B.

First, the flag availableFlagM indicating whether the neighboring block in each of the block group A neighboring to the left and the block group B neighboring above, which are derived in step S103, is available or not, and the reference picture number refIdxLXM are input, where M is either A or B.

Figure 34A:
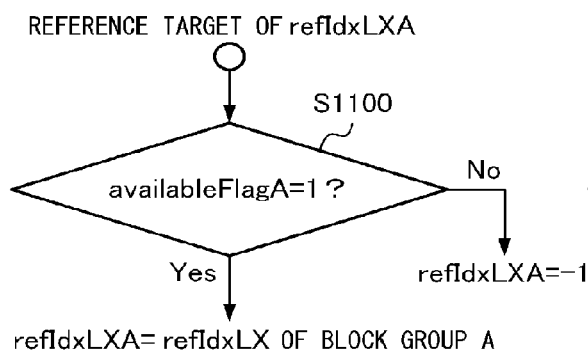
FIGS. 34A and 34B show the operation performed in the coding information derivation unit according to the second embodiment to select candidate reference picture numbers of pictures referred to by the target prediction block.

First, the block group A neighboring to the left will be discussed with reference to FIG. 34A. The flag availableFlagA indicating whether the neighboring block in the block group neighboring to the left is available (S1100) is examined. If availableFlagA is 1 (Y in S1100), refIdxLXA, i.e., the reference picture number of the neighboring block in the block group neighboring to the left is defined as the reference picture number. Otherwise (N in S1100), refIdxLXA is set to −1.

Figure 34B:
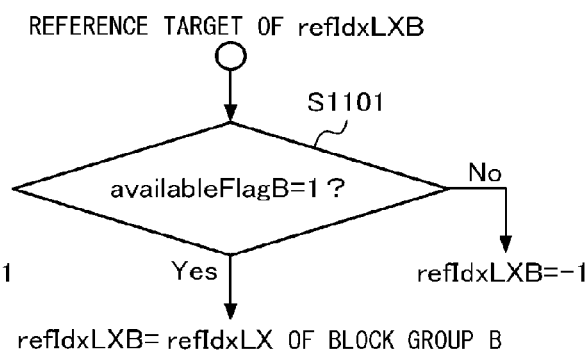

Similarly, the group B neighboring above will be discussed with reference to FIG. 34B. The flag availableFlagB indicating whether the neighboring block in the block group neighboring above is available (S1101) is examined. If availableFlagB is 1 (Y in S1101), refIdxLXB, i.e., the reference picture number of the neighboring block in the block group neighboring above is defined as the reference picture number. Otherwise (N in S1101), refIdxLXB is set to −1.

The reference picture number refIdxLXCol of the block neighboring the block located in another picture at a different point of time at a position equivalent to that of the target prediction block is decisioned in accordance with the reference picture numbers refIdxLXM (M is A, B) of the respective block groups thus derived. FIG. 35 shows decision based on the reference picture number refIdxLXM. The first row of FIG. 35 shows a case where refIdxLXA and refIdxLXB have the same value that is not −1. In this case, refIdxLXA is selected. The second row shows a case where refIdxLXA and refIdxLXB have different values and neither of them is −1. In this case, the minimum reference picture number is selected. The third and fourth rows show cases where one of refIdxLXA and refIdxLXB has a value −1. In this case, one that does not have a value −1 is selected. The fifth row shows a case where both have a value −1. In this case, refIdxCol is set to "0". The reference picture number of the target prediction block is decisioned as described above but other methods may be used instead.

Referring back to FIG. 32, a decision is made as to the availability of the coding information of the block neighboring the block located in another picture at a different point of time at a position equivalent to that of the target prediction block, and the coding information is derived accordingly (S102). The step is the same as step S102 of the first embodiment so that the description is omitted. The coding information of the neighboring block thus obtained is entered in the reference candidate list construction unit 311.

In the second embodiment, as in the first embodiment, the reference candidate list storage memory 314 is provided with a reference candidate list as a storage area for adding candidates of coding information of the reference neighboring blocks. The candidates of coding information of the neighboring blocks are arranged in the order priority. The candidates of coding information of the neighboring blocks are added in the reference candidate list in the order of priority. This reduces the code size of the indices merge_idx in the reference candidate list.

The reference candidate list construction unit 311 operates in the same way as in the first embodiment by making decision on the flag availableFlagM (M is A, B, T) indicating the availability of the reference block group neighboring to the left and the block group above and of the block neighboring the block located in another picture at a different point of time at a position equivalent to that of the target prediction block. The reference candidate list construction unit 311 adds the coding information of the neighboring block in the reference candidate list candList. The order of neighboring blocks according to which the variable N is updated is configured to be identical to the order of priority of storage in the reference candidate list. It will be assumed in the second embodiment that the candidates are stored in the order left, top, and the candidate at a different time (A, B, T).

Provided that all of the reference neighboring blocks added in the reference candidate list are available, the above steps will produce a list of reference candidates in the order shown in FIG. 36. The order of priority is indicated by the indices. The codewords are listed in the rightmost column of the reference candidate list. The maximum codeword size is 2 bits. The parenthesis in the reference candidate list represents one of the neighboring blocks in the neighboring block group to the left or the block above selected through the process performed in the coding information derivation unit 310 in the order from left to right.

The coding information stored in the reference candidate list and decisioned by the identical information detection unit 312 as being identical is deleted. The indices and coding information in the reference candidate list constructed by the reference candidate list construction unit 311 are output. The reference candidate list is output as a merge list and the indices in the list are output as merge indices. The output is provided to the motion compensation prediction unit 105 and the prediction method decision unit 107 in the moving picture coding device 100.

A description will now be given of the merge decision unit 206 according to the second embodiment provided in the moving picture decoding device 200 and corresponding to the merge detection unit 106 according to the second embodiment provided in the moving picture coding device 100. The merge decision unit 206 is configured as illustrated in FIG. 22 described in the first embodiment. The process in the coding information derivation unit 310 differs from the operation according to the first embodiment. The other components, including the reference candidate list construction unit 311, the identical information detection unit 312, the reference candidate list storage memory 314, and the selection unit 315 have the same functions as those in the first embodiment.

The coding information derivation unit 310 of the merge decision unit 206 according to the second embodiment has the same function as the coding information derivation unit 310 of the merge detection unit 106 according to the second embodiment. Thus, the same reference candidate list as constructed in the merge detection unit 106 according to the second embodiment is constructed in the steps through the identical information detection unit 312 of the merge decision unit 206 according to the second embodiment. A description will be given of the selection unit 315, which acquires the coding information of the reference neighboring block from the constructed reference candidate list in the merge mode. The selection unit 315 selects the neighboring block in the reference candidate list designated by the index for identifying the reference neighboring block decoded in the first bitstream decoding unit 202. The selection unit 315 supplies the selected coding information to the motion compensation prediction unit 207 and to the coding information storage memory 210.

Figure 37:
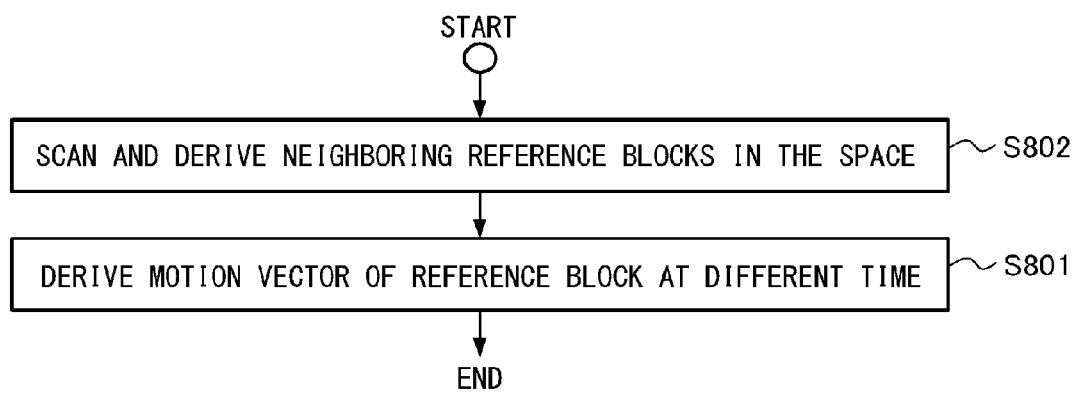
FIG. 37 is a flowchart showing the operation of the coding information derivation unit of the motion vector prediction unit according to the second embodiment.

A description will be given of the motion vector prediction unit 103 according to the second embodiment shown in FIG. 2 illustrating the configuration of the moving picture coding device 100. The motion vector prediction unit 103 according to the second embodiment is configured as shown in FIG. 23 described in the first embodiment. The process in the coding information derivation unit 320 is different from that of the first embodiment so that the operation of the coding information derivation unit 320 according to the second embodiment will be highlighted below. FIG. 37 is a flowchart showing the operation of the coding information derivation unit 330.

Figure 38:
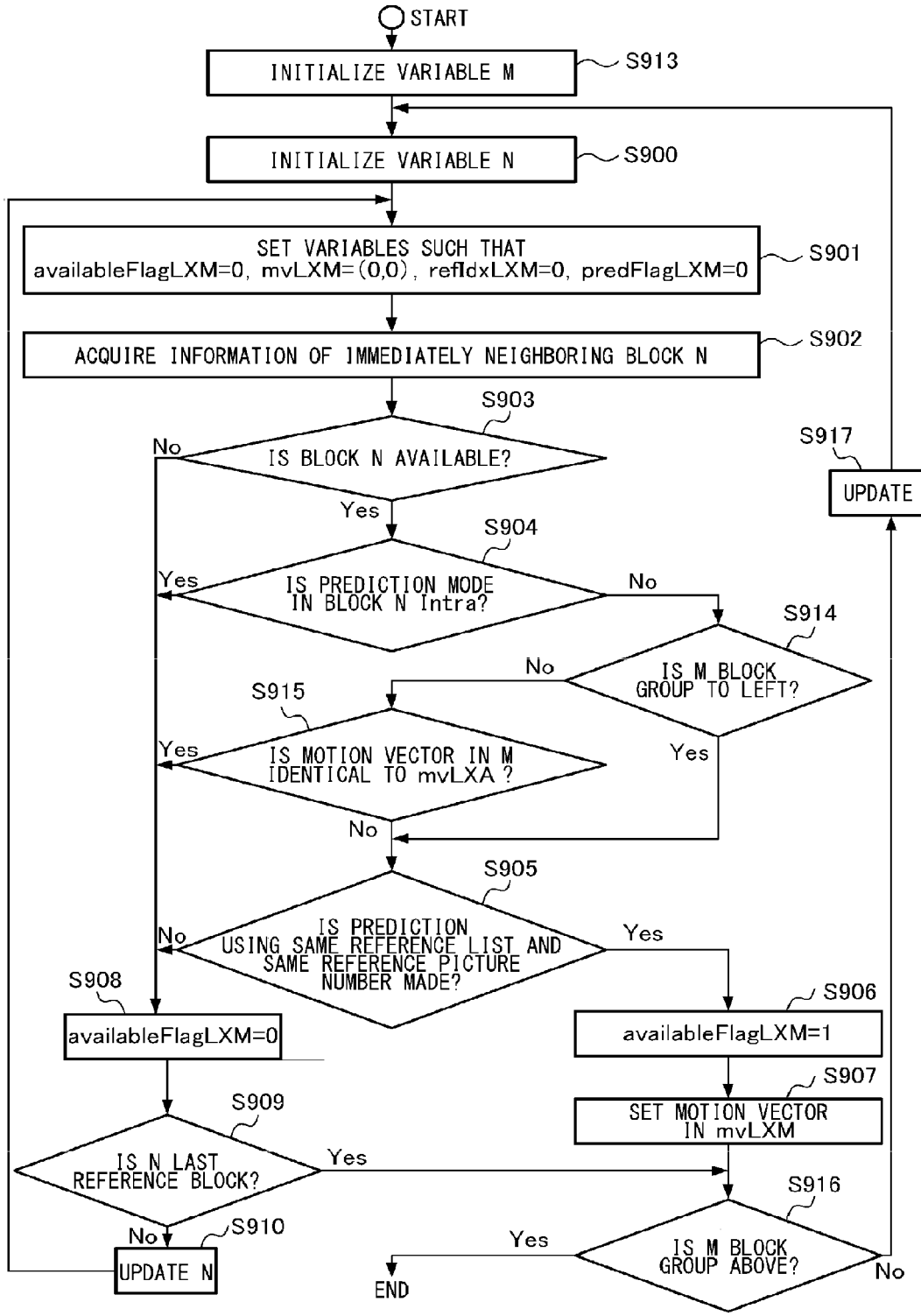
FIG. 38 is a flowchart showing the operation performed in the coding information derivation unit according to the second embodiment to select an immediately neighboring block located in the same picture as the target prediction block.

Initially, the destination of the output of the inter-prediction information detection unit 104 is switched to the motion vector prediction unit 103 according to the prediction mode input to the switch 108 and controlled by the moving picture coding device 100. The coding information of the reference neighboring blocks referred to by the target prediction block and stored in the temporary memory 303 in the inter-prediction information detection unit 104 is input to the coding information derivation unit 320. The initially input coding information of the neighboring blocks is examined to decision whether the coding information of the neighboring block located in the same picture as the target prediction block is available and the coding information is derived accordingly (S802). FIG. 38 shows the detailed flow of decision for each neighboring block located in the same picture as the target prediction block.

Compared with the flowchart shown in FIG. 25 of the first embodiment, steps S913, S914, S915, S916, and S917 are added. The other steps are identical to those in the first embodiment so that only the added steps will be described in detail.

First, the variable M indicating the block group is initialized (S913). It will be assumed that the block group neighboring to the left is defined as an initial group. The variable M is set to A, which is a value indicating the block group to the left. Subsequently, the variable N indicating the block in the block group is initialized (S900). The variable N is defined in the order of processing in the aforementioned block group. N is updated in the order A0, A1 in the block group to the left and in the order B0, B1, C0 in the group above. Subsequent steps S901 through S910 are basically identical to those of the first embodiment. A decision is made as to whether the prediction mode in the neighboring mode N is Intra (S904). The steps performed if the prediction mode in the neighboring block N is not Intra (N in S904) are different from those of the first embodiment.

A decision is made as to whether the prediction mode in the neighboring block N is Intra (S904). If the prediction mode in the neighboring block is not Intra (N in S904), a decision is then made as to whether M is the block group to the left (S914). If M is the block group to the left (Y in S914), control proceeds to step S905. Only when M is the block group above (N in S914), a decision is made as to whether the motion vector mvLXA of the neighboring block selected in the block group to the left is identical to the motion vector of the neighboring block N (S915).

Since the neighboring block representing the block group to the left is selected initially, the motion vector thereof is stored and used for decision on the block group above. These steps prevent the subsequent motion vector from being a duplicate of the motion vector of the neighboring block representing the block group to the left so that the scope of selection of the reference target is expanded. For reduction of the processing volume, control can directly proceed to step S905, bypassing steps S914 and S915.

If the motion vector mvLXA of the neighboring block selected in the block group to the left is identical to the motion vector of the neighboring block N (Y in S915), control proceeds to step S908. If the motion vectors are different (N in S915), a decision is made as to whether prediction using the same reference list and the same reference picture number as used in the prediction in the target prediction block is performed in the neighboring block N (S905).

If motion vector based prediction using the same reference list and the same reference picture number as used in the prediction in the target prediction block is performed in the neighboring block N (Y in S905), availableFlagLXN is set to "1" (S906) and the motion vector of the neighboring block N is substituted into mvLXN (S907). Once the motion vector for the block group M is set, a decision is made as to whether the variable M is B, which indicates the block group above (S916), in order to process the next block group, namely, the block group neighboring the target block above. If M is not B (above) (N in S916), M is updated to B (above) (S917), whereupon step S900 and the subsequent steps are repeated. If M is B (above) (Y in S916), the process is terminated.

If the neighboring block N is not available (N in S903), or if the prediction mode in the neighboring block N is Intra (Y in S904), or if the motion vector mvLXA of the neighboring block selected in the block group to the left is identical to the motion vector of the neighboring block N (Y in S915), or if prediction using the same reference list and the same reference picture number is not performed (N in S905), availableFlagLXM is set to "0" (S908), and a decision is made as to whether the neighboring block N is the last of the neighboring blocks in the block group M (S909). The variable N is updated in the order of processing in the aforementioned block group. A decision is made as to whether N is A1 (in the case of the block group to the left) or C0 (in the case of the block group above).

If the neighboring block N is the last block (Y in S909), control proceeds to a decision on the block group M (S916). Otherwise (N in S909), the variable N is updated according to the order of processing in the block group (S910), whereupon step S901 and the subsequent steps are repeated. As described above, neighboring blocks in the block groups located in the same picture as the target prediction block are defined as representative reference blocks and the coding information thereof is derived.

In the second embodiment, as in the first embodiment, the flag indicating the availability of the neighboring block availableFlagLXM may be set to 1 (available) if the prediction performed in the neighboring block meets any of the following conditions, and the associated block is identified as a candidate of reference neighboring block and the associated coding information may be derived accordingly.

Condition 1: same reference list and same reference picture number

Condition 2: different reference list and same reference picture number

Condition 3: same reference list and different reference picture number

Condition 4: different reference list and different picture number

Figure 39:
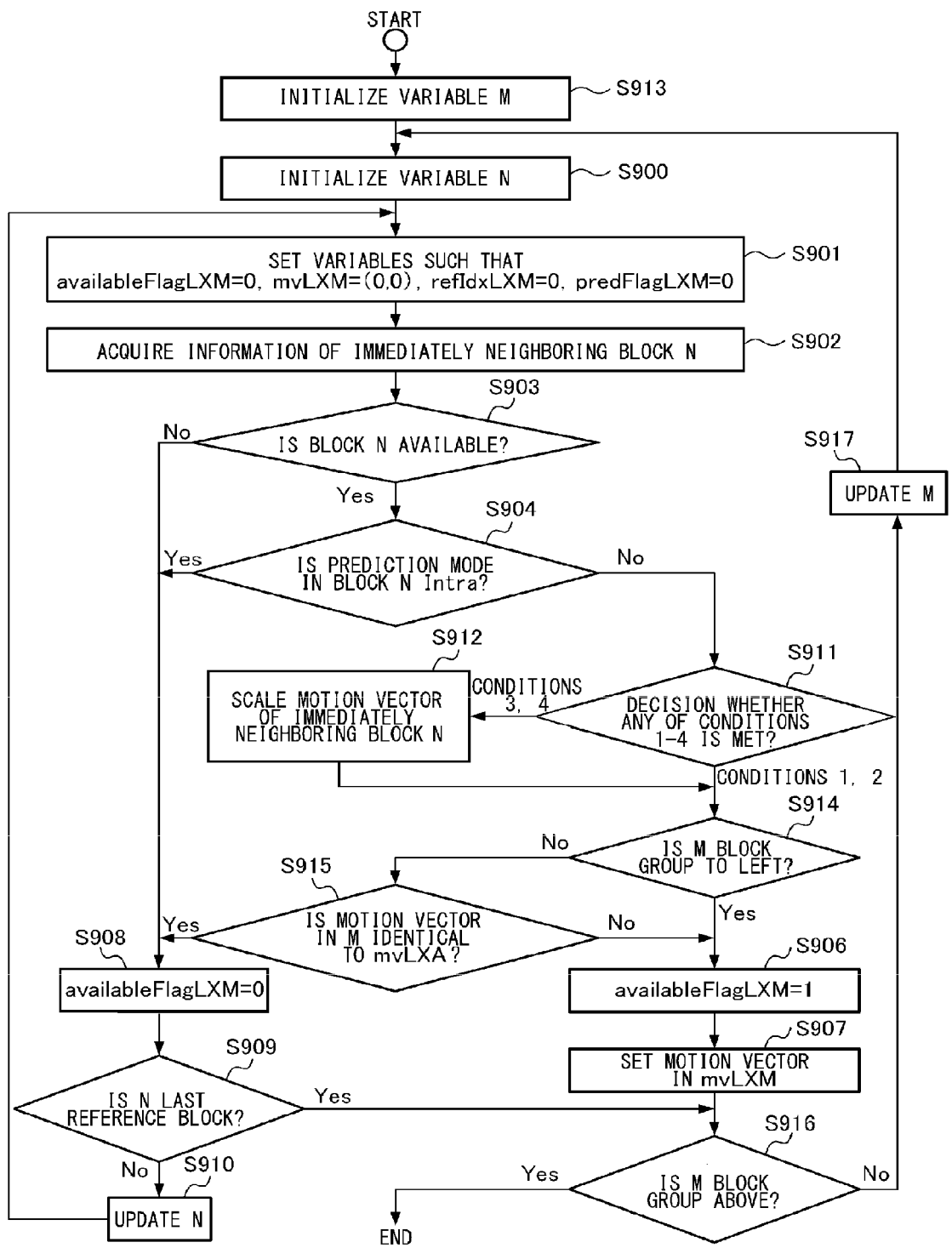
FIG. 39 is a flowchart showing an alternative operation performed in the coding information derivation unit according to the second embodiment to select an immediately neighboring block located in the same picture as the target prediction block.

The flow of the process in this case will be shown in FIG. 39. FIG. 39 differs from FIG. 38 in that step S905 of FIG. 38, which only examines Condition 1, is deleted. A decision as to whether any of Conditions 1-4 is met is made in step S911. Step S912 is added to scale the motion vector if neither of Conditions 1 and 2 is met.

First, the variable M indicating the block group is initialized (S913). It will be assumed that the block group neighboring to the left is defined as an initial group. The variable M is set to A. Subsequently, the variable N indicating the block in the block group is initialized (S900). The variable N is defined in the order of processing in the aforementioned block group. N is updated in the order A0, A1 in the block group to the left and in the order B0, B1, C0 in the group above. Subsequent steps S901 through S910 are basically identical to those in FIG. 26 of the first embodiment. A decision is made as to whether the prediction mode in the neighboring mode N is Intra (S904). The steps performed if the prediction mode in the neighboring block N is not Intra (N in S904) are different from those in FIG. 38 of the second embodiment.

If the prediction mode of the neighboring block N is not Intra (N in S904), namely, if the mode is the Inter mode, a decision is made as to whether any of Conditions 1-4 is met by comparing the coding information from the prediction in the target prediction block and the coding information of the neighboring block N (S911). If Condition 1 or Condition 2 is met, control proceeds to a decision as to whether M indicates the block group to the left (S914). If Condition 3 or Condition 4 is met, the motion vector for the neighboring block N is scaled (S912) as in S912 in FIG. 26 of the first embodiment, and control proceeds to a decision as to whether M indicates the block group to the left (S914).

If M indicates the block group to the left (Y in S914), availableFlagLXM is set to "1" (S906). If M indicates the block group above (N in S914), a decision is made as to whether the motion vector mvLXA of the neighboring block selected in the block group to the left is identical to the motion vector of the neighboring block N (S915). For reduction of the processing volume, control can directly proceed to step S905, bypassing steps S914 and S915.

If the motion vector mvLXA of the neighboring block selected in the block group to the left is identical to the coding information of the neighboring block N (Y in S915), availableFlagLXN is set to "0" (S908). If not (N in S915), availableFlagLXM is set to "1" (S906).

As in step S970 in FIG. 26 of the first embodiment, the motion vector mvLX for the neighboring block N using the same reference list (in case Condition 1 is met), or the motion vector mvLY using the different reference list (in the case Condition 2 is met), or the motion vector mvLX using the same reference list (in the case Condition 3 is met) and converted by scaling, or the motion vector mvLY using the different reference list (in the case Condition 4 is met) and converted by scaling is substituted into mvLXM (S907).

Once the motion vector for the block group M is set, a decision is made as to whether the variable M indicates the block group above (S916) in order to process the next block group, namely, the block group neighboring the target block above. If M does not indicate the block above (N in S916), M is updated to B (above) (S917), whereupon step S900 and the subsequent steps are repeated. If M indicates the block above (Y in S916), the process is terminated.

If availableFlagLXM is set to "0" (S908), a decision is made as to whether the neighboring block N is the last of the neighboring blocks in the block group M (S909). The variable N is updated in the order of processing in the aforementioned block group. A decision is made as to whether N is A1 (in the case of the block group to the left) or C0 (in the case of the block group above). If the neighboring block N is the last block (Y in S909), control proceeds to a decision on the block group M (S916). Otherwise (N in S909), the variable N is updated according to the order of processing in the block group (S910), whereupon step S901 and the subsequent steps are repeated. As described above, neighboring blocks in the block groups located in the same picture as the target prediction block are defined as representative reference blocks and the motion vector thereof is derived.

Referring back to FIG. 37, a decision is made as to the availability of the coding information of the block neighboring the block located in another picture at a different point of time at a position equivalent to that of the target prediction block, and the coding information is derived accordingly (S801). The step is the same as step S801 of the first embodiment so that the description is omitted. The coding information of the neighboring block thus obtained is entered in the reference candidate list construction unit 321. The reference candidate list construction unit 321 constructs reference candidate lists for the two reference lists, namely, the L0 reference list and the L1 reference list. In this specification, only one reference candidate list will be referred to in describing the motion estimation mode, unless otherwise specified. Only one reference candidate list will be illustrated in the associated drawings.

In the second embodiment, the reference candidate list storage memory 324 is provided with a reference candidate list as a storage area for adding candidates of coding information of the reference neighboring blocks. The candidates of coding information of the neighboring blocks are arranged in the order priority. The candidates of coding information of the neighboring blocks are added in the reference candidate list storage memory 324 in the order of priority. This reduces the code size of the indices merge_idx_l0 and mvp_idx_l1 in the reference candidate list.

The code size is reduced by locating elements with higher priority order toward the top of the reference candidate list. The index indicating the position of each element in the reference candidate list is assigned in the ascending order, starting with 0. The reference candidate list provided in the reference candidate list storage memory 324 is built as a list. The reference candidate list is provided with an array area for storing, as elements, an index indicating the location inside the reference candidate list and a candidate, corresponding to the index, of coding information of the reference neighboring block. The array area is denoted by candListLX. Indices start with 0. The storage area for the reference candidate list candListLX stores the candidate of coding information of the reference neighboring block. In the following description of the steps, the coding information assigned an index i added in the reference candidate list candListLX will be denoted by candListLX [i] so as to distinguish it from the reference candidate list candListLX by using array notation. Unless otherwise specified, the coding information stored in the storage area for the reference candidate list will be denoted by the names of the positions (A0, A1, B0, B1, C0, T) of the reference neighboring blocks.

The reference candidate list construction unit 321 operates in the same way as in the first embodiment by making decision on the flag availableFlagM (M is A, B, T) indicating the availability of the reference block group neighboring to the left and the block group above and of the block neighboring a block located in another picture at a different point of time at a position equivalent to that of the target prediction block. The reference candidate list construction unit 321 adds the coding information of the neighboring block in the reference candidate list candListLX. The order of neighboring blocks according to which the variable N is updated is configured to be identical to the order of priority of storage in the reference candidate list. It will be assumed in the second embodiment that the candidates are stored in the order left, top, and the candidate at a different time (A, B, T). Provided that all of the reference neighboring blocks added in the reference candidate list are available, the above steps will produce a list of reference candidates in the order shown in FIG. 40.

The order of priority is indicated by the indices. The codewords are listed in the rightmost column of the reference candidate list. The maximum codeword size is 2 bits. The parenthesis in the reference candidate list represents one of the neighboring blocks in the neighboring block group to the left or the block above selected through the process performed in the coding information derivation unit 320 in the order from left to right. Provided that only one reference neighboring block is available, the maximum codeword size will be 0 so that there will no need for codewords. The candidate of coding information of the neighboring block solely decisioned as being available is uniquely identified as the reference target.

The coding information stored in the reference candidate list and decisioned by the identical information detection unit 322 as being identical is deleted. The motion vector difference derivation unit 326 uses the motion vector included in the coding information in the reference candidate list thus constructed as a motion vector predictor. The motion vector difference derivation unit 326 derivates a motion vector difference from the motion vector estimated by the motion vector estimation unit 102 and the motion vector predictor. The motion vector difference derivation unit 326 supplies the derived motion vector difference to the output unit 323.

Finally, the output unit 323 outputs the indices and the motion vector differences in the constructed reference candidate list. The reference candidate list is output as an MVP list and the index in the list is output as an MVP index. The output is provided to the prediction method decision unit 107 in the moving picture coding device 100.

A description will be given of the motion vector derivation unit 204 according to the second embodiment provided in the moving picture decoding device 200 and corresponding to the motion vector prediction unit 103 according to the second embodiment provided in the moving picture coding device 100. The motion vector derivation unit 204 is configured as illustrated in FIG. 30. The process in the coding information derivation unit 320 differs from the operation according to the first embodiment. The other components, including the reference candidate list construction unit 321, the identical information detection unit 322, the reference candidate list storage memory 324, the selection unit 325, and the motion vector addition unit 327 have the same functions as those in the first embodiment.

The coding information derivation unit 320 has the same function as the coding information derivation unit 320 of the motion vector prediction unit 103 according to the second embodiment. Thus, the same reference candidate list as constructed in the motion vector prediction unit 103 according to the second embodiment is constructed in the steps through the identical information detection unit 322 of the motion vector derivation unit 204. A description will be given of the selection unit 325, which acquires the coding information of the reference neighboring block from the constructed reference candidate list in the motion estimation mode. The selection unit 325 selects the neighboring block in the reference candidate list designated by the index for identifying the reference neighboring block decoded in the first bitstream decoding unit 202. The selection unit 325 outputs the motion vector from the coding information of the neighboring block in the selected reference candidate list as a motion vector predictor. The motion vector addition unit 327 adds the motion vector predictor to the motion vector difference decoded in the first bitstream decoding unit 202 so as to derive the motion vector. The motion vector addition unit 327 supplies the motion vector to the motion compensation prediction unit 207 and supplies the coding information of the neighboring block in the selected list to the coding information storage memory 210.

In the second embodiment, one neighboring block is selected from each block group as a representative of the reference neighboring blocks. Alternatively, a plurality of neighboring blocks may be selected as representatives. The number is set so as not to exceed the number of blocks in the block group.

(Third Embodiment)

In the third embodiment, the method of selecting the reference neighboring block is changed according to the prediction mode. A description will be made with reference to the arrangement of neighboring blocks in FIG. 31A. In the merge mode, the coding information of one of six neighboring blocks A0, A1, B0, B1, C0, T is selected as the reference target. In the motion estimation mode, of the six neighboring blocks A0, A1, B0, B1, C0, and T, A0 and A1 are placed in a block group neighboring the target prediction block to the left, and B0, B1, and C are placed in a block group neighboring above. One reference neighboring block is selected to represent each block group. Of the three neighboring blocks including the blocks respectively representing the block group to the left and the block group above and the block T, the coding information of one neighboring block is selected as the reference target. In other words, the method according to the first embodiment is used in the merge mode, and the method according to the second embodiment is used in the motion estimation mode.

Since the coding information of the candidate of reference neighboring block is directly used for inter-prediction so that a larger number of candidates are added in the list than in the motion estimation mode in order to provide a broad selection. This is because the merge mode is capable of transmitting a larger volume of information (motion vector, reference index, reference list) using a smaller code size than the motion estimation mode and because the coding efficiency is improved by maintaining candidates of neighboring blocks sufficient to provide a broad the scope of selection rather than by reducing the code size of merge indices. In the motion estimation mode, on the other hand, the coding information including a motion vector difference is coded instead of directly using the coding information of the candidate of reference neighboring block. Therefore, a scan is performed to reduce the number of candidates before adding the candidates in the list. This is because reduction of the code size of MVP indices by reducing the number of candidates improves the coding efficiency.

Provided that all of the reference neighboring blocks are available, the reference candidate list according to the third embodiment is constructed for each prediction mode as shown in FIG. 41. The merge detection unit 106 and the motion vector prediction unit 103 construct respective reference candidate lists. Since the total number of listed candidates differs between the lists, the lists contain different codewords in the third and the subsequent entries. The codewords are optimized so that improvement in the coding efficiency is expected. The codeword "11" (binary notation) according to the motion estimation mode may be replaced by "110" (binary notation) according to the merge mode in the same row to ensure that the codeword is used in a consistent manner at the cost of increasing the code size.

(Fourth Embodiment)

The fourth embodiment is directed to a method of selecting two representative neighboring blocks from the neighboring blocks located in the same picture as the target prediction block (hereinafter, referred to as neighboring blocks in the space). The fourth embodiment is similar to the second embodiment in that two neighboring blocks are selected. In the second embodiment, the neighboring blocks in the space are organized into two block groups and one representative neighboring block is selected from each block group. The fourth embodiment differs in that the entirety of the neighboring blocks in the space is defined as one block group and two representative neighboring blocks are selected from the group.

As in the second embodiment, three neighboring blocks including: two neighboring blocks representing the neighboring blocks located in the same picture as the target prediction block: and a block neighboring a block located in another picture at a different point of time at a position equivalent to that of the target prediction block, are added in the reference candidate list. The total number of neighboring blocks added in the reference candidate list can be reduced as compared with the first embodiment. Therefore, the number of times of comparison between coding information in the identical information detection unit 312 and the number of times of comparison between motion vectors in the identical information detection unit 322 can be reduced accordingly. Further, the size of codewords assigned to indices in the reference candidate list is reduced so that the code size of indices in the reference candidate list can be reduced. Further, by changing the order of processing the neighboring blocks depending on the prediction mode, the neighboring block suitable for the prediction mode is selected and the coding efficiency is expected to be improved.

If the prediction mode is the merge mode, the merge detection unit 106 and the merge decision unit 206 process blocks in the order A1, B1, B0, A0, C0 (or B1, A1, A0, B0, C0) in FIG. 9A. In the case of the motion estimation mode, the motion vector prediction unit 103 and the motion vector derivation unit 204 process blocks in the order B0, A0, A1, B1, C0 (or A0, B0, B1, A1, C0) in FIG. 9A.

In the merge mode, the neighboring blocks A1 and B1 are selected and added in the candidate list in preference to the other blocks. This is because the neighboring blocks A1 ad B1 are contiguous with the target prediction block at the sides and so the coding information of the neighboring blocks A1 and B1 is more likely to be equal to that of the target prediction block than the other neighboring blocks (A0, B0, C). Addition of likely candidates improves the coding efficiency in the merge mode. Meanwhile, in the motion estimation mode, the neighboring blocks A0 and B0 are selected and added in the candidate list in preference to the other blocks. Because the neighboring blocks A0 and B0 are most distanced from each other in the pairs of neighboring blocks and the likelihood of adding motion vectors of different properties is high accordingly, the scope of selection of the motion vector predictor is broadened. These measures will reduce the code size of the motion predictor different as transmitted and improve the coding efficiency in the motion estimation mode.

The configuration of the moving picture coding device 100 and the moving picture decoding device 200 according to the fourth embodiment is the same as that of the first and second embodiments. The operation according to the fourth embodiment is the same as that of the second embodiment except for the operation of the coding information derivation unit 310 of FIGS. 11 and 22, and the coding information derivation unit 320 of FIGS. 23 and 30. Only the operation according to the fourth embodiment different from that of the second embodiment will be described below in detail.

Figure 42:
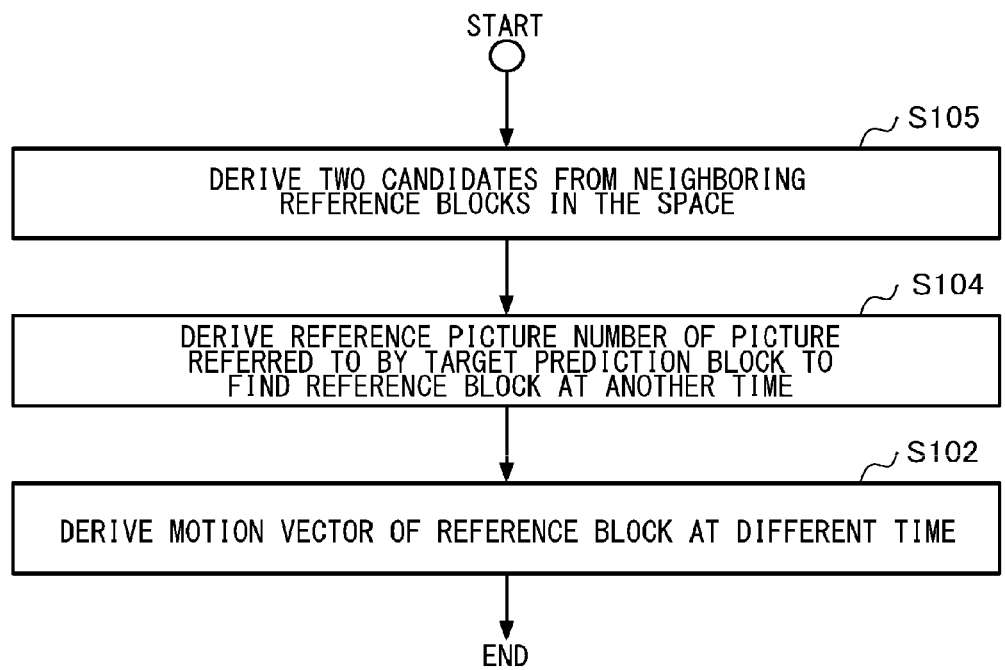
FIG. 42 is a flowchart showing the operation of the coding information derivation unit of the merge detection unit according to the fourth embodiment.

A description will first be given of the operation of the merge detection unit 106 in the moving picture coding device. The merge detection unit 106 is configured as illustrated in FIG. 11 described in the second embodiment. The process in the coding information derivation unit 310 is different from that of the second embodiment so that the operation of the coding information derivation unit 310 according to the fourth embodiment will be described. FIG. 42 is a flowchart showing the operation of the coding information derivation unit 310 according to the fourth embodiment.

Initially, the destination of the output of the inter-prediction information detection unit 104 is switched to the merge detection unit 106 according to the prediction mode input to the switch 108 and controlled by the moving picture coding device 100. The coding information of the reference neighboring blocks referred to by the target prediction block and stored in the temporary memory 303 in the inter-prediction information detection unit 104 is input to the coding information derivation unit 310.

Figure 43:
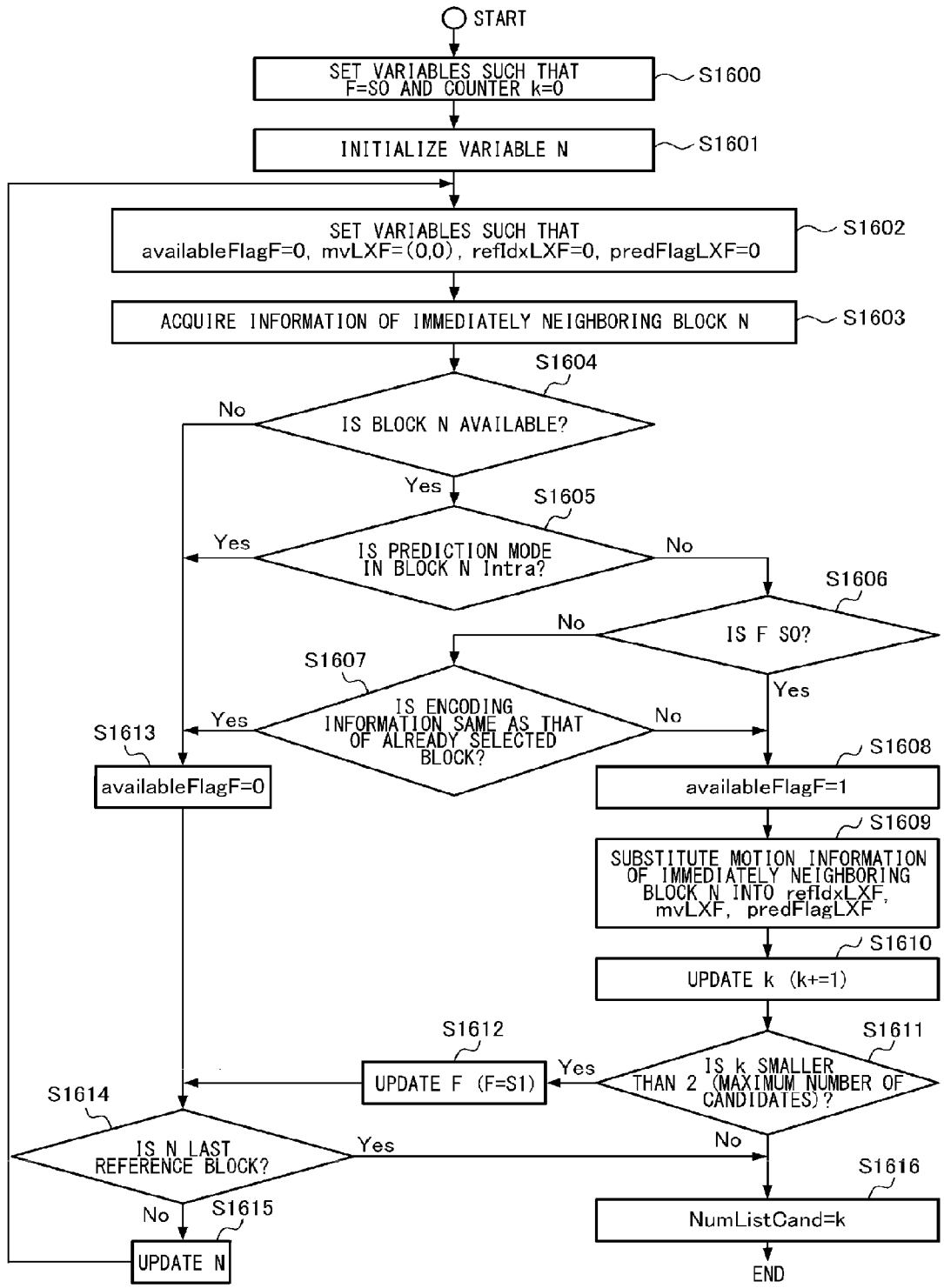
FIG. 43 is a flowchart showing the operation performed in the coding information derivation unit according to the fourth embodiment to select an immediately neighboring block located in the same picture as the target prediction block.

The initially input coding information of the neighboring blocks is examined to decision whether the coding information of the neighboring block located in the same picture as the target prediction block is available and two neighboring blocks are derived accordingly (S105). FIG. 43 shows the detailed flow of decision for each neighboring block located in the same picture as the target prediction block.

A variable F indicating the selected neighboring block is set to S0, and a counter k is set to 0 (S1600). S0 in the variable F indicating the selected neighboring block indicates the first candidate of neighboring block initially selected, and S1 indicates the second candidate of neighboring block selected secondly.

Subsequently, the variable N indicating the neighboring block being processed is initialized to A1 (S1601). The variable N indicating the neighboring block being processed is defined in the order A1, B1, B0, A0, C0. N is updated in this order.

Subsequently, variables for storing the coding information of the neighboring block used in subsequent decision are initialized (S1602). The variables include: a flag availableFlagF indicating whether the neighboring block is available; a motion vector mvLXF, a reference picture number refIdxLXF, and a flag predFlagLXF indicating the availability of a direction of prediction. The variables are initialized as follows.
availableFlagF=0
mvLXF=(0,0)
refIdxLXF=0
predFlagLXF=0
where 0 or 1, indicating a direction of prediction, is substituted into the suffix X. The position and coding information of the neighboring block with the variable N indicating the neighboring block being processed (hereinafter, referred to as the neighboring block N) are acquired (S1603).

Decision is made as to whether the neighboring block N is available based on the acquired position of the neighboring block N (S1604). For example, if the target prediction block is located at the left edge of the picture, there will be no neighboring blocks to the left of the target prediction block so that there should not be corresponding coding information in the coding information storage memory 114. In this case, a decision of unavailability is made.

The neighboring block N is unavailable (N in S1604), availableFlagF is set to "0" (S1613). If the neighboring block N is available (Y in S1604), a decision is made as to whether the prediction mode in the neighboring mode N is Intra (S1605). If the prediction mode of the neighboring block N is Intra (Y in S1605), availableFlagF is set to "0" (S1613).

The prediction mode of the neighboring block N is not Intra (N in S1605), namely, if the mode is the Inter mode, control proceeds to a decision as to whether F is S0 (S1606). If F is S0 (Y in S1606), availableFlagF (availableFlagS0) is set to "1" (S1608).

F is not S0 (N in S1606), a decision is made as to whether the coding information of the neighboring block already selected is identical to the coding information of the neighboring block N (S1607). If the coding information of the neighboring block already selected is identical to the coding information of the neighboring block N (Y in S1607), availableFlagF is set to "0" (S1613).

More specifically, given that the maximum number of neighboring blocks in the space is 2, the coding information selected as the first candidate is stored and used for comparison and decision for selecting the second candidate. These steps prevent the coding information of the second candidate of neighboring block from being a duplicate of the coding information of the first candidate of neighboring block. Therefore, a larger number of candidates than otherwise are made available for selection. For reduction of the processing volume, control can directly proceed to step S1608, bypassing steps S1606 and S1607.

The coding information of the neighboring block selected as the first candidate differs from the coding information of the neighboring block N (Y in S1607), availableFlagF (availableFlagS1) is set to "1" (S1608). Subsequently, the coding information of the neighboring block N is substituted into refIdxLXF, mvLXF, and predFlagLXF (S1606).

Subsequently, the counter k is updated by being incremented by 1 (S1610), and a decision is made as to whether the counter k is smaller than 2, which is the maximum number of candidates in the space (S1611). If the counter k is equal to 2, which is the maximum number of candidates in the space (Y in S1611), k is substituted into the variable NumListCand, indicating the number of selected candidates in the space (S1616), whereupon the process is terminated.

If availableFlagF is set to "0" (S1613), a decision is made as to whether the neighboring block N is the last of the neighboring blocks (S1614). If k is smaller than 2, indicating the maximum number of candidates in the space (N in S1611), F is updated to S1 (S1612), and a decision is made as to whether the neighboring block N is the last of the neighboring blocks (S1614). The variable N is updated in the order A1, B1, B0, A1, and C0. A decision is made as to whether N is C0.

If the neighboring block N is the last block (Y in S1614), k is substituted into the variable NumListCand, indicating the number of selected candidates in the space (S1616), whereupon the process is terminated. If the neighboring block N is not the last block (N in S1614), the variable N is updated in the order A1, B1, B0, A1, and C0 (S1615), and step S1602 and the subsequent steps are repeated. As described above, two reference blocks representing the neighboring blocks in the block group located in the same picture as the target prediction block are identified and the coding information thereof is derived.

Referring back to FIG. 42, a decision is made on the reference picture number of another picture occurring at a different point of time and referred to by the target prediction block to derive, as a candidate, the coding information of the block neighboring the block located in another picture at a different point of time at a position equivalent to that of the target prediction block (S104). The process in step S104 is the same as that of step S104 of the first and second embodiments. Subsequently, a decision is made as to the availability of the coding information of the block neighboring the block located in another picture at a different point of time at a position equivalent to that of the target prediction block, and the coding information is derived accordingly (S102). The process of step S102 according to the fourth embodiment is the same as that of step S102 of the first and second embodiments.

The coding information of the neighboring block thus obtained is entered in the reference candidate list construction unit 311. In the fourth embodiment, as in the second embodiment, the reference candidate list storage memory 314 is provided with a reference candidate list as a storage area for adding a candidate of coding information of the reference neighboring block. The candidates of coding information of the neighboring blocks are arranged in the order priority. The candidates of coding information of the neighboring blocks are added in the reference candidate list in the order of priority. This reduces the code size of the indices merge_idx in the reference candidate list.

Figure 19:
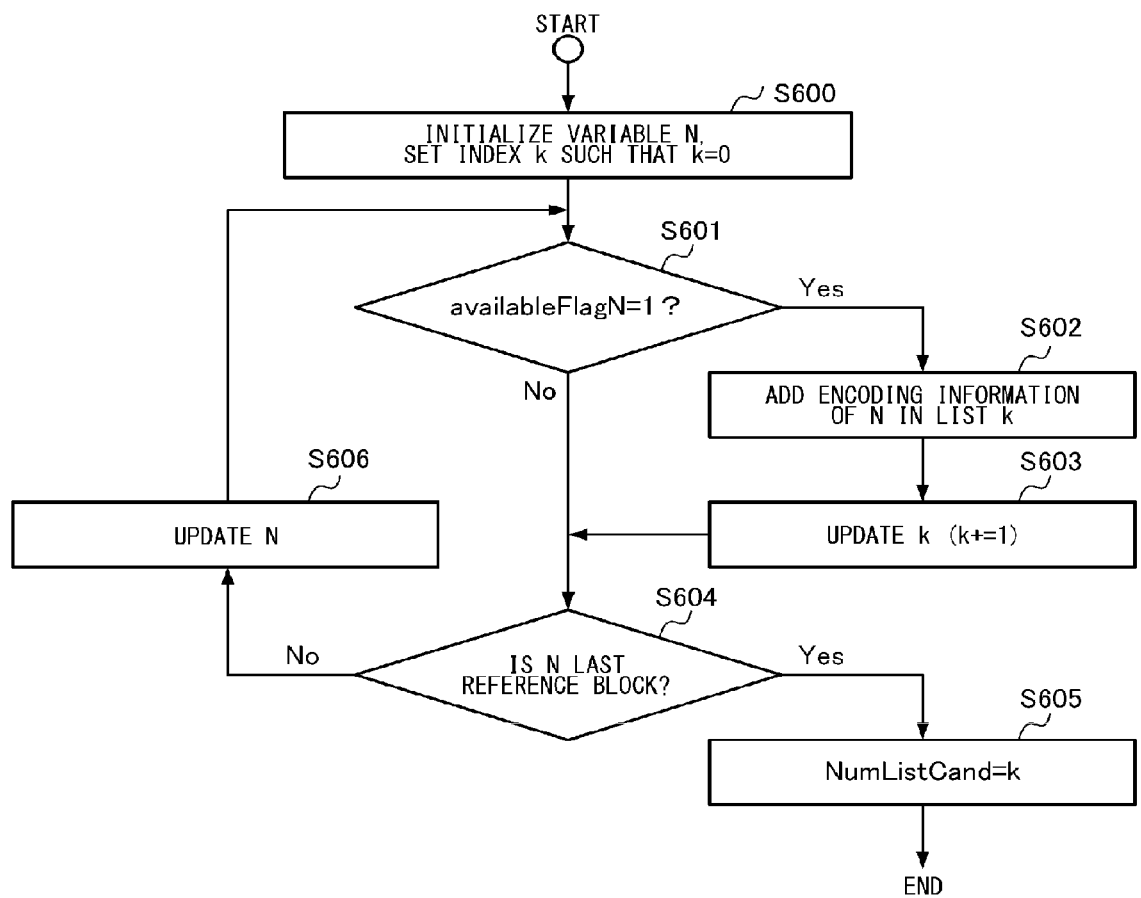
FIG. 19 is a flowchart showing the operation performed in the reference candidate list construction unit according to the first embodiment to add the coding information of the reference neighboring block selected by the coding information derivation unit in the reference candidate list.

The reference candidate list construction unit 311 operates in the same way as in the first and second embodiments and as shown in the flowchart of FIG. 19 except that the value of the variable F according to the fourth embodiment is defined as the value of the variable N of FIG. 19 for operation. The flag availableFlagN (in this case, N is S0, S1, T) indicating the availability of the first candidate of neighboring block S0 in the space, the second candidate of neighboring block S1 in the space, and the block T neighboring the block located in another picture at a different point of time at a position equivalent to that of the target prediction block is examined. The coding information of the neighboring block is added in the reference candidate list candList. The order of neighboring blocks according to which the variable N is updated is configured to be identical to the order of priority of storage in the reference candidate list. It will be assumed in the fourth embodiment that the candidates are stored in the order first concurrent candidate, second concurrent candidate, and the candidate at a different time (S0, S1, T).

As in the first and second embodiments, the coding information stored in the reference candidate list and decisioned by the identical information detection unit 312 as being identical is deleted. The output unit 313 outputs indices and coding information in the constructed reference candidate list. The reference candidate list is output as a merge list and the indices in the list are output as merge indices. The output is provided to the motion compensation prediction unit 105 and the prediction method decision unit 107 in the moving picture coding device 100.

A description will now be given of the merge decision unit 206 according to the fourth embodiment provided in the moving picture decoding device 200 and corresponding to the merge detection unit 106 according to the fourth embodiment provided in the moving picture coding device 100. The merge decision unit 206 is configured as illustrated in FIG. 22 described in the second embodiment. The process in the coding information derivation unit 310 differs from the operation according to the second embodiment. The other components, including the reference candidate list construction unit 311, the identical information detection unit 312, the reference candidate list storage memory 314, and the selection unit 315 have the same functions as those in the second embodiment.

The coding information derivation unit 310 of the merge decision unit 206 has the same function as the coding information derivation unit 310 of the merge detection unit 106 according to the fourth embodiment. the reference candidate list construction unit 311 of the merge decision unit 206 has the same function as the reference candidate list construction unit 311 of the merge detection unit 106 according to the fourth embodiment, and the identical information detection unit 312 of the merge decision unit 206 has the same function as the identical information detection unit 312 of the merge detection unit 106 according to the fourth embodiment. Thus, the same reference candidate list as constructed in the merge detection unit 106 according to the fourth embodiment is constructed in the steps through the identical information detection unit 312 of the merge decision unit 206.

As in the second embodiment, the selection unit 315 selects the neighboring block in the reference candidate list designated by the index for identifying the reference neighboring block decoded in the first bitstream decoding unit 202. The selection unit 315 supplies the selected coding information to the motion compensation prediction unit 207 and to the coding information storage memory 210.

Figure 44:
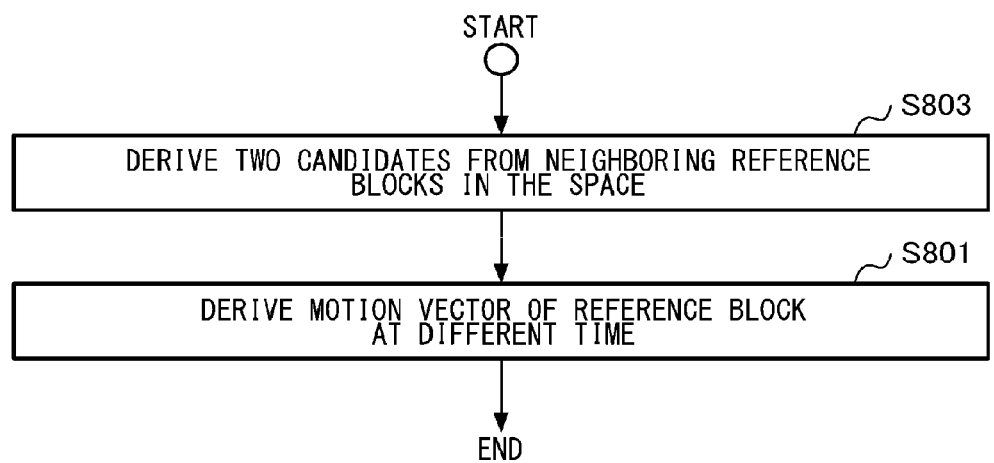
FIG. 44 is a flowchart showing the operation of the coding information derivation unit of the motion vector prediction unit according to the fourth embodiment.

A description will now be given of the motion vector prediction unit 103 according to the fourth embodiment shown in FIG. 2 illustrating the configuration of the moving picture coding device 100. The motion vector prediction unit 103 is configured as illustrated in FIG. 23 described in the second embodiment. The process in the coding information derivation unit 320 is different from that of the second embodiment so that the operation of the coding information derivation unit 320 according to the fourth embodiment will be described. FIG. 44 is a flowchart showing the operation of the coding information derivation unit 320 according to the fourth embodiment.

Initially, the destination of the output of the inter-prediction information detection unit 104 is switched to the motion vector prediction unit 103 according to the prediction mode input to the switch 108 and controlled by the moving picture coding device 100. The coding information of the reference neighboring blocks referred to by the target prediction block and stored in the temporary memory 303 in the inter-prediction information detection unit 104 is input to the coding information derivation unit 320.

Figure 45:
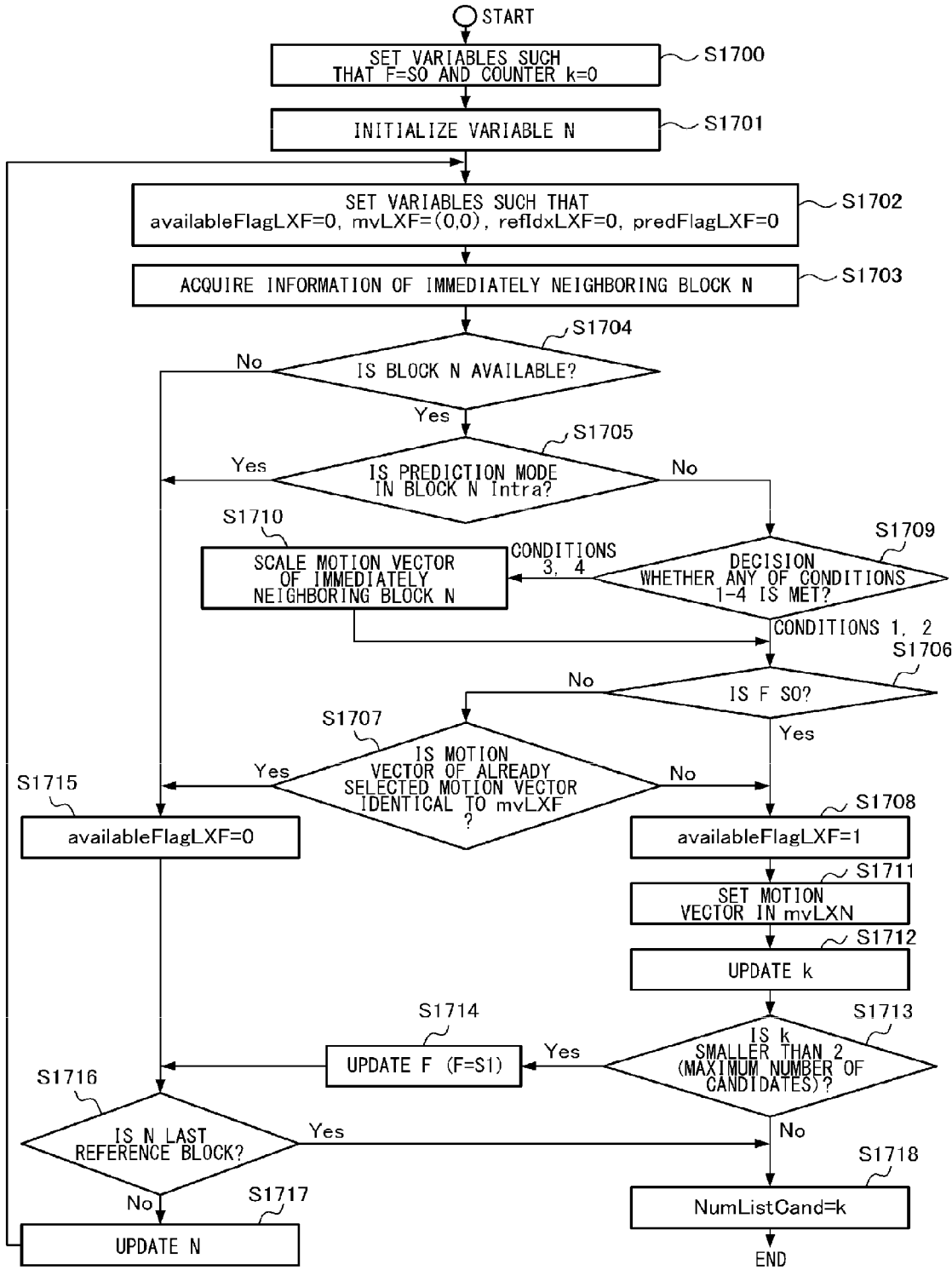
FIG. 45 is a flowchart showing the operation performed in the coding information derivation unit according to the fourth embodiment to select the immediately neighboring block located in the same picture as the target prediction block.

The initially input coding information of the neighboring blocks is examined to decision whether the coding information of the neighboring block located in the same picture as the target prediction block is available and two neighboring blocks are derived accordingly (S803). FIG. 45 shows the detailed flow of decision for each neighboring block located in the same picture as the target prediction block. The process shown in FIG. 45 is performed for L0 prediction, or for L1 prediction, or both for L0 prediction and L1 prediction, depending on the prediction mode.

A spatial candidate variable F is set to S0, and a counter k is set to 0 (S1700). S0 in the spatial candidate variable F indicates the first candidate of neighboring block initially selected, and S1 indicates the second candidate of neighboring block selected secondly.

Subsequently, the variable N indicating the block in the block group is initialized (S1701). The variable N indicating the neighboring block being processed is defined in the order B0, A0, A1, B1, C0. N is updated in this order.

Subsequently, variables for storing the coding information of the neighboring block used in subsequent decision are initialized (S1702). The variables include: a flag availableFlagF indicating whether the neighboring block is available; a motion vector mvLXF, a reference picture number refIdxLXF, and a flag predFlagLXF indicating the availability of a direction of prediction. The variables are initialized as follows.

availableFlagLXF=0
mvLXF=(0,0)
refIdxLXF=0
predFlagLXF=0 where 0 or 1, indicating a direction of prediction, is substituted into the suffix X. The position and coding information of the neighboring block with the variable N indicating the neighboring block being processed (hereinafter, referred to as the neighboring block N) are acquired (S1703).

A decision is made as to whether the neighboring block N is available based on the acquired position of the neighboring block N (S1704). For example, if the target prediction block is located at the left edge of the picture, there will be no neighboring blocks to the left of the target prediction block so that there should not be corresponding coding information in the coding information storage memory 114. In this case, a decision of unavailability is made.

If the neighboring block N is unavailable (N in S1704), availableFlagLXF is set to "0" (S1715). If the neighboring block N is available (Y in S1704), a decision is made as to whether the prediction mode in the neighboring mode N is Intra (S1705). If the prediction mode of the neighboring block N is Intra (Y in S1705), availableFlagLXF is set to "0" (S1715).

If the prediction mode of the neighboring block N is not Intra (N in S1705), namely, if the mode is the Inter mode, a decision is made as to whether any of Conditions 1-4 is met by comparing the coding information from the prediction in the target prediction block and the coding information of the neighboring block N (S1709). If Condition 1 or Condition 2 is met, control proceeds to a decision as to whether F is S0 (S1706). If Condition 3 or Condition 4 is met, the motion vector for the neighboring block N is scaled (S1710) as in S912 in FIG. 39 of the second embodiment, and control proceeds to a decision as to whether F is S0 (S1706).

If F is S0, availableFlagLXF (availableFlagLXS0) is set to "1" (S1708). If F is not S0 (N in S1706), a decision is made as to whether the motion vector of the neighboring block already selected is identical to the motion vector of the neighboring block N or to the motion vector mvLXN produced by scaling the motion vector of the neighboring block N (S1607).

If the motion vector of the neighboring block already selected is identical to the motion vector of the neighboring block N (Y in S1707), availableFlagLXF is set to "0" (S1715). More specifically, given that the maximum number of neighboring blocks in the space is 2, the motion vector selected as the first candidates is stored and used for comparison and decision for selecting the second candidate. These steps prevent the coding information of the second candidate of neighboring block from being a duplicate of the motion vector of the first candidate of neighboring block. Therefore, a larger number of candidates than otherwise are made available for selection. For reduction of the processing volume, control can directly proceed to step S1708, bypassing steps S1706 and S1707, and availableFlagLXF (availableFlagLXS1) may be set to "1" (S1708).

If the motion vector of the neighboring block selected as the first candidate differs from the motion vector mvLXN of the neighboring block N (Y in S1707), availableFlagLXF (availableFlagLXS1) is set to "1" (S1708). The motion vector mvLX for the neighboring block N using the same reference list (in case Condition 1 is met), or the motion vector mvLY using the different reference list (in the case Condition 2 is met), or the motion vector mvLX using the same reference list (in the case Condition 3 is met) and converted by scaling, or the motion vector mvLY using the different reference list (in the case Condition 4 is met) and converted by scaling is substituted into mvLXM (S1711).

The counter k is updated by being incremented by 1 (S1712), and a decision is made as to whether the counter k is smaller than 2, which is the maximum number of candidates in the space (S1713). If the counter k is equal to 2, which is the maximum number of candidates in the space (N in S1713), k is substituted into the variable NumListCand, indicating the number of selected candidates in the space (S1718), whereupon the process is terminated.

If availableFlagLXF is set to "0" (S1715), a decision is made as to whether the neighboring block N is the last of the neighboring blocks (S1716). If k is smaller than 2, indicating the maximum number of candidates in the space (Y in S1713), F is updated to S1 (S1714), and a decision is made as to whether the neighboring block N is the last of the neighboring blocks (S1716).

The variable N is updated in the order B0, A0, A1, B1, and C0. A decision is made as to whether N is C0. If the neighboring block N is the last block (Y in S1716), k is substituted into the variable NumListCand, indicating the number of selected candidates in the space (S1718), whereupon the process is terminated. If the neighboring block N is not the last block (N in S1716), the variable N is updated in the order B0, A0, A1, B1, and C0 (S1717), and step S1702 and the subsequent steps are repeated. As described above, neighboring blocks in the block groups located in the same picture as the target prediction block are defined as representative reference blocks and the coding information thereof is derived.

Referring back to FIG. 44, a decision is made as to the availability of the coding information of the block neighboring the block located in another picture at a different point of time at a position equivalent to that of the target prediction block, and the coding information is derived accordingly (S801). The step in S801 of the fourth embodiment is the same as step S801 of the first embodiment so that the description is omitted.

The coding information of the neighboring block thus obtained is entered in the reference candidate list construction unit 321. The reference candidate list construction unit 321 constructs the L0 reference candidate list, or the L1 reference candidate list, or both the L0 and L1 reference candidate lists, depending on the prediction mode (L0 prediction, L1 prediction, bidirectional prediction). In this specification, only one reference candidate list will be referred to in describing the motion estimation mode, unless otherwise specified. Only one reference candidate list will be illustrated in the associated drawings.

In the fourth embodiment, the reference candidate list storage memory 344 is provided with a reference candidate list as a storage area for adding candidates of coding information of the reference neighboring blocks. The candidates of coding information of the neighboring blocks are arranged in the order priority. The candidates of coding information of the neighboring blocks are added in the reference candidate list storage memory 324 in the order of priority. This reduces the code size of the indices merge_idx_l0 and mvp_idx_l1 in the reference candidate list.

The code size is reduced by locating elements with higher priority order toward the top of the reference candidate list. The index indicating the order of priority is assigned in the ascending order, starting with 0. The reference candidate list provided in the reference candidate list storage memory 324 is built as a list. The reference candidate list is provided with an array area for storing, as elements, an index indicating the location inside the reference candidate list and a candidate, corresponding to the index, of coding information of the reference neighboring block. The array area is denoted by candListLX. Indices start with 0. The storage area for the reference candidate list candListLX stores the candidate of coding information of the reference neighboring block.

In the following description of the steps, the coding information assigned an index i added in the reference candidate list candListLX will be denoted by candListLX [i] so as to distinguish it from the reference candidate list candListLX by using array notation. Unless otherwise specified, the coding information stored in the storage area for the reference candidate list will be denoted by the names of the positions (A0, A1, B0, B1, C0, T) of the reference neighboring blocks.

The reference candidate list construction unit 321 operates in the same way as in the first and second embodiments and as shown in the flowchart of FIG. 19 except that the value of the variable F according to the fourth embodiment is defined as the value of the variable N of FIG. 19 for operation. The flag availableFlagLXN (in this case, N is S0, S1, T) indicating the availability of the first candidate of neighboring block S0 in the space, the second candidate of neighboring block S1 in the space, and the block T neighboring the block located in another picture at a different point of time at a position equivalent to that of the target prediction block is examined. The coding information of the neighboring block is added in the reference candidate list candListLX. The order of neighboring blocks according to which the variable N is updated is configured to be identical to the order of priority of storage in the reference candidate list. It will be assumed in the fourth embodiment that the candidates are stored in the order first concurrent candidate, second concurrent candidate, and the candidate at different time (S0, S1, T).

As in the first and second embodiments, the coding information stored in the reference candidate list and decisioned by the identical information detection unit 312 as being identical is deleted. The motion vector difference derivation unit 326 uses the motion vector included in the coding information in the reference candidate list thus constructed as a motion vector predictor. The motion vector difference derivation unit 326 derives a motion vector difference from the motion vector estimated by the motion vector estimation unit 102 and the motion vector predictor. The motion vector difference derivation unit 326 supplies the derived motion vector difference to the output unit 323.

Finally, the output unit 323 outputs the indices and the motion vector differences in the constructed reference candidate list. The reference candidate list is output as an MVP list and the index in the list is output as an MVP index. The output is provided to the prediction method decision unit 107 in the moving picture coding device 100.

A description will be given of the motion vector derivation unit 204 according to the fourth embodiment provided in the moving picture decoding device 200 and corresponding to the motion vector prediction unit 103 according to the fourth embodiment provided in the moving picture coding device 100. The motion vector derivation unit 204 is configured as illustrated in FIG. 30 of the second embodiment. The process in the coding information derivation unit 320 differs from the operation according to the second embodiment. The other components, including the reference candidate list construction unit 321, the identical information detection unit 322, the reference candidate list storage memory 324, the selection unit 325, and the motion vector addition unit 327 have the same functions as those in the second embodiment.

The coding information derivation unit 320 has the same function as the coding information derivation unit 320 of the motion vector prediction unit 103 according to the second embodiment. the reference candidate list construction unit 311 of the merge decision unit 206 has the same function as the reference candidate list construction unit 311 of the merge detection unit 106 according to the fourth embodiment, and the identical information detection unit 312 of the merge decision unit 206 has the same function as the identical information detection unit 312 of the merge detection unit 106 according to the fourth embodiment. Thus, the same reference candidate list as constructed in the motion vector prediction unit 103 according to the fourth embodiment is constructed in the steps through the identical information detection unit 322 of the motion vector derivation unit 204.

As in the second embodiment, the selection unit 325 selects the neighboring block in the reference candidate list designated by the index for identifying the reference neighboring block decoded in the first bitstream decoding unit 202. The selection unit 325 outputs the motion vector from the coding information of the neighboring block in the selected reference candidate list as a motion vector predictor. The motion vector addition unit 327 adds the motion vector predictor to the motion vector difference decoded in the first bitstream decoding unit 202 so as to derive the motion vector. The motion vector addition unit 327 supplies the motion vector to the motion compensation prediction unit 207 and supplies the coding information of the neighboring block in the selected list to the coding information storage memory 210.

In the fourth embodiment, two neighboring blocks are selected as representatives of the reference neighboring blocks. Alternatively, one or at least three neighboring blocks may be selected as representatives in the merge mode and in the motion estimation mode. The number is set so as not to exceed the number of blocks in the block group. It should be noted that the number of representatives is 6 at maximum in the case of the arrangement of FIG. 9 illustratively used in describing the embodiments. In the case of the merge mode, defining the number of representatives to be 6 will result in an embodiment equivalent to the first embodiment. By defining a larger number of representative neighboring blocks in the merge mode than in the motion estimation mode (e.g., by defining two representative neighboring blocks in the space in the motion estimation mode and defining three or more neighboring blocks in the space in the merge mode), the following advantages are obtained.

In other words, the coding information of the candidate of reference neighboring block is directly used for inter-prediction in the merge mode so that a larger number of candidates are added in the list than in the motion estimation so that a broader scope of selection is secured. This is because the merge mode is capable of transmitting a larger volume of information (motion vector, reference index, reference list) using a smaller code size than the motion estimation mode and because the coding efficiency is improved by maintaining candidates of neighboring blocks sufficient to provide a broad the scope of selection rather than by reducing the code size of merge indices.

In the motion estimation mode, on the other hand, the coding information including a motion vector difference is coded instead of directly using the coding information of the candidate of reference neighboring block. Therefore, a smaller number of candidates are defined than the merge mode before adding the candidates in the list. This is because reduction of the code size of MVP indices by reducing the number of candidates improves the coding efficiency.

If three or more representative neighboring blocks in the space are selected in the merge mode, a decision is made in step S1607 of FIG. 43 as to whether the coding information of each of the neighboring blocks already selected is equal to the coding information of the neighboring block N. If three or more neighboring blocks in the space are selected in the motion estimation mode, a decision is made in step S1707 of FIG. 45 as to whether the motion vector of each of the neighboring blocks already selected is equal to the motion vector of the neighboring block N or the motion vector mvLXN produced by scaling the motion vector of the neighboring block N.

The method according to the fourth embodiment may be used in the merge mode, and the method according to another embodiment may be used in the motion estimation mode. Similarly, the method according to the fourth embodiment may be used in the motion estimation mode, and the method according to another embodiment may be used in the merge mode. Of particular note, by using the method according to the first embodiment in the merge mode and the method according to the fourth embodiment in the motion estimation mode, the same advantage as the third embodiment can be obtained.

In other words, the coding information of the candidate of reference neighboring block is directly used for inter-prediction in the merge mode so that a larger number of candidates are added in the list than in the motion estimation so that a broader scope of selection is secured. This is because the merge mode is capable of transmitting a larger volume of information (motion vector, reference index, reference list) using a smaller code size than the motion estimation mode and because the coding efficiency is improved by maintaining as many candidates of neighboring blocks as possible and increasing the number of candidates of motion information as much as possible rather than by reducing the code size of merge indices.

In the motion estimation mode, on the other hand, the coding information including a motion vector difference is coded instead of directly using the coding information of the candidates of reference neighboring block. Therefore, a scan is performed to reduce the number of candidates before adding the candidates in the list. This is because the candidates in the motion estimation mode are merely used to derive prediction vectors so that an increase in the number of candidates of neighboring blocks or addition of candidates with motion vectors approximating each other would not result in the reduction of the code size of the motion vector difference and would merely result in an increase in the code size of MVP indices, and because reduction of the code size of MVP indices by reducing the number of candidates improves the coding efficiency.

In the merge mode and also in the motion estimation mode, candidates for addition in the list can be decisioned only by using information indicating whether the neighboring block is available as a candidate of reference. Therefore, there is no need for complicated steps for decision, and appropriate candidates can be added in the list both in the merge mode and in the motion estimation mode.

Further, the fourth embodiment ensures that the block neighboring the block located in another picture at a different point of time at a position equivalent to that of the target prediction block is invariably added at the end of the reference candidate list. The neighboring blocks located in the same picture are likely to have the identical coding information. The block neighboring the block located in another picture at a different point of time at a position equivalent to that of the target prediction block is likely to have different coding information. Therefore, it will be more advantageous to add the block in the different picture as an independent candidate. For example, even when the Intra mode is defined in all of the neighboring blocks in the same picture, the block neighboring the block located in another picture at a different point of time at a position equivalent to that of the target prediction block is likely to have coding information from Inter-prediction. However, the block neighboring the block located in another picture at a different point of time at a position equivalent to that of the target prediction block is less likely to have coding information identical to or close to the coding information of the target prediction block than the neighboring blocks in the same picture as the target prediction block. Therefore, the block in the different picture is given a lower priority.

(Fifth Embodiment)

A description will first be given of the merge detection unit 106 according to the fifth embodiment shown in FIG. 2 illustrating the configuration of the moving picture coding device 100. The merge detection unit 106 is configured as illustrated in FIG. 11 described in the first embodiment. The process in the reference candidate list construction unit 311 is different from that of the first embodiment so that the operation of the reference candidate list construction unit 311 of the merge detection unit 106 according to the firth embodiment will be described. The reference candidate list storage memory 314 is provided with a reference candidate list as a storage area for adding candidates of coding information of the reference neighboring block. The reference candidate list construction unit 311 arranges the candidates of coding information of the neighboring blocks in the order priority and adds the candidates of coding information of the neighboring blocks in the reference candidate list in the order of priority. This reduces the code size of the indices merge_idx in the reference candidate list.

The code size is reduced by locating elements with higher priority order toward the top of the reference candidate list. The index indicating the order of priority is assigned in the ascending order, starting with 0. It will be assumed that the order (A1, B1, B0, A0, C0, T) is set in the case of the merge mode. In the case of the merge mode, the neighboring blocks A1 and B1 are added toward the top of the reference candidate list in preference to the other blocks. This is because the coding information of the blocks A1 and B1 is most likely to be equal to that of the target prediction block and because the blocks A1 and B1 are contiguous with the target prediction block at the sides. Thereby, the code size of merge indices is reduced and the coding efficiency is improved.

The reference candidate list provided in the reference candidate list storage memory 314 is built as a list. The reference candidate list is provided with an array area for storing, as elements, an index indicating the location inside the reference candidate list and a candidate, corresponding to the index, of coding information of the reference neighboring block. The array area is denoted by candList. Indices start with 0. The storage area for the reference candidate list candList stores the candidate of coding information of the reference neighboring block. In the following description of the steps, the coding information assigned an index i added in the reference candidate list candList will be denoted by candList [i] so as to distinguish it from the reference candidate list candList by using array notation. Unless otherwise specified, the coding information stored in the storage area for the reference candidate list will be denoted by the names of the positions (A0, A1, B0, B1, C0, T) of the reference neighboring blocks.

Figure 46:
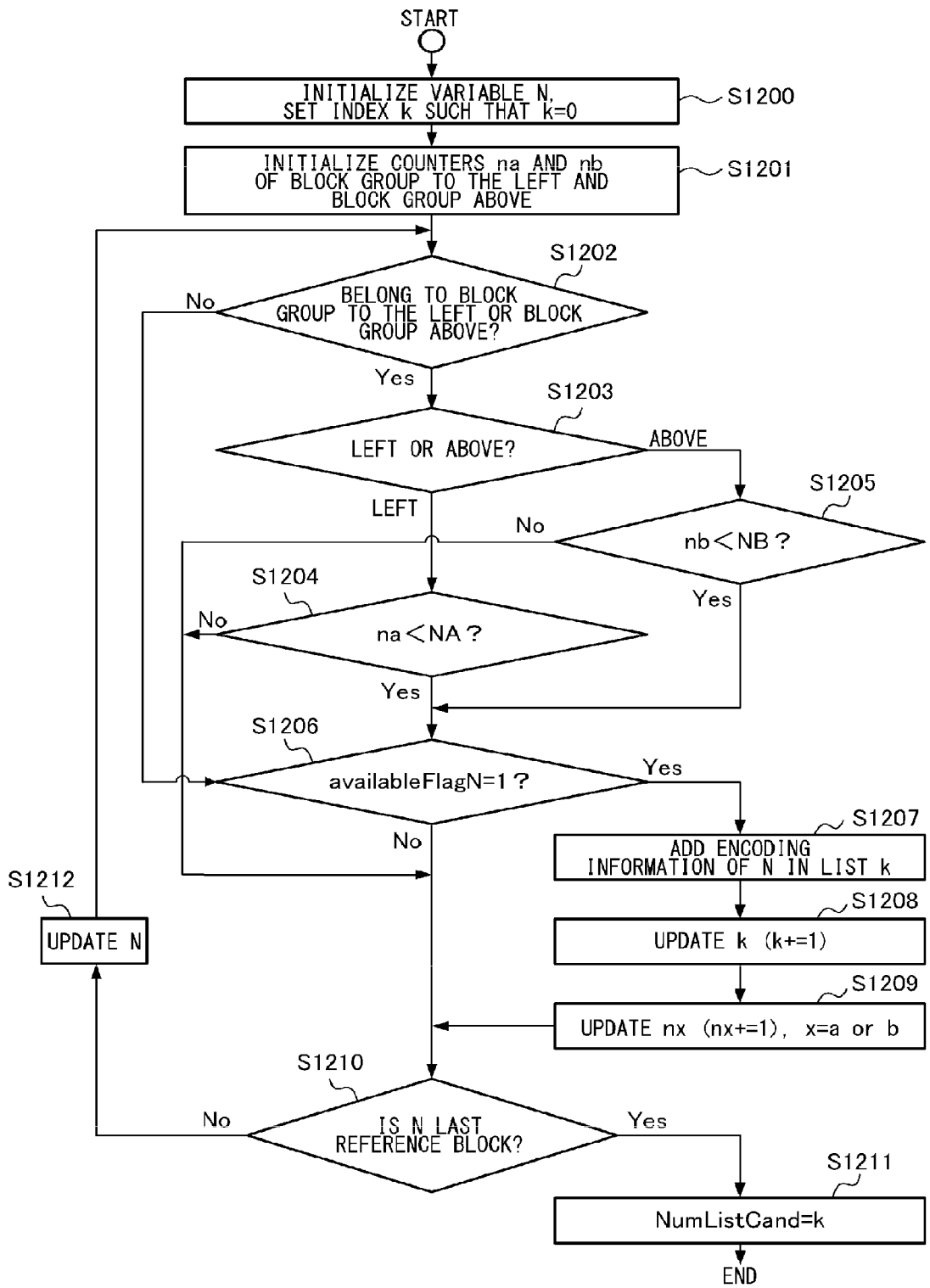
FIG. 46 is a flowchart showing the operation performed in the reference candidate list construction unit according to the fifth embodiment to add the coding information of the reference neighboring block selected by the coding information derivation unit in the reference candidate list.

FIG. 46 is a flowchart showing the operation of the reference candidate list construction unit 311 according to the fifth embodiment. In the fifth embodiment, the neighboring blocks shown in FIG. 31A are organized into the block group neighboring the target block to the left and the block group neighboring above. The number of blocks NA and NB neighboring blocks in the respective block groups are defined. The block group to the left includes neighboring blocks A0 and A1. The block group above includes neighboring blocks B0, B1, and C0. NA and NB are both set to 1. This means selecting one neighboring block from each block group. NA and NB should not exceed the number of neighboring blocks in the respective block group.

First, the variable N and the index k in the reference candidate list are initialized (S1200). The variable N is initialized to a neighboring block with the highest priority in each prediction mode. In the merge mode, the variable N is set to A1.

In the motion estimation mode, the variable N is set to A0. k is set to 0. The index k indicates the order of priority of an area for storing the candidate of coding information defined in the storage area for the reference candidate list.

Subsequently, the counters na and nb of the block groups to the left and above are initialized to 0 (S1201). First, a decision is made as to whether the neighboring block N belongs to the block group to the left or the block group above (S1202). If it does not belong to either block group (N in S1202), control proceeds to step S1206. If it belongs one of the block groups (Y in S1202), a decision is made as to which of the block group to the left or the block group above the neighboring block N belongs (S1203).

If the neighboring block N belongs to the block group to the left, the counter na is compared with NA (S1204). If na is smaller than NA (Y in S1204), control proceeds to step S1206. Otherwise (N in S1204), control proceeds to step S1210. If the neighboring block N belongs to the block group above, the counter nb is compared with NB (S1205). If nb is smaller than NB (Y in S1205), control proceeds to step S1206. Otherwise (N in S1205), control proceeds to step S1210.

If na and nb are equal to or greater than NA and NB, respectively, it means that the number of neighboring blocks in the respective block groups that can be selected for addition in the reference candidate list is exceeded. In this case, a decision as to whether the neighboring block N is added in the reference candidate list is not made and the block is not added.

The flag availableFlagN indicating the availability of the reference neighboring block N is examined (S1206). If availableFlagN is 1 (Y in S1206), the coding information of the neighboring block N is added in the reference candidate list candList[k] (S1207), and k is updated (S1208). Further, if the neighboring block N belongs to the block group to the left or the block group above, the counter na or nb is updated (S1209). If availableFlagN is 0 (N in S1206), the coding information is not added in the reference candidate list, and control proceeds to step S1210.

A decision is made as to whether the neighboring block N is the last reference block (S1210). If the block N is the last block (Y in S1210), the value of the index is substituted into the total number of listed candidates NumListCand (S1211), and the process is terminated. If the block N is not the last block (Y in S1210), the variable N is updated (S1212), and step S1202 and the subsequent steps are repeated.

The candidates are added in the reference candidate list through the above steps. The maximum number of candidates added in the reference candidate list is denoted by NA+NB+1. The candidate at a different point of time is enlisted, adding 1 to NA and NB, which are initially defined. Since NA and NB are defined to be 1, that maximum number will be 3. Provided that only one reference neighboring block is available, the maximum codeword size will be 0 so that there will no need for codewords. The candidate of coding information of the neighboring block solely decisioned as being available is uniquely identified as the reference target.

If the flag availableFlagA1 indicating the availability of the reference neighboring block A1 is 0, B1, A0, T are added in the reference candidate list in the stated order since the order of priority is A1, B1, B0, A0, C0, T. The steps according to the second embodiment performed under the same condition will result in A0, B1, T. The fifth embodiment is advantageous in that the neighboring blocks for which the coding information is most likely to be equal to that of the target prediction block are added toward the top of the reference candidate list in preference to the other blocks such that the original order of priority is preserved. Thereby, the code size of indices is reduced and the coding efficiency is improved.

In further accordance with the fifth embodiment it is ensured that three neighboring blocks including: a neighboring block representing a block group neighboring the target prediction block to the left: a neighboring block representing a block group neighboring above: and a block neighboring a block located in another picture at a different point of time at a position equivalent to that of the target prediction block, are added in the reference candidate list. This reduces the total number of reference neighboring blocks as compared with the first embodiment. Therefore, the size of codewords assigned is reduced so that the coding efficiency is improved.

A description will now be given of the merge decision unit 206 according to the fifth embodiment provided in the moving picture decoding device 200 and corresponding to the merge detection unit 106 according to the fifth embodiment provided in the moving picture coding device 100. The merge decision unit 206 is configured as illustrated in FIG. 22 described in the first embodiment. The process in the reference candidate list construction unit 311 differs from the operation according to the first embodiment. The other components, including the coding information derivation unit 310, the identical information detection unit 312, the reference candidate list storage memory 314, and the selection unit 315 have the same functions as those of the first embodiment.

The reference candidate list construction unit 311 has the same function as the reference candidate list construction unit 311 of the merge detection unit 106 according to the fifth embodiment. Thus, the same reference candidate list as constructed in the merge detection unit 106 according to the fifth embodiment is constructed in the steps through the identical information detection unit 312 of the merge decision unit 206.

A description will be given of the selection unit 315, which acquires the coding information of the reference neighboring block from the constructed reference candidate list in the merge mode. The selection unit 315 selects the neighboring block in the reference candidate list designated by the index for identifying the reference neighboring block decoded in the first bitstream decoding unit 202. The selection unit 315 supplies the selected coding information to the motion compensation prediction unit 207 and to the coding information storage memory 210.

A description will first be given of the motion vector prediction unit 103 according to the fifth embodiment shown in FIG. 2 illustrating the configuration of the moving picture coding device 100. The motion vector prediction unit 103 is configured as shown in FIG. 23 described in the first embodiment. The process in the reference candidate list construction unit 321 is different from that of the first embodiment. The reference candidate list construction unit 321 has basically the same function as the reference candidate list construction unit 311 of the merge detection unit 106 and so performs the same operation of decisioning whether the candidate of coding information of the reference neighboring block is available or not and adding the candidate in the reference candidate list. Therefore, the description thereof is omitted.

The difference between the reference candidate list construction unit 321 from the reference candidate list construction unit 311 of the merge detection unit 106 resides in the order of priority observed in adding the candidates of coding information of the reference neighboring blocks in the reference candidate list provided in the reference candidate list storage memory 324. In the case of the motion estimation mode, the reference candidate list construction unit 321 lists the candidates in the order A0, B0, A1, B1, C0, T.

The motion estimation mode is configured to transmit a motion vector difference. The coding size of the motion vector difference is reduced and the coding efficiency is improved by adding candidates such that the candidate to the left and the candidate above are distanced from each other to ensure a large difference in the motion vector between the candidates and to provide a broad scope of selection of the motion vector predictor as a result. The purpose of the method of decisioning the order of priority in the motion estimation mode differs from that of the merge mode where neighboring blocks most likely to have the same coding information are added in preference to the other blocks. By arranging the candidates of coding information of the reference neighboring blocks in the order of priority and adding the candidates in the reference candidate list in the order of priority, the code size of the indices mvp_idx_l0 and mvp_idx_l1 in the reference candidate list is reduced.

The reference candidate list construction unit 321 of the motion vector derivation unit 204 according to the fifth embodiment provided in the moving picture decoding device 200 and corresponding to the motion vector prediction unit 103 according to the fifth embodiment provided in the moving picture coding device 100 has the same function as the corresponding reference candidate list construction unit 321 of the motion vector prediction unit 103. Thus, the same reference candidate list is constructed as in the motion vector prediction unit 103.

A description will be given of the selection unit 325, which acquires the coding information of the reference neighboring block from the constructed reference candidate list in the motion estimation mode. The selection unit 325 selects the neighboring block in the reference candidate list designated by the index for identifying the reference neighboring block decoded in the first bitstream decoding unit 202. The selection unit 325 outputs the motion vector from the coding information of the neighboring block in the selected list as the motion vector predictor. The motion vector addition unit 327 adds the motion vector predictor to the motion vector difference decoded in the first bitstream decoding unit 202 so as to derivate the motion vector. The selection unit 325 supplies the motion vector to the motion compensation prediction unit 207 and supplies the coding information of the neighboring block in the selected list to the coding information storage memory 210.

In the fifth embodiment, both NA and NB are defined to be 1 but may be defined to be any number that does not exceed the number of neighboring blocks in the respective block groups. Alternatively, the number may be changed depending on the prediction mode.

(Sixth Embodiment)

In the sixth embodiment, block groups of reference neighboring blocks different from the groups of the second embodiment are defined. The sixth embodiment uses a different method of selecting one neighboring block representing the block group. A description will be made with reference to the arrangement of neighboring blocks in FIG. 31A. The six neighboring blocks A0, A1, B0, B1, C0, T arranged as shown in FIG. 31A are organized such that A1 represents a block group neighboring the target block to the left, B1 represents a block group neighboring above, T represents a block neighboring a block located in another picture at a different point of time at a position equivalent to that of the target prediction block, and A0, B0, and C0 located at the respective corners of the target prediction block represent a block group neighboring at the corners. One representative neighboring block is selected from each of these block groups. The coding information of one of the four neighboring blocks to the left, above, at a different point of time, and at the corners is selected as a reference target.

The neighboring blocks A1 and B1 are added toward the top of the reference candidate list in preference to the other blocks. This is because the coding information of the blocks A1 and B1 is most likely to be equal to that of the target prediction block and because the blocks A1 ad B1 are contiguous with the target prediction block at the sides. The three neighboring blocks at the corners having coding information relatively less likely to be equal are grouped so as to reduce the code size of indices and improve the coding efficiency accordingly. Therefore, the sixth embodiment is suitably used particularly in the merge mode.

The neighboring blocks A0, B0, and C0 are defined as belonging to a block group neighboring the target block of prediction at the corners in the merge detection unit 106 according to the sixth embodiment provided in the moving picture coding device 100 and in the reference candidate list construction unit 311 of the merge decision unit 206 according to the sixth embodiment provided in the corresponding moving picture decoding device 200. The blocks are also defined as belonging to a corner block group in the motion vector prediction unit 103 according to the sixth embodiment provided in the moving picture coding device 100 and in the reference candidate list construction unit 321 of the motion vector derivation unit 204 according to the sixth embodiment provided in the corresponding moving picture decoding device 200. By defining the order of priority such that A1, B1, (B0, A0, C0), T and adding the candidates of coding information of the reference neighboring blocks in the reference candidate list in the order of priority, the code size of the indices in the reference candidate list is reduced. The parenthesis in the reference candidate list represents one of the blocks at the corners selected in a process proceeding from left to right in the parenthesis.

The reference candidate list construction units 311 and 321 scan the neighboring blocks in the block group neighboring at the corners in a predefined sequence as described in the second embodiment so as to select a representative neighboring block from the block group. Confirmation may be made that the neighboring block is available and that the Intra mode is not designated and the first neighboring block that meets this condition may be selected. In this case, it is assumed that the blocks processed in the order B0, A0, C0. However, the order of processing is non-limiting. Alternatively, the coding information of the neighboring blocks B0, A0, C0 in the block group neighboring at the corners may be subject to comparison as to select the neighboring block having the same coding information as the target block. Namely, majority vote is taken in the block group and one of the neighboring blocks provided with the same coding information and appearing earliest in the order of processing B0, A0, C0 is selected as the neighboring block. Provided that all of the reference neighboring blocks are available, the reference candidate list constructed in the sixth embodiment is as shown in FIG. 47.

(Seventh Embodiment)

The seventh embodiment is designed to restrict the number of reference neighboring blocks added in the reference candidate list. In the case of the arrangement of neighboring blocks in FIG. 9A or in FIG. 31A, a maximum of six reference neighboring blocks are added in the reference candidate list according to the first and third embodiments (in the case of the merge mode). A maximum of 5 bits will be required for the index to designate a neighboring block selected from the list. It cannot therefore be said that the coding efficiency is improved. It is therefore ensured that only the coding information of neighboring blocks toward the top of the constructed reference candidate list is used, as in the second and fourth embodiments.

Figure 48:
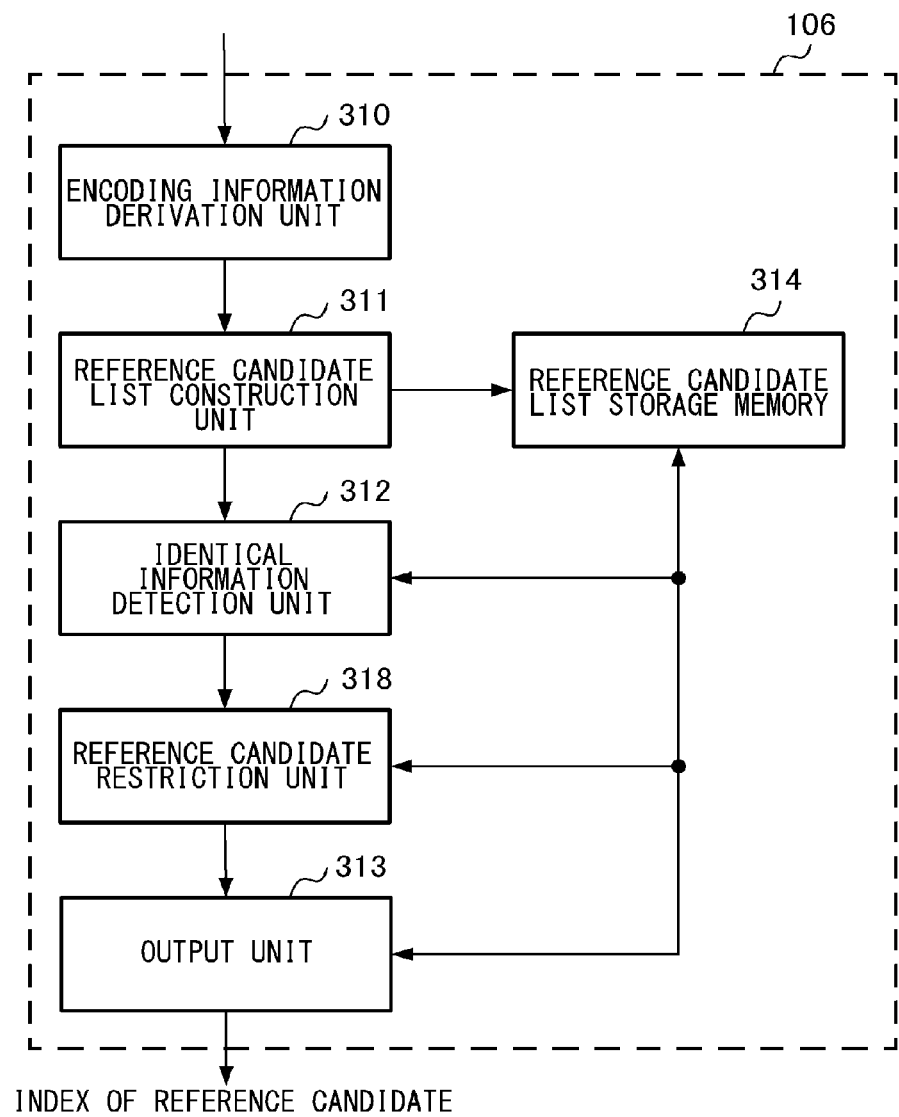
FIG. 48 is a block diagram showing the detailed configuration of the merge detection unit according to the seventh embodiment.

A description will be given of the merge detection unit 106 according to the seventh embodiment shown in FIG. 2 illustrating the configuration of the moving picture coding device 100. FIG. 48 shows the configuration of the merge detection unit 106 of the moving picture coding device 100 according to the first embodiment shown in FIG. 11 in which a reference candidate restriction unit 318 is added. Since the components shown in FIG. 48 have the same function as the corresponding components shown in FIG. 11 so that only the function of the reference candidate restriction unit 318 will be described below.

The identical information detection unit 312 deletes a reference neighboring block in the reference candidate list having the same coding information as another block. The resultant reference candidate list is input to the reference candidate restriction unit 318. The reference candidate restriction unit 318 allows as many neighboring blocks toward the top of the indexed reference candidate list as the number defining restriction. The reference candidate restriction unit 318 deletes or de-selects the other blocks. In the case of an exemplary reference candidate list shown in FIG. 20 according to the first embodiment in which there is no identical coding information, restricting the candidates to 3 in the merge mode will result in the top three neighboring blocks with the indices 0 through 3 being designated as candidates of reference and the remaining blocks being unused and removed from the candidates of reference.

In this way, neighboring blocks are added in the reference candidate list as candidates of reference with a restriction being imposed on the number of candidates in the list as described above. This reduces the total number of reference neighboring blocks as compared with the first embodiment. Therefore, the size of codewords assigned is reduced so that the coding efficiency is improved. The candidates are restricted such that those neighboring blocks with higher priority in the reference candidate list are prioritized. Therefore, the coding efficiency is prevented from being lowered. Restriction to the number of candidates in the reference candidate list may be effected by defining the number for restriction in the header information such as SequenceParameterSet (SPS) or SliceHeader. The number may be defined as an implicit condition on the coding side and on the decoding side. The method of definition is non-limiting so long as inconsistency is not created in the coding side and in the decoding side. The number defining restriction may be defined depending on the prediction mode. Further, the number defining restriction in the reference candidate list may be changed depending on the coding information of the neighboring block referred to by the target prediction block already coded or decoded.

Described above is a method of restricting the number of candidates of reference by providing the reference candidate restriction unit 318 immediately subsequent to the identical information detection unit 312. The same advantage will be obtained by providing the function of the reference candidate restriction unit 318 in the identical information detection unit 312 instead of providing the reference candidate restriction unit 318 in the merge detection unit 106. In this case, the identical information detection unit 312 compares the candidates of coding information stored in the reference candidate list. If a set of identical information is identified, the identical information detection unit 312 deletes all coding information in the set except for the candidate of coding information having the smallest index in the reference candidate list. The identical information detection unit 312 adds the candidate of coding information having the smallest index in the reference candidate list again and, when the number of candidates added reaches the number defined for restriction, terminates the process.

Figure 21:
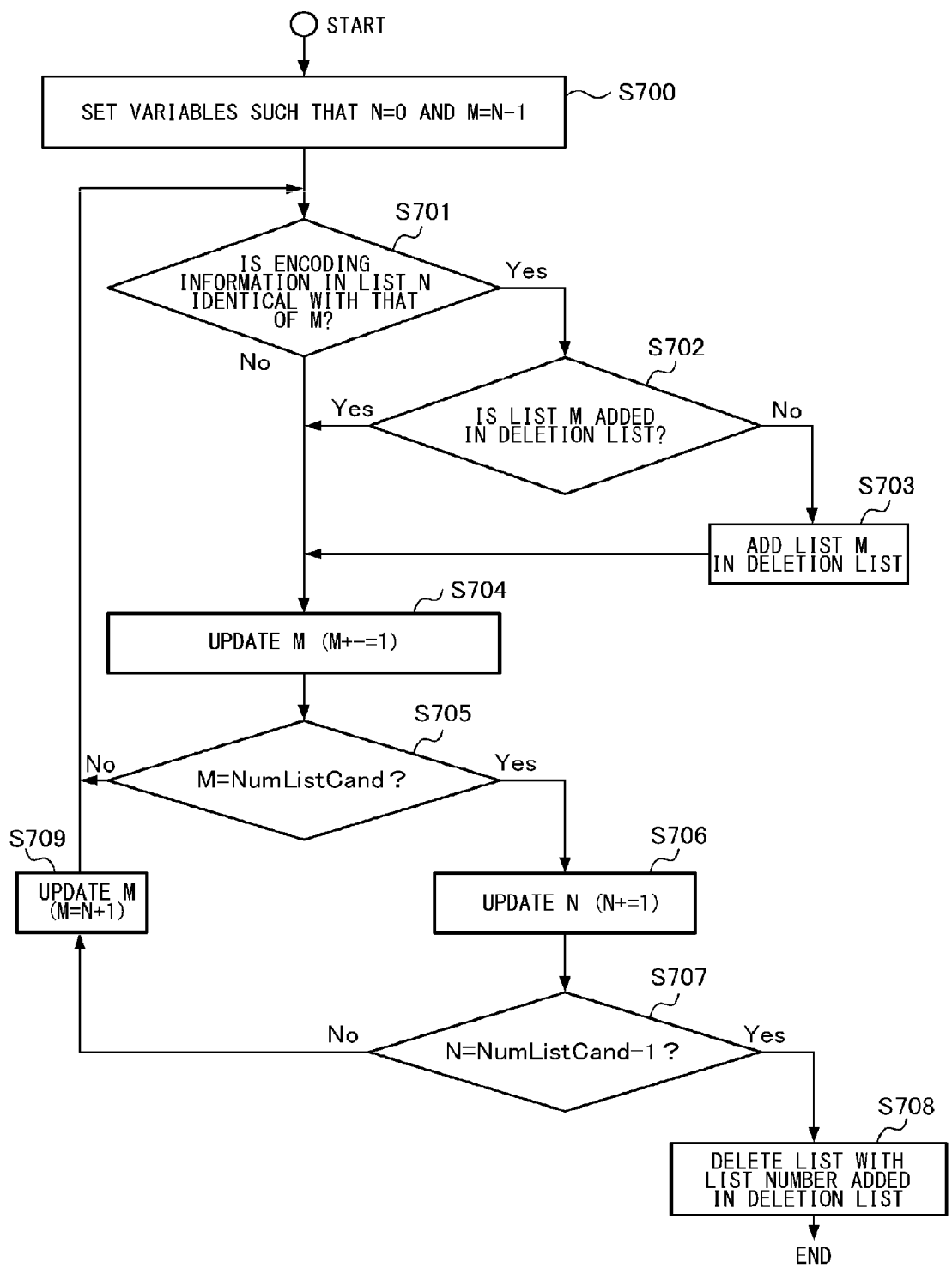
FIG. 21 is a flowchart showing the operation performed in the identical information detection unit according to the first embodiment to update the reference candidate list by detecting and deleting the identical coding information added in the reference candidate list.
Figure 49:
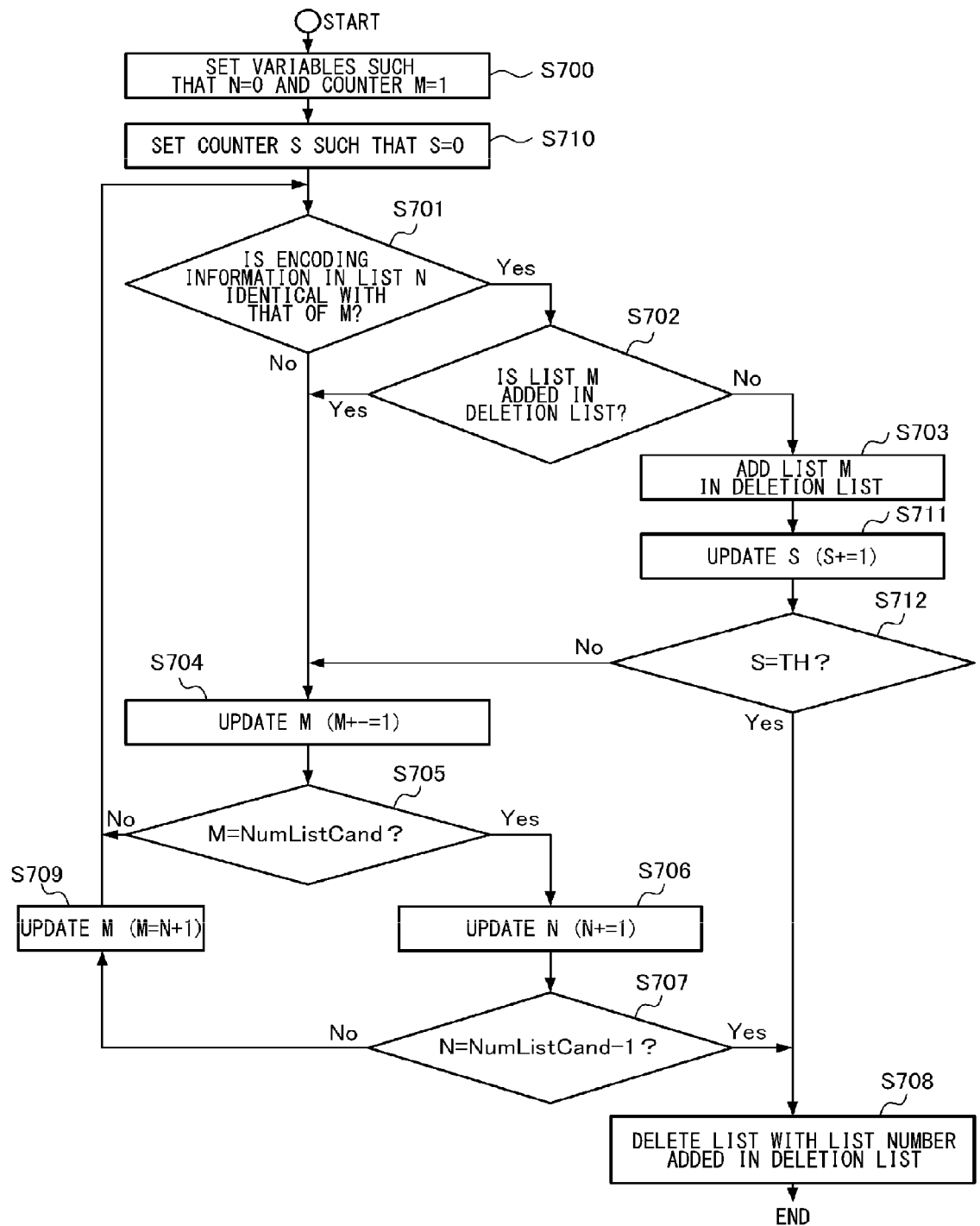
FIG. 49 is a flowchart showing the operation performed in the identical information detection unit according to the seventh embodiment to update the reference candidate list by restricting the coding information added in the reference candidate list.

FIG. 49 is a flowchart showing the operation of the identical information detection unit 312 according to the seventh embodiment. The function of restricting the candidates of reference according to the seventh embodiment is added to the identical information detection unit 312 performing the operation shown in FIG. 21 of the first embodiment. Steps S710 through S712 are added to the flowchart of FIG. 21 so that the added steps will be described.

After defining the variables n and m indicating the indices in the reference candidate list, a counter s indicating the number of candidates in the reference candidate list added in a deletion list is set to 0 (S710). A decision is then made in step S702 as to whether m is already added in the deletion list. If m is not added in the deletion list yet (N in S702), m is added in the deletion list, and the counter s is updated by being incremented by 1 (S711).

A decision is then made as to whether s is equal to a threshold value TH (S712), where the threshold value TH denotes the number obtained by subtracting the number defining restriction from the total number of listed candidates NumListCand. Namely, the threshold value TH indicates the maximum number of candidates added in the deletion list. When the threshold value TH is reached, as many candidates as the number defining restriction are allowed to remain in the reference candidate list. When s is equal to TH (Y in S712), as many candidates as the number defining restriction remain in the reference candidate list. The step for decision on identical information is terminated, and control proceeds to step S708. The coding information in a storage area in the list corresponding to the index added in the deletion list is deleted. The entry with the index 0 is allowed to remain intact and the vacancy is filled by the succeeding candidates in the ascending order of the index. The codewords are updated, whereupon the process is terminated. It should be noted that the total number of listed reference candidates NumListCand is updated to the number defining restriction.

The reference candidate restriction unit 318 may be provided to immediately precede the identical information detection unit 312. In this case, the number of candidates of reference in the reference candidate list constructed in the reference candidate list construction unit 311 is reduced so that the maximum number of times that the identical information detection unit 312 detects identical information is reduced. Accordingly, the processing volume is advantageously reduced.

Figure 50:
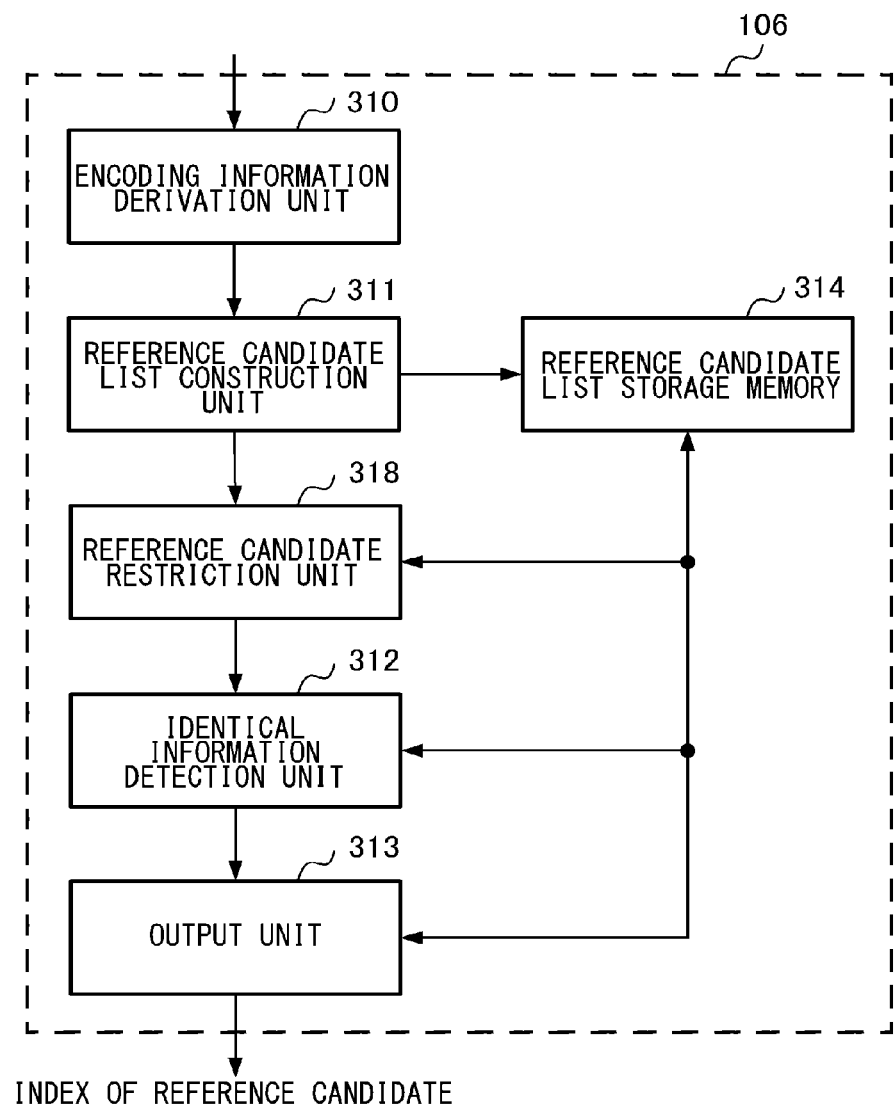
FIG. 50 is a block diagram showing the detailed configuration of the merge detection unit according to the seventh embodiment.

FIG. 50 shows the configuration of the merge detection unit 106 based on the merge detection unit 106 of the moving picture coding device 100 according to the first embodiment shown in FIG. 11 and additionally including the reference candidate restriction unit 318 according to the seventh embodiment. The components shown in FIG. 50 have the same function as the corresponding components shown in FIG. 11. The difference from the configuration in FIG. 48 resides only in the position of the reference candidate restriction unit 318. The operation of the reference candidate restriction unit 318 remains the same. The reference candidate restriction unit 318 allows as many neighboring blocks toward the top of the indexed reference candidate list constructed by the reference candidate list construction unit 311 as the number defining restriction. The reference candidate restriction unit 318 deletes or de-selects the other blocks.

Described above is a method of restricting the number of candidates of reference by providing the reference candidate restriction unit 318 to immediately precede the identical information detection unit 312. The same advantage will be obtained by providing the function of the reference candidate restriction unit 318 in the reference candidate list construction unit 311 instead of providing the reference candidate restriction unit 318 in the merge detection unit 106. In this case, the reference candidate list construction unit 311 adds the coding information of the reference neighboring block derived by the coding information derivation unit 310 in the reference candidate list, and also counts the number of reference neighboring blocks added in the reference candidate list. When the counted number reaches the number defining restriction, the reference candidate list construction unit 311 terminates the process.

Figure 51:
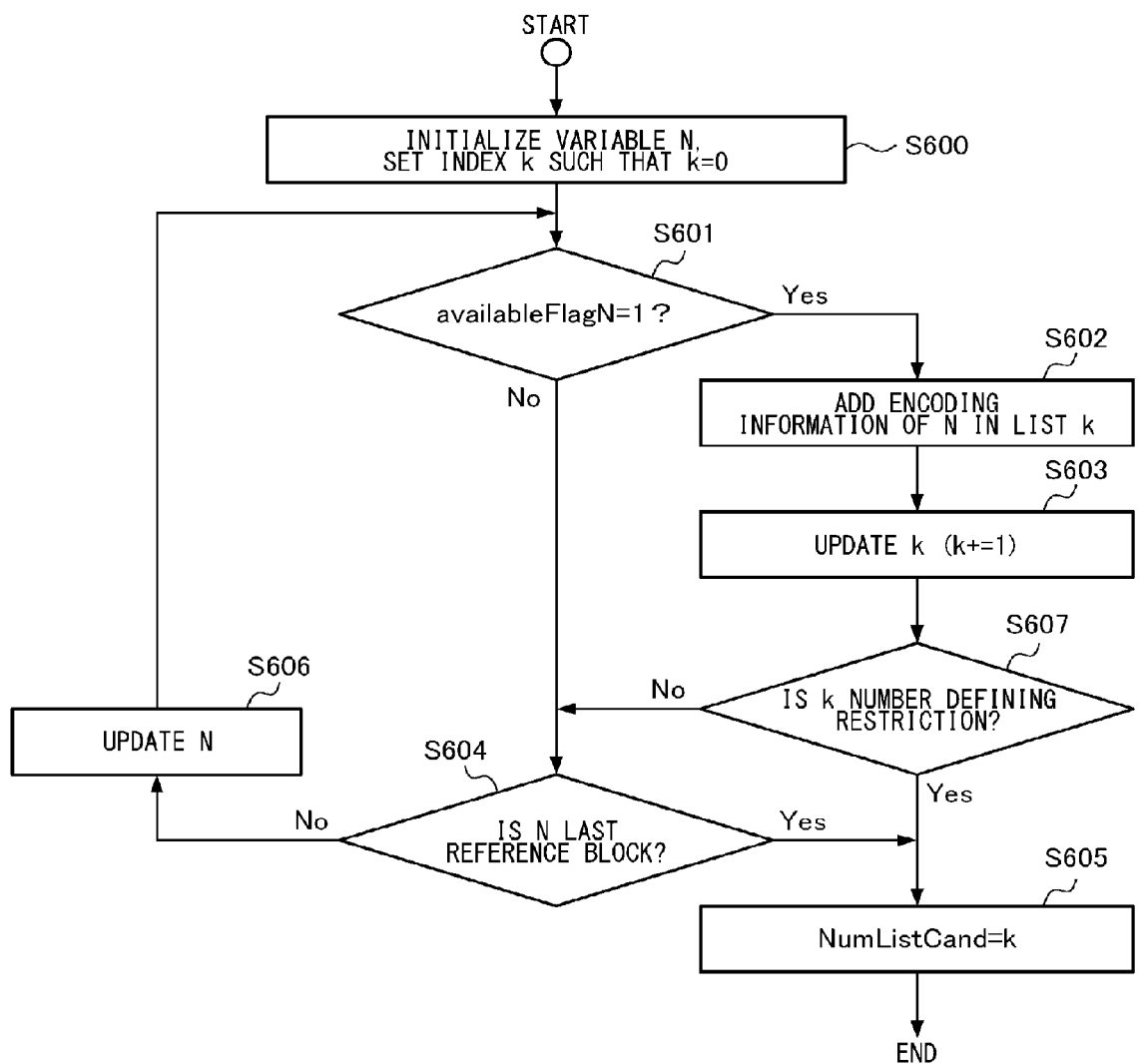
FIG. 51 is a flowchart showing the operation performed in the reference candidate list construction unit according to the seventh embodiment to update the reference candidate list by restricting the coding information added in the reference candidate list.

FIG. 51 is a flowchart showing the operation of the reference candidate list construction unit 311 according to the seventh embodiment. The function of restricting the candidates of reference according to the seventh embodiment is added to the reference candidate list construction unit 311 performing the operation shown in FIG. 19 of the first embodiment. Step S607 is added to the flowchart of FIG. 19 so that the added step will be described.

First, the variable N and an index k in the reference candidate list are initialized (S600). The index k indicates the order of priority of an area for storing the candidate of coding information defined in the storage area for the reference candidate list.

The flag availableFlagN indicating the availability of the reference neighboring block is examined (S601). If availableFlagN is 1 (Y in S601), the coding information of the neighboring block N is added in the reference candidate list (S602), and k is updated (S603).

A decision is made as to whether k reaches the number defining restriction (S607). If k is less than the number defining restriction (N in S607), it means that the reference candidate list does not contain as many items of coding information as the number defining restriction yet so that control proceeds to step S604. If k reaches the number defining restriction (Y in S607), it means that the reference candidate list contains as may items of coding information as the number defining restriction. Therefore, the value of the index is substituted into the total number of listed candidates NumListCand (S605), and the process is terminated.

The description above relates to an example where the reference candidate restriction unit 318 is added to the merge detection unit 106 of the first embodiment. It is also possible to add the reference candidate restriction unit 318 in other embodiments. It is also possible to add the reference candidate restriction unit 318 to the merge decision unit 206 according to the seventh embodiment corresponding to the merge detection unit 106 and provided in the moving picture decoding device 200. The same advantage will be obtained by providing the function of the reference candidate restriction unit 318 in the reference candidate list construction unit 311 or the identical information detection unit 312 in the merge decision unit 206 instead of providing the reference candidate restriction unit 318 in the merge decision unit 206. It should be noted, however, that the reference candidate restriction unit 318 should be provided at the same position on the coding side and on the decoding side or that the function of the reference candidate restriction unit 318 should be provided in the same processing unit.

Figure 52:
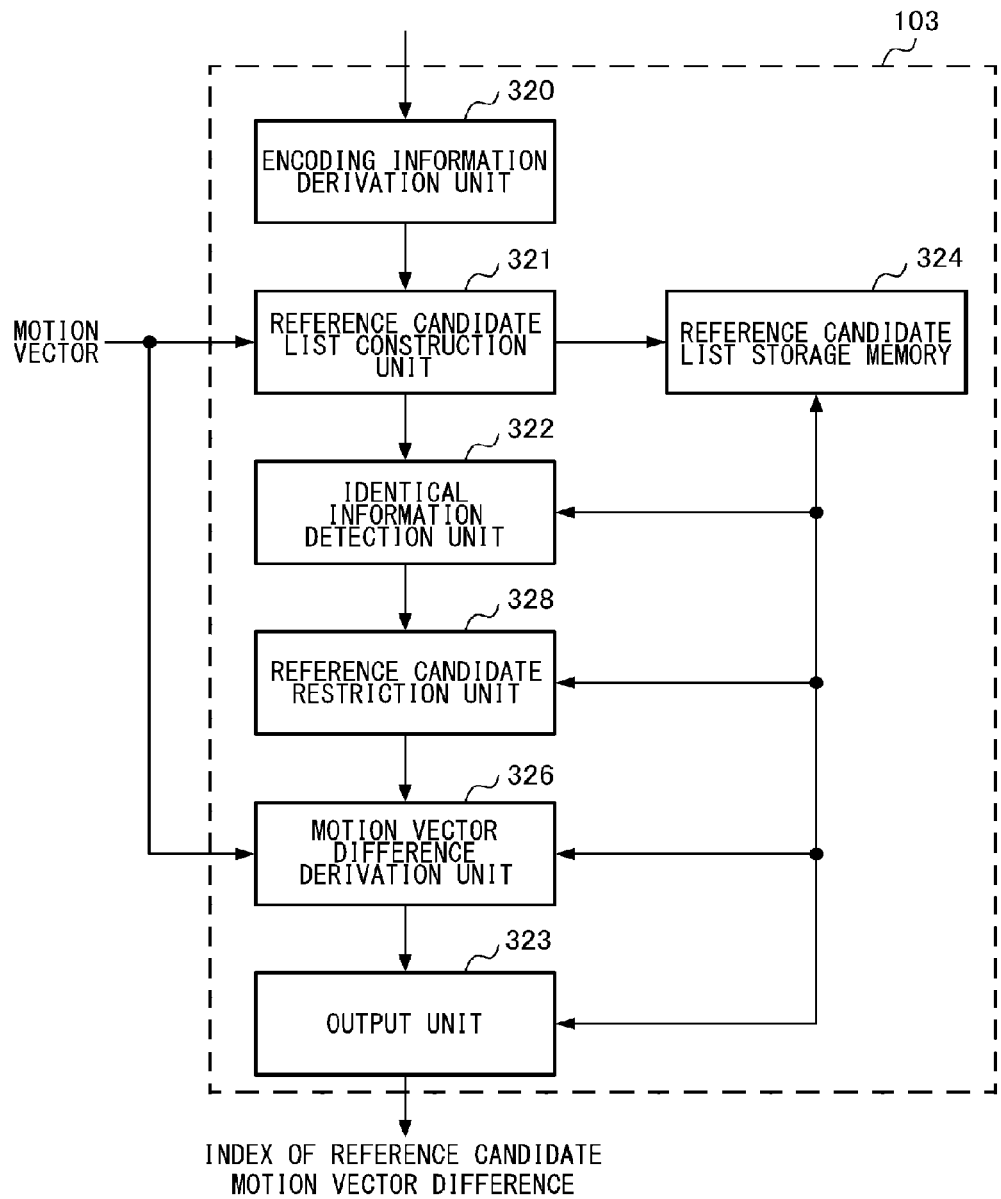
FIG. 52 is a block diagram showing the detailed configuration of the motion vector prediction unit according to the seventh embodiment.

A description will now be given of the motion vector prediction unit 103 according to the second embodiment shown in FIG. 2 illustrating the configuration of the moving picture coding device 100. FIG. 52 shows the configuration of the motion vector prediction unit 103 based on the motion vector prediction unit 103 of the moving picture coding device according to the first embodiment shown in FIG. 23 and additionally including a reference candidate restriction unit 328 according to the seventh embodiment. The components shown in FIG. 52 have basically the same function as the corresponding components shown in FIG. 23, but the processes in the coding information derivation unit 320 and the reference candidate list construction unit 321 are different from those of the first embodiment. The functions of the coding information derivation unit 320, the reference candidate list construction unit 321, and the reference candidate restriction unit 328 according to the seventh embodiment will be described.

Figure 53:
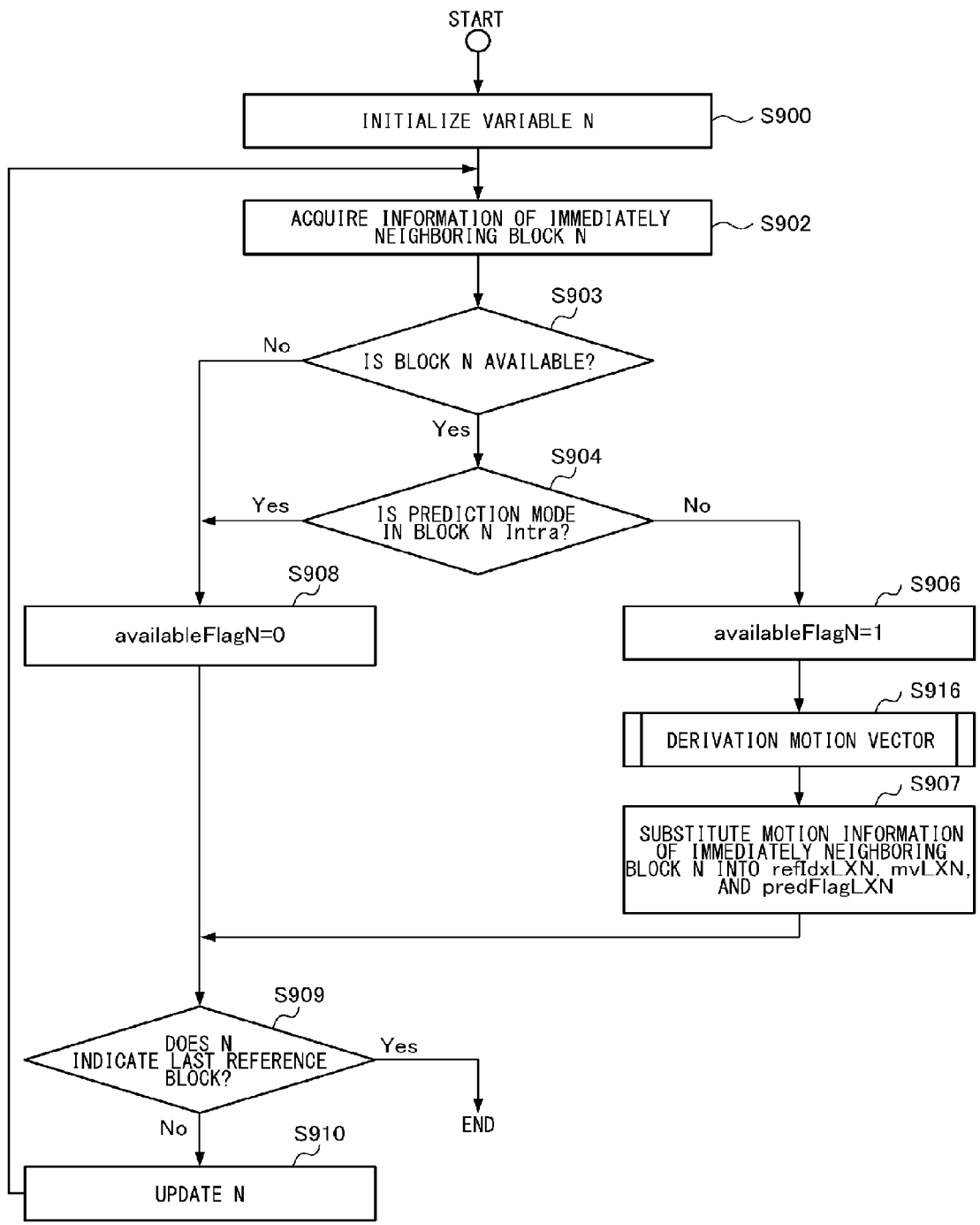
FIG. 53 is a flowchart showing the operation performed in the coding information derivation unit according to the seventh embodiment to select an immediately neighboring block.

FIG. 53 is a flowchart showing the operation of the coding information derivation unit 320 according to the seventh embodiment. The coding information derivation unit 320 according to the first embodiment performs decision in accordance with the prediction mode in the target prediction block. More specifically, in the case of unidirectional L0 prediction, only the coding information added in the reference list L0 is subject to decision. In the case of unidirectional L1 prediction, only the coding information added in the reference list L1 is subject to decision. In the case of bidirectional prediction, the coding information in each of the L0 and L1 reference lists is subject to decision independently of each other.

In the seventh embodiment, availability of the neighboring block is first decisioned regardless of the type of list. The coding information is then detected and acquired in accordance with the prediction mode in the target prediction block. The above-mentioned process eliminates the need to make decision as to availability of the neighboring block in each list and so reduces the number of steps.

First, a variable N is initialized (S900). Neighboring blocks B0, A0, A1, B1, and C0 shown in FIG. 9A as being located in the same picture are substituted into the variable N. It will be assumed that the variable is initially set such that N=B0 and updated in the order A0, A1, B1, and C0.

The motion estimation mode is configured to transmit a motion vector difference. The coding size of the motion vector difference is reduced and the coding efficiency is improved by adding candidates such that the candidate to the left and the candidate above are distanced from each other to ensure a large difference in the motion vector between the candidates and to provide a broad scope of selection of the motion vector predictor as a result. The purpose of the method of decisioning the order of priority in the motion estimation mode differs from that of the merge mode where neighboring blocks most likely to have the same coding information are added in preference to the other blocks.

The position and coding information of the neighboring block with the variable N (hereinafter, referred to as the neighboring block N) are acquired (S902). A decision is made as to whether the neighboring block N is available based on the acquired position of the neighboring block N (S903). For example, if the target prediction block is located at the left edge of the picture, there will be no neighboring blocks to the left of the target prediction block so that there should not be corresponding coding information in the coding information storage memory 114. In this case, a decision of unavailability is made.

If the neighboring block N is unavailable (N in S903), availableFlagN is set to "0" (S908). If the neighboring block N is available (Y in S903), a decision is made as to whether the prediction mode in the neighboring mode N is Intra (S904). If the prediction mode of the neighboring block N is not Intra (N in S904), namely, if the mode is the Inter mode, availableFlagN is set to "1" (S906). Subsequently, the motion vector is derivated (S916). After the motion vector is derivated, the coding information of the neighboring block N is substituted into refIdxLXN, mvLXN, and predFlagLXN (S907).

When the decision step is completed for the neighboring block N as described above, a decision is made as to whether the variable N indicates the last neighboring block (S909). Since the variable N is updated in the order B0, A0, A1, B1, and C0, a decision is made as to whether N is C0. If N is C0 (Y in S909), it means that all neighboring blocks have been subjected to decision so that the process is terminated. If N is not C0 (N in S909), N is updated (S910). N is updated in the aforementioned order of neighboring blocks so that step S902 and the subsequent steps are repeated for the neighboring block N.

Figure 54:
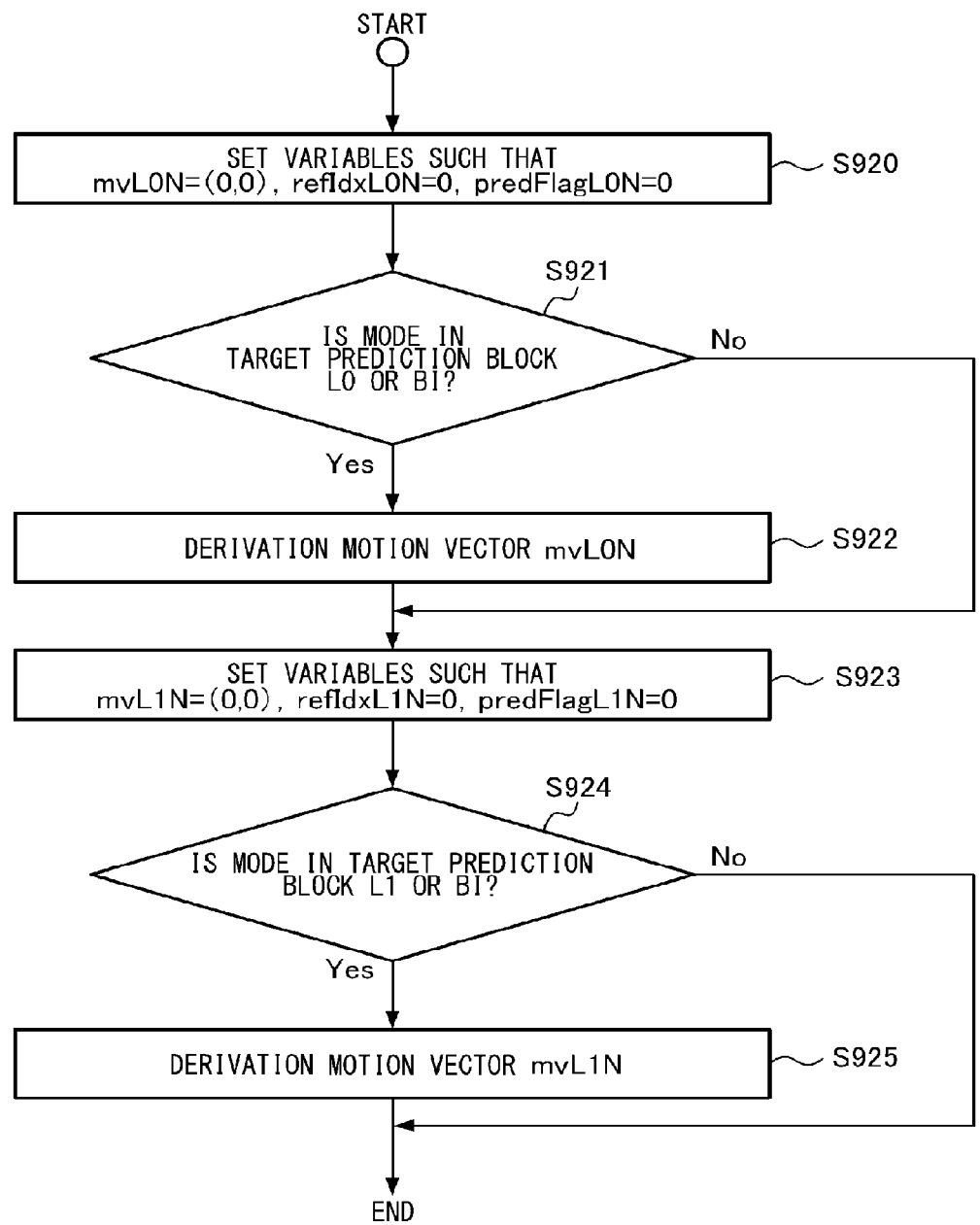
FIG. 54 is a flowchart showing the detailed operation of the coding information derivation unit according to the seventh embodiment to derivate a motion vector.

The steps of the derivating the motion vector will be described using the flowchart of FIG. 54. First, variables for storing the coding information of the neighboring block N of L0 prediction are initialized. The variables include: a motion vector mvL0N of the neighboring block N; a reference picture number refIdxL0N; and a flag predFlagL0N indicating the availability of a reference list. The variables are initialized as follows (S920).
mvL0N=(0,0)
refIdxL0N=0
predFlagL0N=0

Subsequently, a decision is made as to whether the Inter mode in the target prediction block is unidirectional L0 prediction or Bi-pred prediction (bidirectional) (S921). In Bi-pred prediction, two reference lists for L0 prediction and L1 prediction are used. If the mode in the target block is unidirectional L0 prediction or Bi-pred prediction (Y in S921), control proceeds to derivation of the motion vector mvL0N of the neighboring block N (S922).

If the reference picture number and the reference list of the target prediction block are identical to those of the neighboring block N, the motion vector of the neighboring block N is substituted into mvL0N. If the reference picture number and the reference list of the target prediction block are not identical to those of the neighboring block N, the motion vector of the neighboring block N is scaled. The scaling process is described in the first embodiment so that the description thereof is omitted. By scaling the motion vector, a motion vector closer to that of the target prediction block can be derived so that precision is improved accordingly. The scaled motion vector is substituted into mvL0N, and the coding information from L0 prediction in the neighboring block N is substituted into refIdxL0N and predFlagL0N.

If the mode is neither unidirectional L0 prediction nor Bi-pred prediction (N in S921), control proceeds to a decision on the L1 motion vector. Subsequently, variables for storing the coding information of the neighboring block N of L1 prediction are initialized. The variables include: a motion vector mvL1N of the neighboring block N; a reference picture number refIdxL1N; and a flag predFlagL1N indicating the availability of a reference list. The variables are initialized as follows (S923).
mvL1N=(0,0)
refIdxL1N=0
predFlagL1N=0

Subsequently, a decision is made as to whether the Inter mode in the target prediction block is unidirectional L1 prediction or Bi-pred prediction (bidirectional) (S924). In Bi-pred prediction, two reference lists for L0 prediction and L1 prediction are used. If the mode in the target block is unidirectional L1 prediction or Bi-pred prediction (Y in S924), control proceeds to derivation of the motion vector mvL1N of the neighboring block N (S925).

If the reference picture number and the reference list of the target prediction block are identical to those of the neighboring block N, the motion vector of the neighboring block N is substituted into mvL1N. If the reference picture number and the reference list of the target prediction block are not identical to those of the neighboring block N, the motion vector of the neighboring block N is scaled. The scaling process is described in the first embodiment so that the description thereof is omitted. The scaled motion vector is substituted into mvL1N, and the coding information from L1 prediction in the neighboring block N is substituted into refIdxL1N and predFlagL1N. If the mode is neither unidirectional L1 prediction nor B-pred prediction (N in S924), the process is terminated.

As described above, the immediately neighboring block located in the same picture as the target prediction block is used as a reference block and the coding information is derived accordingly. Derivation of the coding information of the block neighboring the block located in another picture at a different point of time at a position equivalent to that of the target prediction block is as described in the first embodiment so that the description thereof is omitted.

The coding information of the neighboring block thus obtained is entered in the reference candidate list construction unit 321. If the Inter mode is designated in the target prediction block, the reference candidate list construction unit 321 constructs reference candidate lists for the two reference lists, namely, the L0 reference list and the L1 reference list. In the first embodiment, the reference candidate list is constructed for each reference list. In the seventh embodiment, a single flag availableFlagN is used regardless of the reference list to indicate the availability of the neighboring block used in subsequent decision. It is therefore possible to construct the L0 reference candidate list and the L1 reference candidate list at the same time so that the number of steps can be reduced.

Figure 55:
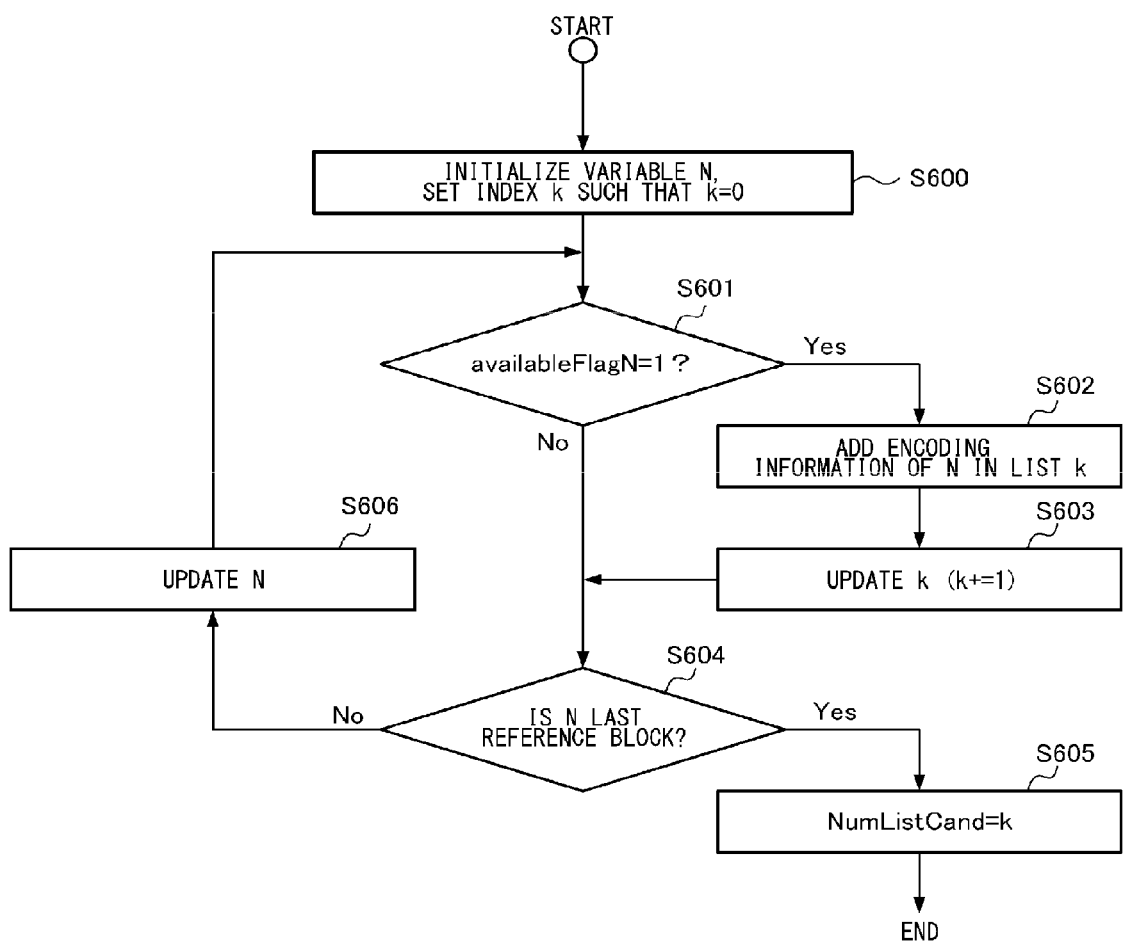
FIG. 55 is a flowchart showing the operation performed in the reference candidate list construction unit according to the seventh embodiment to add the coding information of the reference neighboring block selected by the coding information derivation unit in the reference candidate list.

The operation of the reference candidate list construction unit 321 will be described by using the flowchart of FIG. 55. First, the variable N and an index k in the reference candidate list are initialized (S600). The variable N is initialized to contain the neighboring block B0 shown in FIG. 9A, and k is set to 0. The variable N indicates the order of priority B0, A0, A1, B1, C0 of storage in the reference candidate list. The index k indicates a number assigned to a storage area for storing the candidate of coding information defined in a storage area in the reference candidate list, and corresponds to the order of priority.

The flag availableFlagN indicating the availability of the reference neighboring block N is examined (S601). If availableFlagN is 1 (Y in S601), the coding information of the neighboring block N is added in the two reference candidate lists candListLX[k] from L0 and L1 prediction (S602), and k is updated (S603), where the suffix X denotes 0 or 1. If availableFlagN is 0 (N in S601), the coding information is not added in the reference candidate list, and control proceeds to the next step. A decision is made as to whether the neighboring block N is the last reference block (S604). If the block N is the last block (Y in S604), the value of the index is substituted into the total number of listed candidates NumListCand (S605), and the process is terminated. If the block N is not the last block (N in S604), the variable N is updated (S606), and step S601 and the subsequent steps are repeated.

The reference candidate restriction unit 328 receives a reference candidate list obtained by deleting a reference neighboring block in the reference candidate list having the same motion vector as another block, using the identical information detection unit 322. The reference candidate restriction unit 328 allows as many neighboring blocks toward the top of the indexed reference candidate list as the number defining restriction. The reference candidate restriction unit 328 deletes or de-selects the other blocks. If, for example, the number of candidates is restricted to three in the exemplary reference candidate list according to the first embodiment shown in FIG. 28 in which no motion vectors are identical to each other, the three neighboring blocks at the top of the list assigned indices 0 through 2 are allowed to remain as candidates of reference so that the remaining candidates will be unused and removed from the list of reference candidates.

In this way, neighboring blocks are added in the reference candidate list as candidates of reference with a restriction being imposed on the number of candidates in the list as described above. This reduces the total number of reference neighboring blocks as compared with the first embodiment. Therefore, the size of codewords assigned is reduced so that the coding efficiency is improved. The candidates are restricted such that those neighboring blocks with higher priority in the reference candidate list are prioritized. Therefore, the coding efficiency is prevented from being lowered. Restriction to the number of candidates in the reference candidate list may be effected by defining the number for restriction in the header information such as SequenceParameterSet (SPS) or SliceHeader.

The number may be defined as an implicit condition on the coding side and on the decoding side. The method of definition is non-limiting so long as inconsistency is not created in the coding side and in the decoding side. The number defining restriction may be defined depending on the prediction mode. Further, the number defining restriction in the reference candidate list may be changed depending on the coding information of the neighboring block referred to by the target prediction block already coded or decoded.

Described above is a method of restricting the number of candidates of reference by providing the reference candidate restriction unit 328 immediately subsequent to the identical information detection unit 312. The same advantage will be obtained by providing the function of the reference candidate restriction unit 328 in the identical information detection unit 312 instead of providing the reference candidate restriction unit 328 in the motion vector prediction unit 103. In this case, the identical information detection unit 322 compares the candidates of coding information stored in the reference candidate list. If a set of candidates with the identical motion vectors are identified, the identical information detection unit 322 deletes all candidates in the set except for the candidate of coding information having the smallest index in the reference candidate list. The identical information detection unit 322 adds the candidate of coding information having the smallest index in the reference candidate list again and, when the number of candidates added reaches the number defined for restriction, terminates the process.

Figure 56:
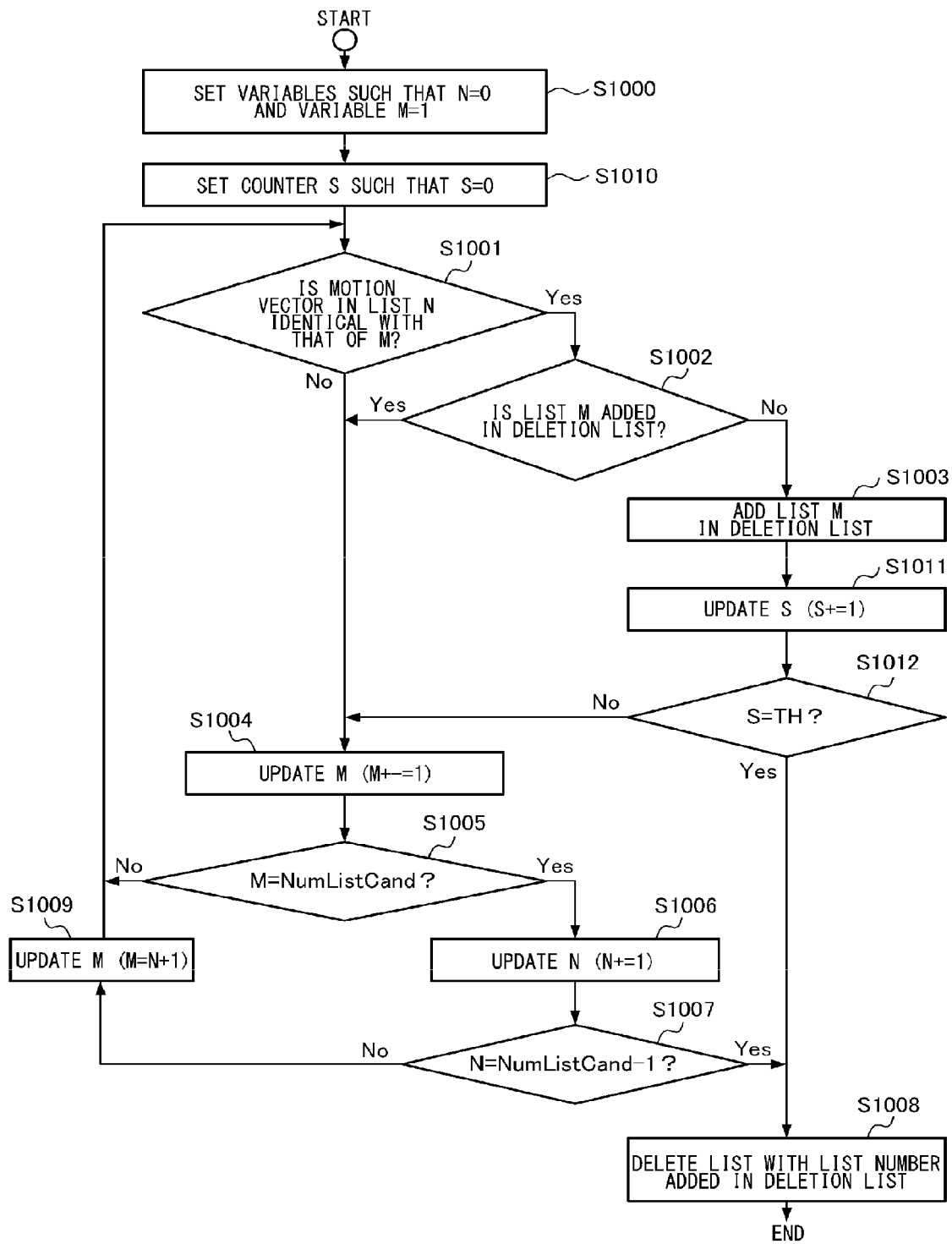
FIG. 56 is a flowchart showing the operation performed in the identical information detection unit according to the seventh embodiment to update the reference candidate list by restricting the coding information added in the reference candidate list.

FIG. 56 is a flowchart showing the operation of the identical information detection unit 322 according to the seventh embodiment. The function of restricting the candidates of reference according to the seventh embodiment is added to the identical information detection unit 322 performing the operation shown in FIG. 29 of the first embodiment. Steps S1010 through S1012 are added to the flowchart of FIG. 29 so that the added steps will be described.

After defining the variables n and m indicating the indices in the reference candidate list, a counter s indicating the number of candidates in the reference candidate list added in a deletion list is set to 0 (S1010). A decision is then made in step S1002 as to whether m is already added in the deletion list. If m is not added in the deletion list yet (N in S1002), m is added in the deletion list (S1003), and the counter s is updated by being incremented by 1 (S1011).

A decision is then made as to whether s is equal to a threshold value TH (S1012), where the threshold value TH denotes the number obtained by subtracting the number defining restriction from the total number of listed candidates NumListCand. Namely, the threshold value TH indicates the maximum number of candidates added in the deletion list. When the threshold value TH is reached, as many candidates as the number defining restriction are allowed to remain in the reference candidate list. When s is equal to TH (Y in S1012), as many candidates as the number defining restriction remain in the reference candidate list. The step for decision on identical information is terminated, and control proceeds to step S1008. The coding information in a storage area in the list corresponding to the index added in the deletion list is deleted. The entry with the index 0 is allowed to remain intact and the vacancy is filled by the succeeding candidates in the ascending order of the index. The codewords are updated, whereupon the process is terminated. It should be noted that the total number of listed reference candidates NumListCand is updated to the number defining restriction.

The reference candidate restriction unit 328 may be provided to immediately precede the identical information detection unit 322. In this case, the number of candidates of reference in the reference candidate list constructed in the reference candidate list construction unit 321 is reduced so that the maximum number of times that the identical information detection unit 322 detects identical information is reduced. Accordingly, the processing volume is advantageously reduced.

Figure 57:
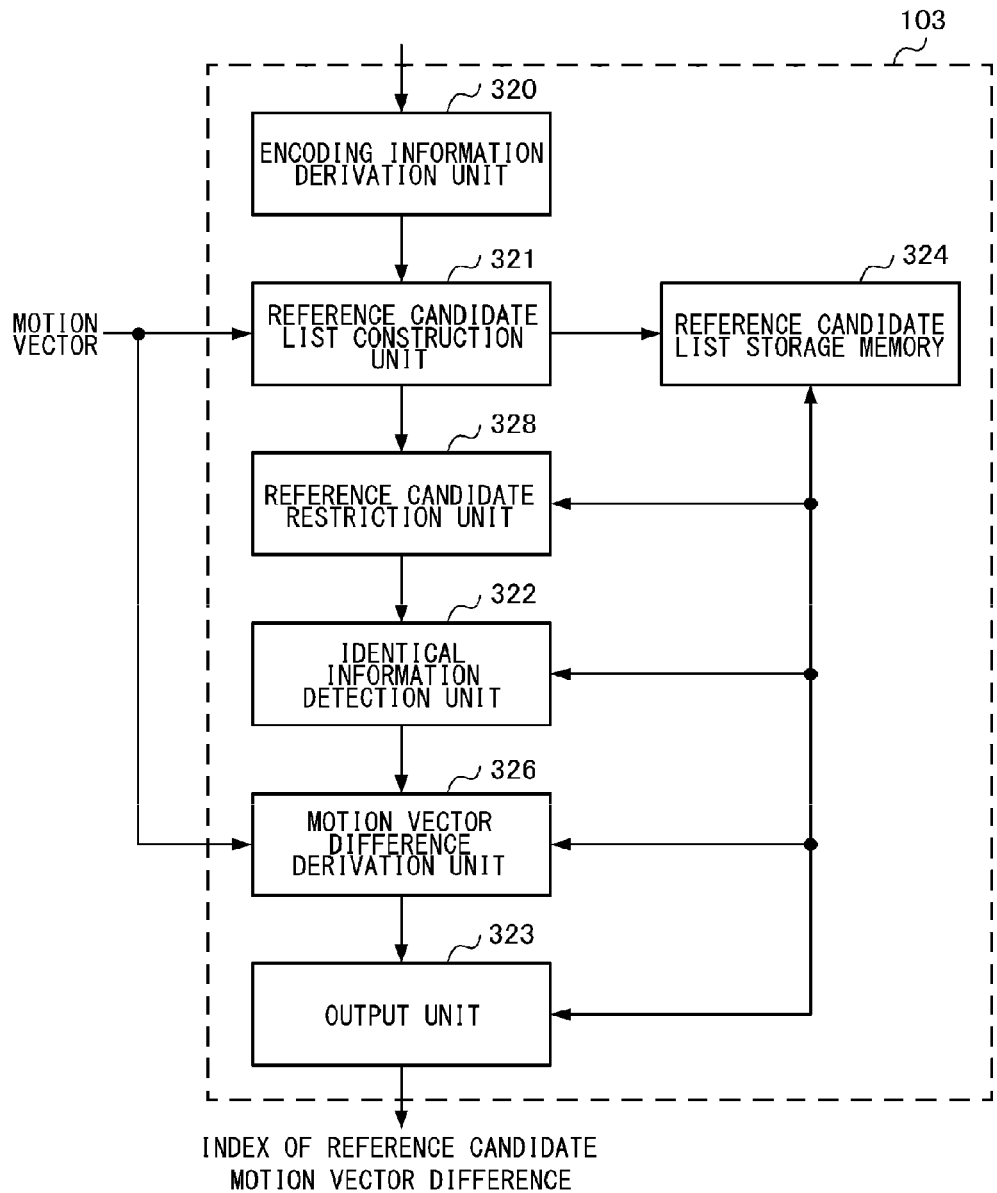
FIG. 57 is a block diagram showing the detailed configuration of the motion vector prediction unit according to the seventh embodiment.

FIG. 57 shows the configuration of the motion vector prediction unit 103 based on the motion vector prediction unit 103 of the moving picture coding device according to the first embodiment shown in FIG. 23 and additionally including a reference candidate restriction unit 328 according to the seventh embodiment. The components shown in FIG. 57 have basically the same function as the corresponding components shown in FIG. 23. The difference from the configuration in FIG. 52 mentioned above resides only in the position of the reference candidate restriction unit 328. The operation of the reference candidate restriction unit 328 remains the same. The reference candidate restriction unit 328 allows as many neighboring blocks toward the top of the indexed reference candidate list constructed by the reference candidate list construction unit 321 as the number defining restriction. The reference candidate restriction unit 328 deletes or de-selects the other blocks.

Described above is a method of restricting the number of candidates of reference by providing the reference candidate restriction unit 328 to immediately precede the identical information detection unit 322. The same advantage will be obtained by providing the function of the reference candidate restriction unit 328 in the reference candidate list construction unit 321 instead of providing the reference candidate restriction unit 328 in the motion vector prediction unit 103. In this case, the reference candidate list construction unit 321 adds the coding information of the reference neighboring block derived by the coding information derivation unit 320 in the reference candidate list, and also counts the number of reference neighboring blocks added in the reference candidate list. When the counted number reaches the number defining restriction, the reference candidate list construction unit 321 terminates the process. The operation of the reference candidate list construction unit 321 is as shown in FIG. 51, which shows the operation of the reference candidate list construction unit 311 according to the seventh embodiment except that the L0 reference candidate list and the L1 reference candidate list are constructed at the same time in accordance with the prediction mode in the target prediction block. Therefore, a description of the operation of the reference candidate list construction unit 321 is omitted.

(Eighth Embodiment)

In the eighth embodiment, block groups of reference neighboring blocks different from the groups of the second and fifth embodiments are defined. A total of K neighboring blocks are selected to represent the block group. A description will be made with reference to the arrangement of neighboring blocks in FIG. 31A. As in the fourth embodiment, of the six neighboring blocks A0, A1, B0, B1, C0, and T, the neighboring blocks A0, A1, B0, B1, C0 located in the same picture as the target prediction block are placed in a block group. A total of K neighboring blocks are selected to represent the block group.

The coding information of a total of K+1 neighboring blocks including K representing neighboring blocks selected in the same picture, and a block T neighboring the block located in another picture at a different point of time at a position equivalent to that of the target prediction block, is added in the reference candidate list. In the fourth embodiment, the coding information derivation unit 310 and the coding information derivation unit 320 select K (2) representative neighboring blocks. In the eighth embodiment, as in the first embodiment, the coding information derivation unit 310 and the coding information derivation unit 320 select all neighboring blocks and K (2) representative neighboring blocks are selected in the step of constructing the reference candidate list and the subsequent steps.

The eighth embodiment is equivalent to a case of applying the seventh embodiment, which restricts the number of neighboring blocks selected as candidates of reference, to the block group located in the same picture as the target prediction block. The eighth embodiment differs from the seventh embodiment in that only the block neighboring the block located in another picture at a different point of time at a position equivalent to that of the target prediction block is defined as an exception and added at the end of the reference candidate list. The neighboring blocks located in the same picture are likely to have the identical coding information. The block neighboring the block located in another picture at a different point of time at a position equivalent to that of the target prediction block is likely to have different coding information. Therefore, it will be more advantageous to add the block in the different picture as an independent candidate. For example, even when the Intra mode is defined in all of the neighboring blocks in the same picture, the block neighboring the block located in another picture at a different point of time at a position equivalent to that of the target prediction block is likely to have coding information from Inter-prediction. However, the block neighboring the block located in another picture at a different point of time at a position equivalent to that of the target prediction block is less likely to have coding information identical to or close to the coding information of the target prediction block than the neighboring blocks in the same picture as the target prediction block. Therefore, the block in the different picture is given a lower priority.

For this reason, the block in the different picture is assigned a lower priority than the neighboring blocks selected from the block group in the same picture and is added at the bottom of the reference candidate list. In the following description, it is assumed that the configuration of the moving picture coding device 100 and the moving picture decoding device 200 according to the eighth embodiment is the same as described in the seventh embodiment. However, the reference candidate restriction units 318 and 328 according to the seventh embodiment are not provided. The function of the reference candidate restriction unit is provided in the reference candidate list construction units 311, 321, or in the identical information detection units 312, 322. The block group of neighboring blocks located in the same picture as the target prediction block is subject to candidate restriction.

The neighboring blocks A0, A1, B0, B1, and C0 located in the same picture as the target prediction block are defined as belonging to a block group in the same picture in the merge detection unit 106 provided in the moving picture coding device 100 and in the reference candidate list construction unit 311 of the merge decision unit 206 provided in the corresponding moving picture decoding device 200. The blocks are also defined as belonging to a block group in the same picture in the motion vector prediction unit 103 provided in the moving picture coding device 100 and in the reference candidate list construction unit 321 of the motion vector derivation unit 204 provided in the corresponding moving picture decoding device 200. By giving priority to the neighboring blocks representing the block group in the same picture, followed by T, and adding the candidates of coding information of the reference neighboring blocks in the reference candidate list in the order of priority, the code size of the indices in the reference candidate list is reduced.

A description will first be given of the merge detection unit 106 according to the eighth embodiment shown in FIG. 2 illustrating the configuration of the moving picture coding device 100. The merge detection unit 106 is configured as illustrated in FIG. 11 described in the first embodiment. The process in the reference candidate list construction unit 311 differs from the operation according to the first embodiment. A description will be given of the operation of the reference candidate list construction unit 311 of the merge detection unit 106 according to the eighth embodiment.

Figure 58:
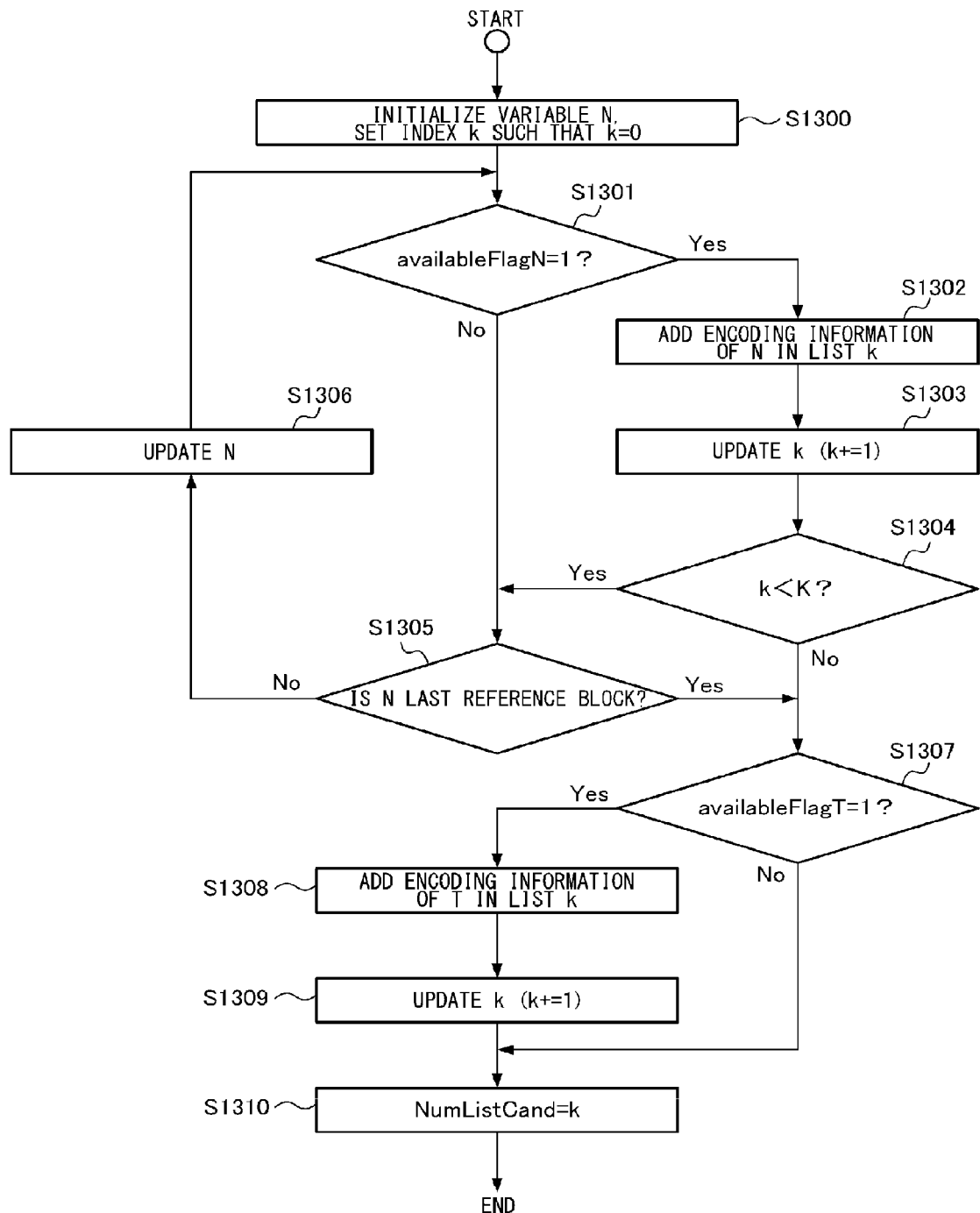
FIG. 58 is a flowchart showing the operation performed in the reference candidate list construction unit according to the eighth embodiment to add the coding information of the reference neighboring block selected by the coding information derivation unit in the reference candidate list.

FIG. 58 is a flowchart showing the operation of the reference candidate list construction unit 311 according to the eighth embodiment. In the eighth embodiment, the number K of reference neighboring blocks in the block group located in the same picture that are added in the reference candidate list is defined before constructing the reference candidate list. In this case, K is set to 2. K should not exceed the total number of neighboring blocks in the block group in the same picture.

First, the variable N and the index k in the reference candidate list are initialized (S1300). The variable N is initialized to a neighboring block with the highest priority in each prediction mode. The order of priority in the merge mode is A1, B0, B0, A0, C0 so that N is set to A1 and updated in this order. k is set to 0. The index k indicates the order of priority of an area for storing the candidate of coding information defined in the storage area for the reference candidate list.

The flag availableFlagN indicating the availability of the reference neighboring block N is examined first (S1301). If availableFlagN is 0 (N in S1301), the coding information is not added in the reference candidate list, and control proceeds to step S1305. If availableFlagN is 1 (Y in S1301), the coding information of the neighboring block N is added in the reference candidate list (S1302), and k is updated (S1303).

After k is updated, control proceeds to comparison between k and K (S1304). If k is less than K (Y in S1304), i.e., if the number of neighboring blocks added in the reference candidate list has not reached K, control proceeds to step S1305. If k is equal to or larger than K (N in S1304), it means that the number of neighboring blocks added in the reference candidate list has reached K. Control exits the decision as to whether to add the block in the reference candidate list and proceeds to step S1307.

A decision is made as to whether the neighboring block N is the last reference block (S1305). If the block N is not the last block (N in S1305), the variable N is updated (S1306), and step S1301 and the subsequent steps are repeated. If the neighboring block N is the last block (Y in S1305), control proceeds to step S1307.

When a decision on addition of a block group in the same picture is completed, the flag availableFlagT indicating the availability of the block T neighboring the block located in another picture at a different point of time at a position equivalent to that of the target prediction block is examined (S1307). If availableFlagT is 1 (Y in S1307), the coding information of the neighboring block T is added in the reference candidate list (S1308), and k is updated (S1309). If availableFlagT is 0 (N in S1307), the coding information is not added in the reference candidate list, and control proceeds to step S1310. The number of candidates added in the reference candidate list is defined as the total number of listed candidates NumListCand (S1310), and the process is terminated.

The candidates are added in the reference candidate list through the above steps. The maximum number of candidates added in the reference candidate list is denoted by K+1. Provided that only one reference neighboring block is available, the maximum codeword size will be 0 so that there will no need for codewords. The candidate of coding information of the neighboring block solely decisioned as being available is uniquely identified as the reference target.

A description will now be given of the merge decision unit 206 according to the eighth embodiment provided in the moving picture decoding device 200 and corresponding to the merge detection unit 106 provided in the moving picture coding device 100. The merge decision unit 206 is configured as illustrated in FIG. 22 described in the first embodiment. The process in the reference candidate list construction unit 311 differs from the operation according to the first embodiment. The other components, including the coding information derivation unit 310, the identical information detection unit 312, the reference candidate list storage memory 314, and the selection unit 315 have the same functions as those of the first embodiment.

The reference candidate list construction unit 311 has the same function as the reference candidate list construction unit 311 of the merge detection unit 106 according to the eighth embodiment. Thus, the same reference candidate list as constructed in the merge detection unit 106 according to the eighth embodiment is constructed in the steps through the identical information detection unit 312 of the merge decision unit 206. A description will be given of the selection unit 315, which acquires the coding information of the reference neighboring block from the constructed reference candidate list in the merge mode. The selection unit 315 selects the neighboring block in the reference candidate list designated by the index for identifying the reference neighboring block decoded in the first bitstream decoding unit 202. The selection unit 315 supplies the selected coding information to the motion compensation prediction unit 207 and to the coding information storage memory 210.

A description will now be given of the motion vector prediction unit 103 according to the eighth embodiment shown in FIG. 2 illustrating the configuration of the moving picture coding device 100. The motion vector prediction unit 103 is configured as shown in FIG. 23 described in the first embodiment. The process in the reference candidate list construction unit 321 is different from that of the first embodiment. A description will be given of the operation of the reference candidate list construction unit 321 according to the eighth embodiment.

As in the reference candidate list construction unit 311 of the merge detection unit 106, the reference candidate list construction unit 321 places the neighboring blocks A0, A1, B0, B1, C0 located in the same picture as the target prediction block in a block group and selects a total of K neighboring blocks to represent each block group. The reference candidate list construction unit 321 differs from the reference candidate list construction unit 311 of the merge detection unit 106 in that the L0 reference candidate list and the L1 reference candidate list are constructed at the same time. However, the flow of process does not differ significantly so that the description is omitted. The order of priority in the motion estimation mode is B0, A0, A1, B1, and C0.

The reference candidate list construction unit 321 of the motion vector derivation unit 204 according to the eighth embodiment provided in the moving picture decoding device 200 and corresponding to the motion vector prediction unit 103 provided in the moving picture coding device 100 has the same function as the corresponding reference candidate list construction unit 321 of the motion vector prediction unit 103. Thus, the same reference candidate list is constructed as in the motion vector prediction unit 103. Therefore, the description of the reference candidate list construction unit 321 will be omitted.

Provided that all of the reference neighboring blocks are available, the candidate list according to the eighth embodiment is constructed for each prediction mode as shown in FIG. 59. FIG. 59 shows an example in which the number of reference neighboring blocks in the block group in the same picture is 2 both in the merge mode and in the motion estimation mode. The neighboring blocks that are available and that have relatively higher priority are added in the reference candidate list in each prediction.

In the eighth embodiment, it is assumed that the order of priority is such that A1, B1, B0, A0, C0 in the case of the merge mode, and B0, A0, A1, B1, C0 in the case of the motion estimation mode. However, the order of priority is non-limiting. In the case of the merge mode, however, the neighboring blocks A1 and B1 are added toward the top of the reference candidate list in preference to the other blocks. This is because the coding information of the blocks A1 and B1 is most likely to be equal to that of the target prediction block and because the blocks A1 ad B1 are contiguous with the target prediction block at the sides. Thereby, the code size of merge indices reduced and the coding efficiency is improved.

The motion estimation mode is configured to transmit a motion vector difference. The coding size of the motion vector difference is reduced and the coding efficiency is improved by adding candidates such that the candidate to the left and the candidate above are distanced from each other to ensure a large difference in the motion vector between the candidates and to provide a broad scope of selection of the motion vector predictor as a result. The purpose of the method of decisioning the order of priority in the motion estimation mode differs from that of the merge mode where neighboring blocks most likely to have the same coding information are added in preference to the other blocks. It should be noted that the eighth embodiment may be used in the case of the merge mode and the second or any of the other embodiments may be used in the case of the motion estimation mode. A variety of combinations may be used depending on the prediction mode.

(Ninth Embodiment)

In the ninth embodiment, as in the first embodiment, neighboring blocks located in the same picture as the target prediction block and a block neighboring a block located in another picture at a different point of time at a position equivalent to that of the target prediction block are added in the reference candidate list provided that the neighboring block is available. The coding information of the optimum neighboring block is selected from the reference candidate list and indices in the reference candidate list indicating the neighboring blocks are coded and transmitted.

A description will be made with reference to the arrangement of neighboring blocks in FIG. 9A. In the first embodiment, the predefined order of priority is assigned to the position of the neighboring block when constructing the reference candidate list. A decision is made as to whether the neighboring block meets a predefined condition in the order of priority. If the condition is met, the neighboring block is added toward the top of the reference candidate list, thereby constructing the reference candidate list. The order of priority mapped to the position of the neighboring block is directly reflected in the indices in the reference candidate list. The higher the priority, the smaller the index assigned to the storage area in the reference candidate list in which the block is stored.

Generally, the larger the area of the neighboring block contiguous with the target prediction block, the more likely it is that the neighboring block has the coding information identical to that of the target prediction block. By adding such a neighboring block toward the top of the reference candidate list in preference to the other blocks, the code size of indices is reduced and the coding efficiency is improved.

In this respect, the order of decisioning the availability of the neighboring block when constructing the reference candidate list from motion vector prediction in the motion estimation mode and the order of codewords assigned to the reference neighboring blocks are separately defined. The order of decisioning the availability of the neighboring block when constructing the reference candidate list is defined such that the neighboring blocks are distanced from each other to ensure a large difference in the motion vector between the candidate of neighboring block to the left and the candidate above and to provide a broad scope of selection of the motion vector predictor as a result.

It will be assumed that the order of decisioning the availability of the neighboring block when constructing the reference candidate list from motion vector prediction is B0, A1, A1, B1, C0, T. Meanwhile, codewords of the sizes in ascending order A1, B1, B0, A1, C0, T are assigned to the reference neighboring blocks, thereby giving priority to neighboring blocks contiguous with the target prediction block over a larger area.

Figure 60:
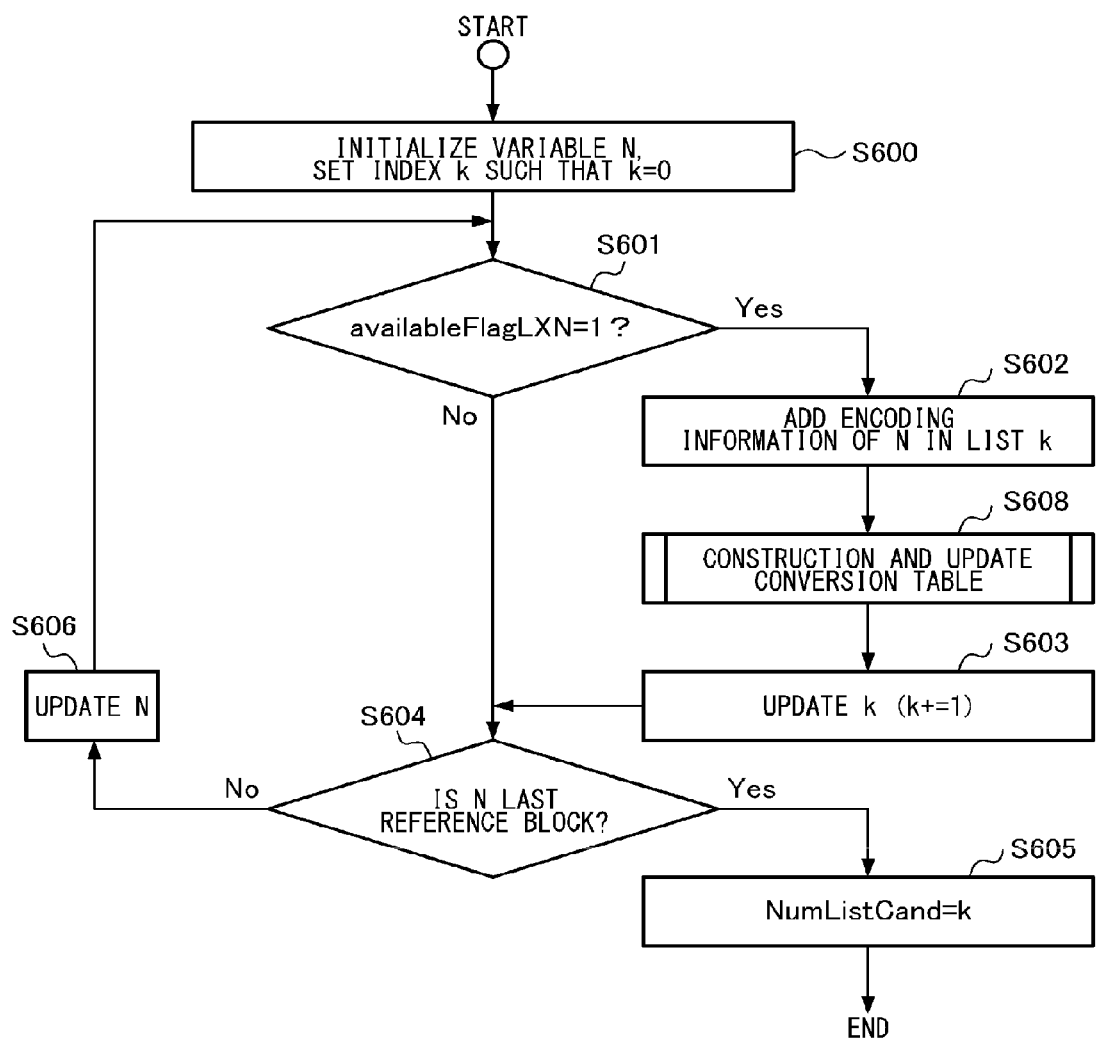
FIG. 60 is a flowchart showing the operation performed in the reference candidate list construction unit according to the ninth embodiment to add the coding information of the reference neighboring block selected by the coding information derivation unit in the reference candidate list.

A description will now be given of the motion vector prediction unit 103 according to the ninth embodiment shown in FIG. 2 illustrating the configuration of the moving picture coding device 100. The motion vector prediction unit 103 is configured as shown in FIG. 23 described in the first embodiment. The operation in the reference candidate list construction unit 321 is different from that of the first embodiment. A description will be given of the operation of the reference candidate list construction unit 321 according to the ninth embodiment. FIG. 60 is a flowchart showing the operation of the reference candidate list construction unit 321 in the motion estimation mode according to the ninth embodiment.

The reference candidate list construction unit 321 performs basically the same operation as that of the reference candidate list construction unit 321 in the motion vector prediction unit 103. In the motion estimation mode, it is necessary to construct the L0 reference candidate list and the L1 reference candidate list from the respective reference lists. Therefore, the step of constructing the reference candidate list in the motion estimation mode is performed twice to construct the L0 list and the L1 list. Therefore, in step S601 for decisioning the availability of the neighboring block, the suffix LX indicating the reference list is attached to the flag availableFlagLXN (X is 0 or 1; a symbol indicating the neighboring block is substituted into N) indicating the availability of the neighboring block. The steps of decision are the same as those of the merge mode.

Referring to FIG. 60, the step of constructing and updating a conversion table is added to the flowchart of FIG. 19 showing the operation of the reference candidate list construction unit 321 in the motion vector prediction unit 103. The operation of the reference candidate list construction unit 321 as well as that of decision will be described. Decision in only one of the reference lists will be discussed below. Decision in the other reference list is similar so that the description thereof is omitted.

First, the variable N and an index k in the reference candidate list are initialized (S600). The variable N is initialized to contain the neighboring block B0 shown in FIG. 9A, and k is set to 0. The index k indicates the order of priority of an area for storing the candidate of coding information defined in the storage area for the reference candidate list provided in the reference candidate list storage memory 324. The storage area has an array structure and is denoted candList. Indices start with 0. The storage area for the reference candidate list candList stores the candidate of coding information of the reference neighboring block. In the following description of the steps, the coding information assigned an index i added in the reference candidate list candList will be denoted by candList [i].

The flag availableFlagLXN indicating the availability of the reference neighboring block N is examined (S601). 0 or 1 may be substituted into X. If availableFlagLXN is 0 (N in S601), the coding information is not added in the reference candidate list, and control proceeds to the next step. A decision is made as to whether the neighboring block N is the last reference block (S604). If the block N is the last block (Y in S604), the value of the index k is substituted into the total number of listed candidates NumListCand (S605), and the process is terminated. If the block N is not the last block (N in S604), the variable N is updated (S606), and step S601 and the subsequent steps are repeated. The order of neighboring blocks according to which the variable N is updated is configured to be identical to the order of priority of storage in the reference candidate list. It will be assumed that the order (B0, A0, A1, B1, C0, T) is set in the ninth embodiment.

If availableFlagLXN is 1 (Y in S601), the coding information of the neighboring block N is added in the reference candidate list candList[k] (S602), the conversion table is constructed and updated (S608), and k is updated (S603).

A description will be given of the details of the step of constructing and updating the conversion table (S608). In the step of constructing and updating the conversion table, a conversion table that maps the order of decisioning the availability of the neighboring block when constructing the reference candidate list from motion vector prediction to the order of codewords assigned to the reference neighboring blocks. The conversion table is a storage area having an array structure and provided in the reference candidate list storage memory 324 to store indices of the conversion table mapped to the indices in the reference candidate list.

Figure 61:
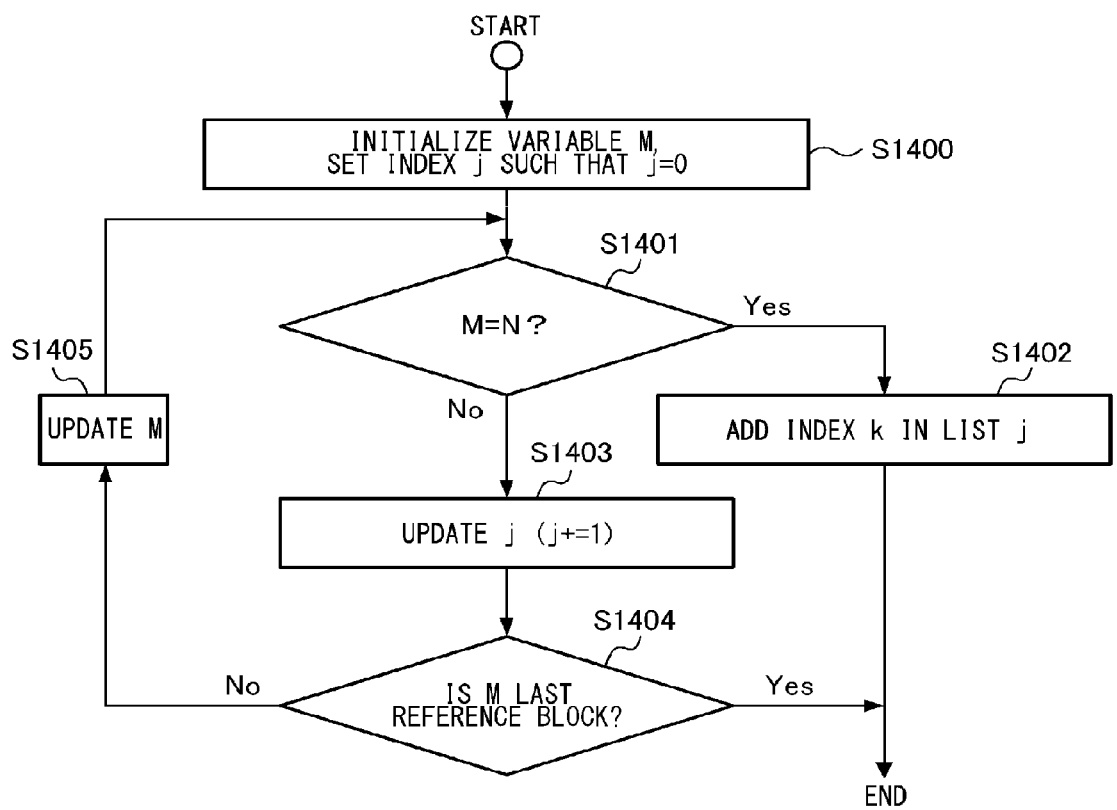
FIG. 61 is a flowchart showing the operation performed in the reference candidate list construction unit according to the ninth embodiment to construct and update a conversion table.

The step will be described with reference to FIG. 61. The variable N and the index k of the reference candidate list are entered so that the step of constructing and updating the conversion table is started. First, the variable M and the index j of the conversion table are initialized (S1400). The variable M is initialized to contain the neighboring block A1 shown in FIG. 9A, and j is set to 0. The variable M is updated in the order A1, B1, B0, A0, C0, T. A decision is then made as to whether M is equal to N (S1401). If M is not equal to N (N in S1401), the index is not added in the conversion table and j is updated (S1403).

A decision is made as to whether the variable M indicates the last neighboring block (S1404). The last neighboring block is T so that, if M is T (Y in S1404), the process is terminated. If M does not indicate the last block (N in S1404), the variable M is updated (S1405), and step S1401 and the subsequent steps are repeated.

If M is N (Y in S1401), the index k in the reference candidate list is added in the j-th storage area from the top in the conversion table (S1402). When the index k is added, the process is terminated and control returns to the step of updating k in FIG. 60 (S603). The indices k in the reference candidate list are added in the conversion table through the steps described above. Provided that all of the reference neighboring blocks are available, the indices k are mapped to the codewords represented by the indices in the conversion table shown in FIG. 62.

Provided that all of the reference neighboring blocks are available, the conversion table is used to construct the reference candidate list organized in the order shown in FIG. 63 to list the reference candidates in the conversion table, assigning the candidates to the respective codewords. Provided that only one reference neighboring block is available, there will no need for codewords. The candidate of coding information of the neighboring block solely decisioned as being available is uniquely identified as the reference target.

The description above concerns indices in the reference candidate list constructed by the reference candidate list construction unit 321 and left unmodified. Ideally, however, it is favorable to map the indices in the reference candidate list and the indices in the conversion table after the identical information detection unit 322 deletes from the reference candidate list those reference candidate neighboring blocks provided with coding information identical to that of another block. The storage area for the conversion table corresponding to the index in the reference candidate list assigned to the reference candidate neighboring block deleted by the identical information detection unit 322 is also deleted and the vacancy is filled toward the top of the conversion table.

If, for example, the neighboring block assigned the index 1 in the reference candidate list is deleted in FIG. 62, the entry with the index 3 in the conversion table corresponding to the index 1 in the reference candidate list is deleted. The indices 4 and 5 in the conversion table are renumbered as 3 and 4, respectively and the associated codewords are updated to 1110 and 1111, respectively.

The motion vector difference derivation unit 326 uses the motion vector in the reference candidate list thus constructed as a motion vector predictor. The motion vector difference derivation unit 326 derivates a motion vector difference from the motion vector estimated by the motion vector estimation unit 102 and the motion vector predictor. The motion vector difference derivation unit 326 supplies the derived motion vector difference to the output unit 323. The output unit 323 outputs the indices and the motion vector differences in the constructed reference candidate list. The reference candidate list is output as an MVP list and the index in the list is output as an MVP index.

The reference candidate list construction unit 321 or the identical information detection unit 322 having the same function as that of the motion vector prediction unit 103 is also provided in the motion vector derivation unit 204 provided in the moving picture decoding device 200 and corresponding to the motion vector prediction unit 103 provided in the moving picture coding device 100. Thus, the same reference candidate list is constructed as in the motion vector prediction unit 103. The reference candidate list thus constructed is output to the selection unit 325.

The selection unit 325 selects the neighboring block in the reference candidate list designated by the index for identifying the reference neighboring block decoded in the first bitstream decoding unit 202. The selection unit 325 outputs the motion vector from the coding information of the neighboring block in the selected list as the motion vector predictor. The motion vector addition unit 327 adds the motion vector predictor to the motion vector difference decoded in the first bitstream decoding unit 202 so as to derive the motion vector. The selection unit 325 supplies the motion vector to the motion compensation prediction unit 207 and supplies the coding information of the neighboring block in the selected list to the coding information storage memory 210.

(Tenth embodiment)

In the tenth embodiment, the order of decisioning the availability of the neighboring block when constructing the reference candidate list is changed depending on whether the first neighboring block is available or not. A description will be made with reference to the arrangement of neighboring blocks in FIG. 9A. The order B0, A0, A1, C0, B1, T in which the availability of the neighboring block is decisioned when constructing the reference candidate list, is used by way of example.

The first neighboring block subject to decision is B0. If B0 is available, the subsequent order of neighboring blocks remains unchanged. If B0 is not available, the subsequent order of neighboring blocks is changed to A0, B1, C0, A1. If B0 is not available, A0 will be the first neighboring block subject to decision, followed by the neighboring block A1. Since the position of A1 is close to that of A0, the motion vector of A1 is likely to have a value close to that of A0. The likelihood of A1 being selected to derive the motion vector predictor is reduced accordingly.

The motion estimation mode is a mode for transmitting a motion vector difference. If the value of the motion vector provided in the reference neighboring block is close to that of the target block, the scope of selection of the motion vector predictor is reduced resulting in a failure to estimate a proper motion vector predictor. For this reason, if B0 is found to be unavailable, the neighboring block B1, distanced from A0, is selected as the neighboring block subject to decision subsequent to A0 to ensure a large difference in the motion vector from A0 and to provide a broad scope of selection of the motion vector predictor as a result. Thus, the order of decision is changed so that the neighboring blocks to provide the candidate motion vector predictors are distanced from each other as much as possible.

(Eleventh Embodiment)

The eleventh embodiment provides a method of defining, in the motion estimation mode, the neighboring blocks located in the same picture as the target prediction block as belonging to a block group in the same picture and selecting two neighboring blocks to represent the block group. A description will be made with reference to the arrangement of neighboring blocks in FIG. 9A. The order of decisioning the availability of the neighboring block when constructing the reference candidate list is defined as B0, B1, C0, A1, A0.

First, the availability of the neighboring block is decisioned from left to right in the order B0, B1, C0, A1, A0 (forward direction). The neighboring block first decisioned to be available is added in the reference candidate list as the first neighboring block to represent the block group. Subsequently, the availability of the neighboring block is decisioned backward, i.e., from right to left, in the order A0, A1, C0, B1, B0 and the block decisioned to be available is added in the reference candidate list as another neighboring block to represent the block group.

By reversing the order of decisioning the availability of the neighboring block and adding the blocks to provide a distance between the candidates, thereby providing a large difference between the motion vector of the candidate neighboring block at the top right corner of the target prediction block and that of the bottom left corner, the scope of selection of the motion vector predictor is extended, and the code size of the motion vector difference is reduced so that the coding efficiency is improved.

In decisioning the availability of the neighboring block in the forward direction and in the backward direction, decision on the last neighboring block in the order (A0 in the case of the forward direction, and B0 in the case of the backward direction) may be omitted. Selection of the last neighboring block A0 in forward decision may not be appropriate because it is the neighboring block that could be identified as being available in the first decision in the backward direction.

The number of blocks subject to decision may be restricted such that only the three neighboring blocks as far as C0 may examined in forward decision and backward decision. For example, provided that A0 is selected in forward decision and A1 is selected in backward decision, the selected blocks are likely to have the same motion vector, which narrows the scope of selection of the motion vector predictor, with the result that the motion vector predictor cannot be derived in an effective manner. In order to avoid such selection of neighboring blocks proximate to each other, a decision as to availability is terminated at C0 in the middle of the order. Restriction on decision as to availability reduces the number of neighboring block subject to decision and so leads to reduction in the number of steps.

(Twelfth Embodiment)

The twelfth embodiment provides a motion estimation mode based on the ninth embodiment in which the neighboring blocks located in the same picture as the target prediction block are placed in a block group in the same picture and a neighboring block representing the block group is selected. In the twelfth embodiment, as in the ninth embodiment, the order of decisioning the availability of the neighboring block when constructing the reference candidate list from motion vector prediction and the order of codewords assigned to the reference neighboring blocks are separately defined.

The order observed when constructing the reference candidate list is defined such that the neighboring blocks are distanced from each other to ensure a large difference in the motion vector between the candidate of neighboring block to the left and the candidate above, and to provide a broad scope of selection of the motion vector predictor as a result. In the case of assigning codewords, neighboring blocks for which the coding information is most likely to be equal to that of the target prediction block and which are contiguous with the target prediction block over a large area are assigned codewords of smaller sizes in reference to the other blocks.

The order of decisioning the availability of the neighboring block when constructing the reference candidate list from motion vector prediction is defined as B0, A0, A1, C0, B1, T. Meanwhile, codewords of smaller sizes are assigned in the ascending order A1, B1, B0, A1, C0, T of reference neighboring blocks, giving priority to neighboring blocks contiguous with the target prediction block over a larger area.

Figure 64:
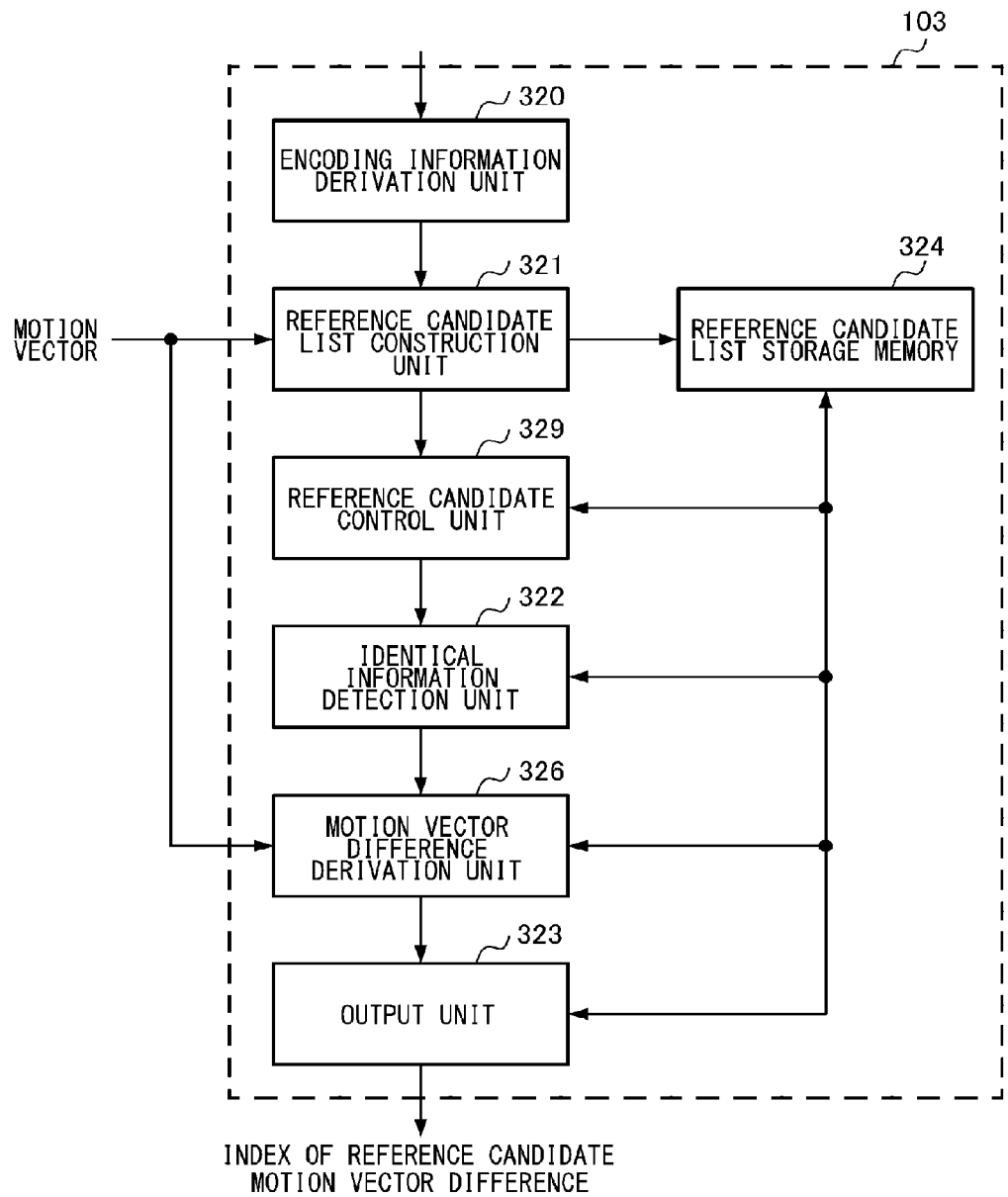
FIG. 64 is a block diagram showing the detailed configuration of the motion vector prediction unit according to the twelfth embodiment.

A description will first be given of the motion vector prediction unit 103 according to the twelfth embodiment shown in FIG. 2 illustrating the configuration of the moving picture coding device 100. The motion vector prediction unit 103 is configured as shown in FIG. 64. The difference from the configuration of FIG. 23 described in the ninth embodiment is that a reference candidate control unit 329 is added immediately subsequent to the reference candidate list construction unit 321.

In the twelfth embodiment, the neighboring block representing the block group in the same picture as the target prediction block is selected. The reference candidate list construction unit 321 performs the same operation as that of the eighth embodiment for selection from the block group in the same picture as the target prediction block. In this case, K representative neighboring blocks are selected from the block group in the same picture. The coding information of a total of K+1 neighboring blocks including the K neighboring blocks selected to represent the block group in the same picture, and a block T neighboring a block located in another picture at a different point of time at a position equivalent to that of the target prediction block, is added in the reference candidate list.

The description below assumes that K is 2, and the reference candidate list construction unit 321 adds two neighboring blocks representing the block group in the same picture and a block T neighboring a block located in another picture at a different point of time at a position equivalent to that of the target prediction block, in the reference candidate list in the stated order.

Figure 65:
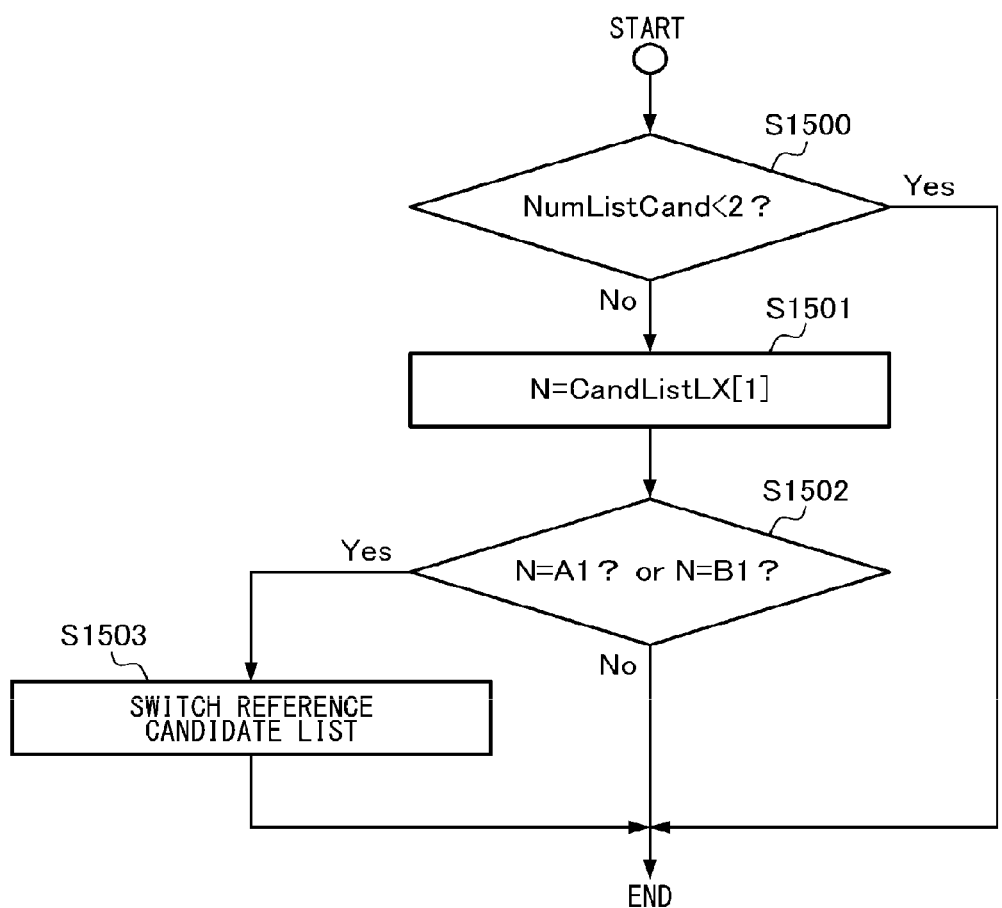
FIG. 65 is a flowchart showing the operation performed in the reference candidate control unit to replace the coding information added in the reference candidate list.

FIG. 65 is a flowchart showing the operation of the reference candidate control unit 329. The reference candidate list constructed in the reference candidate list construction unit 321 and the number of reference candidates NumListCand are input. First, NumListCand is examined (S1500). If NumListCand is less than 2 (Y in S1500), i.e., if number of reference candidates added in the reference candidate list is 1, that one candidate is uniquely identified so that the process is terminated.

If NumListCand is equal to or larger than 2 (N in S1500), the neighboring block having the coding information CandListLX[1] added second in the reference candidate list is defined as the block N. The first index in the array CandListLX for a reference candidate list starts with 0. Therefore, CandListLX[1] represents the storage area for storing the second coding information from the top of the reference candidate list. 0 (L0 prediction) or 1 (L1 prediction), which indicates the type of reference list, is substituted in the suffix X.

A decision is made as to whether N is the neighboring block A1 or the neighboring block B1 (S1502). If N is neither A1 nor B1 (N in S1502), the process is terminated. If N is A1 or B1 (Y in S1502), the coding information in the reference candidate list is subject to switching (S1503). The coding information CandList LX[0] at the top of the reference candidate list and the second coding information CandList LX[1] change their places in the list.

The order of constructing the reference candidate list is B0, A0, A1, C0, B1. Therefore, if A1 or B1 is listed second in the reference candidate list, the neighboring block at the top is assigned a codeword longer than that of A1 or B1. This is because the order of assigning codewords to indices identifying neighboring blocks is defined as A1, B1, B0, A0, C0, T and the codeword sizes are such that A1<B1<B0<A0<C0<T.

Therefore, A1 or B1 is caused to replace the entry at the top of the reference candidate list so as to give higher priority to the index with a smaller codeword size in the reference candidate list of neighboring blocks and to reduce the code size of the index as a result.

Replacement is also performed if the pre-replacement order is A1, B1 in the reference candidate list. Such replacement places B1 with a longer codeword at the top of the reference candidate list. However, the coding efficiency is prevented from being deteriorated as compared with the case where another neighboring block is at the top of the reference candidate list. The above-described steps replace entries in the reference candidate list and allow placing indices identifying neighboring blocks with a smaller codeword toward the top of the reference candidate list. Consequently, the coding efficiency is improved.

The motion vector difference derivation unit 326 provided immediately subsequent to the identical information detection unit 322 uses the motion vector in the constructed reference candidate list as a motion vector predictor. The motion vector difference derivation unit 326 derivates a motion vector difference from the motion vector estimated by the motion vector estimation unit 102 and the motion vector predictor. The motion vector difference derivation unit 326 supplies the derived motion vector difference to the output unit 323. The output unit 323 outputs the indices and the motion vector differences in the constructed reference candidate list. The referenced candidate list is output as an MVP list and the index in the list is output as an MVP index.

The reference candidate control unit 329 according to the twelfth embodiment having the same function as the motion vector prediction unit 103 is also provided in the motion vector derivation unit 204 provided in the moving picture decoding device 200 and corresponding to the motion vector prediction unit 103 provided in the moving picture coding device 100. Thus, the same reference candidate list is constructed as in the motion vector prediction unit 103. The reference candidate list thus constructed is output to the selection unit 325. The selection unit 325 selects the neighboring block in the reference candidate list designated by the index for identifying the reference neighboring block decoded in the first bitstream decoding unit 202. The selection unit 325 outputs the motion vector from the coding information of the neighboring block in the selected list as the motion vector predictor. The motion vector difference derivation unit 326 adds the motion vector predictor to the motion vector difference decoded in the first bitstream decoding unit 202 so as to derivate the motion vector. The selection unit 325 supplies the motion vector to the motion compensation prediction unit 207 and supplies the coding information of the neighboring block in the selected list to the coding information storage memory 210.

According to the embodiments as described above, the temporary memory storing the information of the neighboring block is reduced in scale by using the common arrangement of immediately neighboring blocks referred to in the motion vector prediction method and in the merge method. By using a common source of reference neighboring blocks to decision the order of priority of candidates depending on the prediction method, the coding efficiency is improved and the redundancy is reduced in the motion vector prediction method and the merge method for inter-prediction, and the efficiency of decoding is improved as well. By referring to the prediction mode and the positional information of the referenced immediately neighboring block to decision the availability of that block as a reference target, before performing motion compensation, the frequency of processes for motion compensation can be reduced.

A more specific description will be given. For the purpose of reducing the maximum frequency of memory accesses, memory size, and processing volume (processing time) that can be assumed, the number of candidates is reduced by defining only one block neighboring the target block to the left and one block neighboring above, as shown in FIG. 9A. By limiting the candidates in advance as described above, the frequency of memory accesses, memory size, and processing volume (processing time) can be advantageously reduced without substantially reducing the coding efficiency.

The embodiments are capable of reducing the frequency of memory accesses, memory size, and processing volume (processing time) and, moreover, reducing the code size of the merge indices and MVP indices advantageously. Another aspect of the embodiments is that commonly positioned candidates are used in the merge mode and in the motion estimation so that the frequency of memory accesses, memory size, and processing volume (processing time) are further reduced. Further, storage of candidates in the candidate list in an arrangement suited to the nature of the merge mode and the motion estimation mode provides a benefit in the merge mode in that the code size of merge indices is reduced and a benefit in the motion estimation mode in that the code size of MVP indices and of motion vector differences is reduced. Thereby, the coding efficiency is improved.

The present invention is not limited to the embodiments described above and encompasses, for example, a moving picture coding/decoding program for implementing the functions of the moving picture coding/decoding devices on a computer. The moving picture coding/decoding program may be read from a recording medium and imported into a computer. Alternatively, the program may be transmitted over a communication network and imported into a computer.

The bitstream of moving pictures output from the moving picture coding device according to any of the embodiments has a predefined format so that it can be decoded in accordance with the coding method used in the embodiments. The moving picture decoding device compatible with the moving picture coding device is capable of decoding the bitstream of the predefined data format.

If a wired or wireless network is used to exchange bitstreams between the moving picture coding device and the moving picture decoding device, the bitstream may be converted into a data format suited to the mode of transmission over the communication channel and be transmitted accordingly. In this case, there should be provided a moving picture transmitting device for converting the bitstreams output from the moving picture coding device into coded data of a data format suited to the mode of transmission over the communication channel and for transmitting the bitstreams over the network, and a moving picture receiving device for receiving the bitstreams from the network to recover the bitstream and supplying the recovered bitstreams to the moving picture decoding device.

The moving picture transmitting device includes a memory for buffering bitstreams output from the moving picture coding device, a packet processing unit for packetizing the bitstreams, and a transmitting unit for transmitting the packetized bitstreams over the network. The moving picture receiving device includes a receiving unit for receiving the packetized coded data over the network, a memory for buffering the received coded data, and a packet processing unit for subjecting the coded data to a packet process so as to generate bitstreams and providing the generated bitstreams to the moving picture decoding device.

Given above is an explanation based on exemplary embodiments. The embodiment is intended to be illustrative only and it will be obvious to those skilled in the art that various modifications to constituting elements and processes could be developed and that such modifications are also within the scope of the present invention.

[Item 1]

A picture coding device adapted to code each of blocks obtained by partitioning each picture of moving pictures, by using motion vectors, comprising: an acquisition unit configured to acquire coding information on a plurality of reference block candidates for the block subject to coding; a first mode detection unit configured to construct, in a first inter prediction mode that uses information on a motion vector provided in the coding information of a reference block identified by an index, a first candidate list from the plurality of reference block candidates in accordance with a first predetermined order, to assign indices for identifying reference block candidates added in the first candidate list, and to output the indices of the plurality of reference block candidates; a second mode detection unit configured to construct, in a second inter prediction mode that uses a motion vector predictor difference between a motion vector predictor based on information on a motion vector provided in the coding information of a reference block identified by an index and a motion vector of the block subject to coding, a second candidate list from the plurality of reference block candidates in accordance with a second predetermined order, to assign indices for identifying reference block candidates added in the second candidate list, and to output the indices of the plurality of reference block candidates and the motion vector difference; a prediction method decision unit configured to decision a reference block and an inter prediction mode for each block subject to coding, based on outputs from the first and second mode detection units; and a bitstream generation unit configured to code the index of the reference block decisioned by the prediction method decision unit, prediction mode information indicating the inter prediction mode decisioned by the prediction method decision unit, and the motion vector difference corresponding to the reference block, the motion vector difference being coded when the prediction method decision unit decisions on the second inter prediction mode, wherein the first and second mode detection units use a plurality of common blocks as the plurality of reference block candidates.

[Item 2]

The picture coding device according to Item 1, wherein the higher in the first predetermined order, the smaller the size of a codeword of the index assigned by the first mode detection unit to the reference block candidate.

[Item 3]

The picture coding device according to Item 1 or Item 2, wherein the first predetermined order of arranging the plurality of reference block candidates in the first candidate list constructed by the first mode detection unit differs from the second predetermined order of arranging the plurality of reference block candidates in the second candidate list constructed by the second mode detection unit.

[Item 4]

The picture coding device according to one of Items 1 through 3, wherein the first mode detection unit constructs the first candidate list of the plurality of reference block candidates such that the number of reference block candidates is limited, and the second mode detection unit constructs the second candidate list of the plurality of reference block candidates such that the number of reference block candidates is limited.

[Item 5]

The picture coding device according to one of items 1 through 4, wherein the plurality of reference block candidates include coded blocks spatially neighboring the block subject to coding and blocks included in a picture at a different point of time from a picture including the block subject to coding, wherein the first and second mode detection units arrange the plurality of reference block candidates such that a position of a block included in a picture at a different point of time in the first and second predetermined orders is lower than a position of a spatially neighboring block in the first and second predetermined orders.

[Item 6]

The picture coding device according to Item 5, wherein the first mode detection unit constructs the first candidate list according to the first predetermined order by providing a predetermined upper limit to the number of spatially neighboring coded blocks arranged in the first candidate list, and by using as many reference blocks as defined by the upper limit in the first predetermined order.

[Item 7]

The picture coding device according to Item 5 or Item 6, wherein the second mode detection unit constructs the second candidate list, by defining those of the plurality of spatially neighboring coded blocks arranged to the left of the block subject to coding as belonging to a block group to the left, defines those blocks arranged above the block subject to coding as belonging to a block group above, derives a candidate representing each of the block groups, and constructs the second candidate list by defining the second predetermined order such that the candidate from the block group to the left and the candidate from the block group above are arranged in the stated order.

[Item 8]

The picture coding device according to one of Items 1 through 7, wherein the first mode detection unit defines a maximum number of reference block candidates arranged in the first candidate list, and constructs the first candidate list based on the maximum number of reference block candidates, and wherein the bitstream generation unit codes information indicating the maximum number of reference block candidates and includes the information in the bitstream.

[Item 9]

A picture coding method adapted to code each of blocks obtained by partitioning each picture of moving pictures, by using motion vectors, comprising: acquiring coding information on a plurality of reference block candidates for the block subject to coding; constructing, in a first inter prediction mode that uses information on a motion vector provided in the coding information of a reference block identified by an index, a first candidate list from the plurality of reference block candidates in accordance with a first predetermined order, to assign indices for identifying reference block candidates added in the first candidate list, and to output the indices of the plurality of reference block candidates; constructing, in a second inter prediction mode that uses a motion vector predictor difference between a motion vector predictor based on information on a motion vector provided in the coding information of a reference block identified by an index and a motion vector of the block subject to coding, a second candidate list from the plurality of reference block candidates in accordance with a second predetermined order, to assign indices for identifying reference block candidates added in the second candidate list, and to output the indices of the plurality of reference block candidates and the motion vector difference; decisioning a reference block and an inter prediction mode for each block subject to coding, based on outputs from the constructing of the first and second candidate lists; and coding the index of the reference block decisioned by decisioning of a reference block, prediction mode information indicating the inter prediction mode decisioned by decisioning of a reference block, and the motion vector difference corresponding to the reference block, the motion vector difference being coded when the second inter prediction mode is decisioned, wherein the constructing of the first and second candidate lists use a plurality of common blocks as the plurality of reference block candidates.

[Item 10]

A picture coding program embedded in a non-transitory computer-readable recording medium and adapted to code each of blocks obtained by partitioning each picture of moving pictures, by using motion vectors, comprising: a first module configured to acquire coding information on a plurality of reference block candidates for the block subject to coding; a second module configured to construct, in a first inter prediction mode that uses information on a motion vector provided in the coding information of a reference block identified by an index, a first candidate list from the plurality of reference block candidates in accordance with a first predetermined order, to assign indices for identifying reference block candidates added in the first candidate list, and to output the indices of the plurality of reference block candidates; a third module configured to construct, in a second inter prediction mode that uses a motion vector predictor difference between a motion vector predictor based on information on a motion vector provided in the coding information of a reference block identified by an index and a motion vector of the block subject to coding, a second candidate list from the plurality of reference block candidates in accordance with a second predetermined order, to assign indices for identifying reference block candidates added in the second candidate list, and to output the indices of the plurality of reference block candidates and the motion vector difference; a fourth module configured to decision a reference block and an inter prediction mode for each block subject to coding, based on outputs from the first and second modules; and a fifth module configured to code the index of the reference block decisioned by the fourth module, prediction mode information indicating the inter prediction mode decisioned by the fourth module, and the motion vector difference corresponding to the reference block, the motion vector difference being coded when the fourth module decisions on the second inter prediction mode, wherein the second and third modules use a plurality of common blocks as the plurality of reference block candidates.

[Item 11]

A picture decoding device adapted to decode a bitstream coded in units of blocks obtained by partitioning each picture of moving pictures, by using motion vectors, comprising: a bitstream decoding unit configured to decode the bitstream to derive, for each block subject to decoding, prediction mode information indicating an inter prediction mode and an index indicating a reference block that the block subject to decoding refers to, or derive prediction mode information indicating an inter prediction mode, an index indicating a reference block that the block subject to decoding refers to, and a motion vector difference associated with the reference block; an acquisition unit configured to acquire coding information on a plurality of reference block candidates for the block subject to decoding; a first mode output unit configured to construct, when the inter prediction mode indicated by the prediction mode information decoded by the bitstream decoding unit indicates a first inter prediction mode that uses information on a motion vector provided in the coding information of the reference block identified by the index, a first candidate list from the plurality of reference block candidates in accordance with a first predetermined order, to identify a reference block referred to by the block subject to decoding in the first candidate list by referring to the index of the reference block decoded by the bitstream decoding unit, and to output the coding information; a second mode output unit configured to construct, when the inter prediction mode indicated by the prediction mode information decoded by the bitstream decoding unit indicates a second inter prediction mode that uses a motion vector difference associated with the reference block identified by the index, a second candidate list from the plurality of reference block candidates in accordance with a second predetermined order, to identify a reference block referred to by the block subject to decoding in the second candidate list by referring to the index of the reference block decoded by the bitstream decoding unit, and to derivate and output a motion vector for the block subject to decoding from the motion vector predictor based on the information on the motion vector provided in the coding information of the reference block and from the motion vector difference decoded by the bitstream decoding unit; and a motion compensation prediction unit configured to perform motion compensation using the inter prediction mode indicated by the prediction mode information decoded by the bitstream decoding unit, by referring to information output from the first mode output unit or the second mode output unit, so as to generate a prediction picture for the block subject to decoding, wherein the first and second mode output units use a plurality of common blocks as the plurality of reference block candidates.

[Item 12]

The picture decoding device according to Item 11, wherein the higher in the first predetermined order, the smaller the size of a codeword of the index assigned by the first mode output unit to the reference block candidate.

[Item 13]

The picture decoding device according to Item 11 or Item 12, wherein the first predetermined order of arranging the reference block candidates in the first candidate list constructed by the first mode output unit differs from the second predetermined order of arranging the reference block candidates in the second candidate list generated by the second mode output unit.

[Item 14]

The picture decoding device according to one of Items 11 through 13, wherein the first mode detection unit constructs the first candidate list of the plurality of reference block candidates such that the number of reference block candidates is limited, and the second mode detection unit constructs the second candidate list of the plurality of reference block candidates such that the number of reference block candidates is limited.

[Item 15]

The picture decoding device according to one of Items 11 through 14, wherein the plurality of reference block candidates include decoded blocks spatially neighboring the block subject to decoding and blocks included in a picture at a different point of time from a picture including the block subject to decoding, and wherein the first and second mode output units arrange the plurality of reference block candidates such that a position of a block included in a picture at a different point of time in the first and second predetermined orders is lower than a position of a spatially neighboring block in the first and second predetermined orders.

[Item 16]

The picture decoding device according to one of Item 15, wherein the first mode output unit constructs the first candidate list according to the first predetermined order by providing a predetermined upper limit to the number of spatially neighboring decoded blocks arranged in the first candidate list, and by using as many reference blocks as defined by the upper limit in the first predetermined order.

[Item 17]

The picture decoding device according to Item 15 or Item 16, wherein the second mode output unit constructs the second candidate list, by defining those of the plurality of spatially neighboring decoded blocks arranged to the left of the block subject to decoding as belonging to a block group to the left, defines those blocks arranged above the block subject to decoding as belonging to a block group above, derives a candidate representing each of the block groups, and constructs the second candidate list by defining the second predetermined order such that the candidate from the block group to the left and the candidate from the block group above are arranged in the stated order.

[Item 18]

The picture decoding device according to one of Items 11 through 17, wherein the first mode output unit constructs the first candidate list based on a maximum number of reference block candidates arranged in the first candidate list, the maximum number being derived from the bitstream by the bitstream decoding unit.

[Item 19]

A picture decoding method adapted to decode a bitstream coded in units of blocks obtained by partitioning each picture of moving pictures, by using motion vectors, comprising: decoding the bitstream to derive, for each block subject to decoding, prediction mode information indicating an inter prediction mode and an index indicating a reference block that the block subject to decoding refers to, or derive prediction mode information indicating an inter prediction mode, an index indicating a reference block that the block subject to decoding refers to, and a motion vector difference associated with the reference block; acquiring coding information on a plurality of reference block candidates for the block subject to decoding; constructing, when the inter prediction mode indicated by the prediction mode information decoded by the decoding indicates a first inter prediction mode that uses information on a motion vector provided in the coding information of the reference block identified by the index, a first candidate list from the plurality of reference block candidates in accordance with a first predetermined order, identifying a reference block referred to by the block subject to decoding in the first candidate list by referring to the index of the reference block decoded by the decoding, and outputting the coding information; constructing, when the inter prediction mode indicated by the prediction mode information decoded by the decoding indicates a second inter prediction mode that uses a motion vector difference associated with the reference block identified by the index, a second candidate list from the plurality of reference block candidates in accordance with a second predetermined order, identifying a reference block referred to by the block subject to decoding in the second candidate list by referring to the index of the reference block decoded by the decoding, and derivating and outputting a motion vector for the block subject to decoding from the motion vector predictor based on the information on the motion vector provided in the coding information of the reference block and from the motion vector difference decoded by the decoding; and performing motion compensation using the inter prediction mode indicated by the prediction mode information decoded by the decoding, by referring to information output from the constructing of the first and second candidate lists, so as to generate a predicted picture for the block subject to decoding, wherein the constructing of the first and second candidate lists use a plurality of common blocks as the plurality of reference block candidates.

[Item 20]

A picture decoding program embedded in a non-transitory computer-readable recording medium and adapted to decode a bitstream coded in units of blocks obtained by partitioning each picture of moving pictures, by using motion vectors, comprising: a first module configured to decode the bitstream to derive, for each block subject to decoding, prediction mode information indicating an inter prediction mode and an index indicating a reference block that the block subject to decoding refers to, or derive prediction mode information indicating an inter prediction mode, an index indicating a reference block that the block subject to decoding refers to, and a motion vector difference associated with the reference block; a second module configured to acquire coding information on a plurality of reference block candidates for the block subject to decoding; a third module configured to construct, when the inter prediction mode indicated by the prediction mode information decoded by the first module indicates a first inter prediction mode that uses information on a motion vector provided in the coding information of the reference block identified by the index, a first candidate list from the plurality of reference block candidates in accordance with a first predetermined order, to identify a reference block referred to by the block subject to decoding in the first candidate list by referring to the index of the reference block decoded by the first module, and to output the coding information; a fourth module configured to construct, when the inter prediction mode indicated by the prediction mode information decoded by the first module indicates a second inter prediction mode that uses a motion vector difference associated with the reference block identified by the index, a second candidate list from the plurality of reference block candidates in accordance with a second predetermined order, to identify a reference block referred to by the block subject to decoding in the second candidate list by referring to the index of the reference block decoded by the first module, and to derivate and output a motion vector for the block subject to decoding from the motion vector predictor based on the information on the motion vector provided in the coding information of the reference block and from the motion vector difference decoded by the first module; and a fifth module configured to perform motion compensation using the inter prediction mode indicated by the prediction mode information decoded by the first module, by referring to information output from the third module or the fourth module, so as to generate a prediction picture for the block subject to decoding, wherein the third and fourth modules use a plurality of common blocks as the plurality of reference block candidates.

What is claimed is:

1. A picture coding device adapted to code each of blocks obtained by partitioning each picture of moving pictures, by using motion vectors, comprising:
   an acquisition unit that acquires coding information on a plurality of reference blocks for the block subject to coding;
   a first mode detection unit that constructs, in a first inter prediction mode that uses information on a motion vector provided in the coding information of a reference block identified by an index, a first candidate list by deriving the coding information from the plurality of reference blocks in accordance with a first predetermined order, assigns first indices for identifying the coding information added in the first candidate list, and outputs the first indices;

a second mode detection unit that constructs, in a second inter prediction mode that uses a motion vector difference between a motion vector predictor based on information on a motion vector provided in the coding information of a reference block identified by an index and a motion vector of the block subject to coding, a second candidate list by deriving motion vector predictors from the plurality of reference blocks in accordance with a second predetermined order, assigns second indices for identifying the motion vector predictors added in the second candidate list, and outputs the second indices and the motion vector difference;

a prediction method decision unit that decisions a reference block and an inter prediction mode for each block subject to coding, based on outputs from the first and second mode detection units; and a bitstream generation unit that codes prediction mode information indicating the inter prediction mode and the first index, or prediction mode information indicating the inter prediction mode, the second index, and the motion vector difference, wherein the first and second mode detection units use a plurality of common blocks as the plurality of reference blocks, wherein the first predetermined order for constructing the first candidate list in the first mode detection unit differs from the second predetermined order for constructing the second candidate list in the second mode detection unit, wherein the plurality of reference blocks include coded blocks spatially neighboring the block subject to coding and blocks included in a picture at a different point of time from a picture including the block subject to coding, wherein the first mode detection unit derives the coding information from the plurality of reference blocks such that a position of a block included in a picture at a different point of time in the first predetermined order is lower than a position of a spatially neighboring block in the first predetermined order, and wherein the first mode detection unit constructs the first candidate list from a plurality of coded blocks spatially neighboring the block subject to coding in accordance with the first predetermined order, by providing a predetermined upper limit to the number of spatially neighboring coded blocks arranged in the first candidate list, and by using as many reference blocks as defined by the upper limit in the first predetermined order.

2. A picture decoding device adapted to decode a bitstream coded in units of blocks obtained by partitioning each picture of moving pictures, by using motion vectors, comprising:

a bitstream decoding unit that decodes the bitstream to derive, for each block subject to decoding, prediction mode information indicating an inter prediction mode and a first index, or derives prediction mode information indicating an inter prediction mode, a second index, and a motion vector difference;

an acquisition unit that acquires coding information on a plurality of reference blocks for the block subject to decoding;

a first mode output unit that constructs, when the inter prediction mode indicated by the prediction mode information decoded by the bitstream decoding unit indicates a first inter prediction mode that uses information on a motion vector provided in the coding information of the reference block identified by the index, a first candidate list by deriving the coding information from the plurality of reference blocks in accordance with a first predetermined order, identifies a first candidate in the first candidate list by referring to the first index decoded by the bitstream decoding unit, and outputs the coding information on the first candidate;

a second mode output unit that constructs, when the inter prediction mode indicated by the prediction mode information decoded by the bitstream decoding unit indicates a second inter prediction mode that uses a motion vector difference associated with the reference block identified by the index, a second candidate list by deriving motion vector predictors from the plurality of reference blocks in accordance with a second predetermined order, identifies a second candidate in the second candidate list by referring to the second index decoded by the bitstream decoding unit, and derives and outputs a motion vector for the block subject to decoding from the motion vector predictor of the second candidate and from the motion vector difference decoded by the bitstream decoding unit; and a motion compensation prediction unit that performs motion compensation using the inter prediction mode indicated by the prediction mode information decoded by the bitstream decoding unit, by referring to information output from the first mode output unit or the second mode output unit, so as to generate a prediction picture for the block subject to decoding, wherein the first and second mode output units use a plurality of common blocks as the plurality of reference blocks, and wherein the first predetermined order for constructing the first candidate list in the first mode detection unit differs from the second predetermined order for constructing the second candidate list in the second mode detection unit, wherein the plurality of reference blocks include decoded blocks spatially neighboring the block subject to coding and blocks included in a picture at a different point of time from a picture including the block subject to coding, wherein the first mode detection unit derives the coding information from the plurality of reference blocks such that a position of a block included in a picture at a different point of time in the first predetermined order is lower than a position of a spatially neighboring block in the first predetermined order, and wherein the first mode detection unit constructs the first candidate list from a plurality of decoded blocks spatially neighboring the block subject to coding in accordance with the first predetermined order, by providing a predetermined upper limit to the number of spatially neighboring decoded blocks arranged in the first candidate list, and by using as many reference blocks as defined by the upper limit in the first predetermined order.

3. A picture decoding method adapted to decode a bitstream coded in units of blocks obtained by partitioning each picture of moving pictures, by using motion vectors, comprising:

decoding the bitstream to derive, for each block subject to decoding, prediction mode information indicating an inter prediction mode and a first index, or derive prediction mode information indicating an inter prediction mode, a second index, and a motion vector difference;

acquiring coding information on a plurality of reference blocks for the block subject to decoding;

constructing, when the inter prediction mode indicated by the prediction mode information decoded by the decoding indicates a first inter prediction mode that uses information on a motion vector provided in the coding information of the reference block identified by the index, a first candidate list by deriving the coding information from the plurality of reference blocks in accordance with a first predetermined order, identifying a first candidate in the first candidate list by referring to the first index decoded by the decoding, and outputting the coding information on the first candidate;

constructing, when the inter prediction mode indicated by the prediction mode information decoded by the decoding indicates a second inter prediction mode that uses a motion vector difference associated with the reference block identified by the index, a second candidate list by deriving motion vector predictors from the plurality of reference blocks in accordance with a second predetermined order, identifying a second candidate in the second candidate list by referring to the second index decoded by the decoding, and deriving and outputting a motion vector for the block subject to decoding from the motion vector predictor of the second candidate and the motion vector difference decoded by the decoding; and performing motion compensation using the inter prediction mode indicated by the prediction mode information decoded by the decoding, by referring to information output from the constructing of the first and second candidate lists, so as to generate a predicted picture for the block subject to decoding, wherein the constructing of the first and second candidate lists use a plurality of common blocks as the plurality of reference blocks, wherein the first predetermined order for constructing the first candidate list in the constructing of the first candidate list differs from the second predetermined order for constructing the second candidate list in the constructing of the second candidate list, wherein the plurality of reference blocks include decoded blocks spatially neighboring the block subject to decoding and blocks included in a picture at a different point of time from a picture including the block subject to decoding, wherein the constructing of the first candidate list derives the coding information from the plurality of reference blocks such that a position of a block included in a picture at a different point of time in the first predetermined order is lower than a position of a spatially neighboring block in the first predetermined order, and wherein the constructing of the first candidate list constructs the first candidate list from a plurality of decoded blocks spatially neighboring the block subject to decoding in accordance with the first predetermined order, by providing a predetermined upper limit to the number of spatially neighboring decoded blocks arranged in the first candidate list, and by using as many reference blocks as defined by the upper limit in the first predetermined order.

4. A non-transitory computer-readable recording medium having embedded thereon a picture decoding program adapted to decode a bitstream coded in units of blocks obtained by partitioning each picture of moving pictures, by using motion vectors, the picture decoding program comprising:

decoding the bitstream to derive, for each block subject to decoding, prediction mode information indicating an inter prediction mode and a first index, or derive prediction mode information indicating an inter prediction mode, a second index, and a motion vector difference;

acquiring coding information on a plurality of reference blocks for the block subject to decoding;

constructing, when the inter prediction mode indicated by the prediction mode information decoded by the decoding indicates a first inter prediction mode that uses information on a motion vector provided in the coding information of the reference block identified by the index, a first candidate list by deriving the coding information from the plurality of reference blocks in accordance with a first predetermined order, identifying a first candidate in the first candidate list by referring to the first index decoded by the decoding, and outputting the coding information on the first candidate;

constructing, when the inter prediction mode indicated by the prediction mode information decoded by the decoding indicates a second inter prediction mode that uses a motion vector difference associated with the reference block identified by the index, a second candidate list by deriving motion vector predictors from the plurality of reference blocks in accordance with a second predetermined order, identifying a second candidate in the second candidate list by referring to the second index decoded by the decoding, and deriving and outputting a motion vector for the block subject to decoding from the motion vector predictor of the second candidate and the motion vector difference decoded by the decoding; and performing motion compensation using the inter prediction mode indicated by the prediction mode information decoded by the decoding, by referring to information output from the constructing of the first and second candidate lists, so as to generate a predicted picture for the block subject to decoding, wherein the constructing of the first and second candidate lists use a plurality of common blocks as the plurality of reference blocks, wherein the first predetermined order for constructing the first candidate list in the constructing of the first candidate list differs from the second predetermined order for constructing the second candidate list in the constructing of the second candidate list, wherein the plurality of reference blocks include decoded blocks spatially neighboring the block subject to decoding and blocks included in a picture at a different point of time from a picture including the block subject to decoding, wherein the constructing of the first candidate list derives the coding information from the plurality of reference blocks such that a position of a block included in a picture at a different point of time in the first predetermined order is lower than a position of a spatially neighboring block in the first predetermined order, and wherein the constructing of the first candidate list constructs the first candidate list from a plurality of decoded blocks spatially neighboring the block subject to decoding in accordance with the first predetermined order, by providing a predetermined upper limit to the number of spatially neighboring decoded blocks arranged in the first candidate list, and by using as many reference blocks as defined by the upper limit in the first predetermined order.

5. A transmitting device comprising:

a packet processing unit that packetizes a bitstream coded by a picture coding method adapted to code each of blocks obtained by partitioning each picture of moving pictures, by using motion vectors, so as to generate a bitstream; and a transmitting unit that transmits the packetized bitstream, the picture coding method comprising:

acquiring coding information on a plurality of reference blocks for the block subject to coding;

constructing, in a first inter prediction mode that uses information on a motion vector provided in the coding information of a reference block identified by an index, a first candidate list by deriving the coding information from the plurality of reference blocks in accordance with a first predetermined order, to assign first indices for identifying the coding information added in the first candidate list, and to output the first indices;

constructing, in a second inter prediction mode that uses a motion vector difference between a motion vector predictor based on information on a motion vector provided in the coding information of a reference block identified by an index and a motion vector of the block subject to coding, a second candidate list by deriving motion vector predictors from the plurality of reference blocks in accordance with a second predetermined order, to assign second indices for identifying the motion vector predictors added in the second candidate list, and to output the second indices and the motion vector difference;

decisioning a reference block and an inter prediction mode for each block subject to coding, based on outputs from the constructing of the first and second candidate lists; and coding prediction mode information indicating the inter prediction mode and the first index, or prediction mode information indicating the inter prediction mode, the second index, and the motion vector difference, wherein the constructing of the first and second candidate lists use a plurality of common blocks as the plurality of reference blocks, and wherein the first predetermined order for constructing the first candidate list in the constructing of the first candidate list differs from the second predetermined order for constructing the second candidate list in the constructing of the second candidate list, wherein the plurality of reference blocks include coded blocks spatially neighboring the block subject to coding and blocks included in a picture at a different point of time from a picture including the block subject to coding, wherein the constructing of the first candidate list derives the coding information from the plurality of reference blocks such that a position of a block included in a picture at a different point of time in the first predetermined order is lower than a position of a spatially neighboring block in the first predetermined order, and wherein the constructing of the first candidate list constructs the first candidate list from a plurality of coded blocks spatially neighboring the block subject to coding in accordance with the first predetermined order, by providing a predetermined upper limit to the number of spatially neighboring coded blocks arranged in the first candidate list, and by using as many reference blocks as defined by the upper limit in the first predetermined order.

6. A transmitting method comprising:

packetizing a bitstream coded by a picture coding method adapted to code each of blocks obtained by partitioning each picture of moving pictures, by using motion vectors, so as to generate a bitstream; and transmitting the packetized bitstream, the picture coding method comprising:

acquiring coding information on a plurality of reference blocks for the block subject to coding;

constructing, in a first inter prediction mode that uses information on a motion vector provided in the coding information of a reference block identified by an index, a first candidate list by deriving the coding information from the plurality of reference blocks in accordance with a first predetermined order, to assign first indices for identifying the coding information added in the first candidate list, and to output the first indices;

constructing, in a second inter prediction mode that uses a motion vector difference between a motion vector predictor based on information on a motion vector provided in the coding information of a reference block identified by an index and a motion vector of the block subject to coding, a second candidate list by deriving motion vector predictors from the plurality of reference blocks in accordance with a second predetermined order, to assign second indices for identifying the motion vector predictors added in the second candidate list, and to output the second indices and the motion vector difference;

decisioning a reference block and an inter prediction mode for each block subject to coding, based on outputs from the constructing of the first and second candidate lists; and coding prediction mode information indicating the inter prediction mode and the first index, or prediction mode information indicating the inter prediction mode, the second index, and the motion vector difference, wherein the constructing of the first and second candidate lists use a plurality of common blocks as the plurality of reference blocks, wherein the first predetermined order for constructing the first candidate list in the constructing of the first candidate list differs from the second predetermined order for constructing the second candidate list in the constructing of the second candidate list, wherein the plurality of reference blocks include coded blocks spatially neighboring the block subject to coding and blocks included in a picture at a different point of time from a picture including the block subject to coding, wherein the constructing of the first candidate list derives the coding information from the plurality of reference blocks such that a position of a block included in a picture at a different point of time in the first predetermined order is lower than a position of a spatially neighboring block in the first predetermined order, and wherein the constructing of the first candidate list constructs the first candidate list from a plurality of coded blocks spatially neighboring the block subject to coding in accordance with the first predetermined order, by providing a predetermined upper limit to the number of spatially neighboring coded blocks arranged in the first candidate list, and by using as many reference blocks as defined by the upper limit in the first predetermined order.

7. A receiving device adapted to receive and decode a bitstream in which moving pictures are coded, comprising:

a receiving unit that receives a packetized bitstream in which moving pictures are coded in units of blocks obtained by partitioning each picture of the moving pictures, by using motion compensation;

a recovery unit that processes the received packetized bitstream so as to recover the original bitstream;

a bitstream decoding unit that decodes the recovered original bitstream to derive, for each block subject to decoding, prediction mode information indicating an inter prediction mode and a first index, or derive prediction mode information indicating an inter prediction mode, a second index, and a motion vector difference;

an acquisition unit that acquires coding information on a plurality of reference blocks for the block subject to decoding;

a first mode output unit that constructs, when the inter prediction mode indicated by the prediction mode information decoded by the bitstream decoding unit indicates a first inter prediction mode that uses information on a motion vector provided in the coding information of the reference block identified by the index, a first candidate list by deriving the coding information from the plurality of reference blocks in accordance with a first predetermined order, identifies a first candidate in the first candidate list by referring to the first index decoded by the bitstream decoding unit, and outputs the coding information on the first candidate;

a second mode output unit that constructs, when the inter prediction mode indicated by the prediction mode information decoded by the bitstream decoding unit indicates a second inter prediction mode that uses a motion vector difference associated with the reference block identified by the index, a second candidate list by deriving motion vector predictors from the plurality of reference blocks in accordance with a second predetermined order, identifies a second candidate in the second candidate list by referring to the second index decoded by the bitstream decoding unit, and derives and outputs a motion vector for the block subject to decoding from the motion vector predictor of the second candidate and from the motion vector difference decoded by the bitstream decoding unit; and a motion compensation prediction unit that performs motion compensation using the inter prediction mode indicated by the prediction mode information decoded by the bitstream decoding unit, by referring to information output from the first mode output unit or the second mode output unit, so as to generate a prediction picture for the block subject to decoding, wherein the first and second mode output units use a plurality of common blocks as the plurality of reference blocks, wherein the first predetermined order for constructing the first candidate list in the first mode detection unit differs from the second predetermined order for constructing the second candidate list in the second mode detection unit, wherein the plurality of reference blocks include decoded blocks spatially neighboring the block subject to decoding and blocks included in a picture at a different point of time from a picture including the block subject to decoding, wherein the first mode detection unit derives the coding information from the plurality of reference blocks such that a position of a block included in a picture at a different point of time in the first predetermined order is lower than a position of a spatially neighboring block in the first predetermined order, and wherein the first mode detection unit constructs the first candidate list from a plurality of decoded blocks spatially neighboring the block subject to decoding in accordance with the first predetermined order, by providing a predetermined upper limit to the number of spatially neighboring decoded blocks arranged in the first candidate list, and by using as many reference blocks as defined by the upper limit in the first predetermined order.

* * * * *